(12) United States Patent
Mozneb et al.

(10) Patent No.: US 11,486,825 B1
(45) Date of Patent: Nov. 1, 2022

(54) DEVICES AND METHODS FOR ANALYSIS OF BIOLOGICAL MATTER USING PLASMON RESONANCE

(71) Applicants: Maedeh Mozneb, Miami, FL (US); Anthony J. McGoron, Miami, FL (US); Chenzhong Li, Miami, FL (US)

(72) Inventors: Maedeh Mozneb, Miami, FL (US); Anthony J. McGoron, Miami, FL (US); Chenzhong Li, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 17/805,776

(22) Filed: Jun. 7, 2022

(51) Int. Cl.
*G01N 21/41* (2006.01)
*G01N 21/63* (2006.01)

(52) U.S. Cl.
CPC ............ *G01N 21/41* (2013.01); *G01N 21/63* (2013.01); *G01N 2201/0224* (2013.01)

(58) Field of Classification Search
CPC . G01N 21/41; G01N 21/63; G01N 2201/0224
USPC .......................................................... 356/128
See application file for complete search history.

(56) References Cited

U.S. PATENT DOCUMENTS

| | | | | |
|---|---|---|---|---|
| 6,417,925 B1* | 7/2002 | Naya | ..................... | G01N 21/553 356/128 |
| 7,842,243 B2* | 11/2010 | Sarkisov | ................ | G01N 21/77 356/73.1 |
| 2003/0112427 A1* | 6/2003 | Ryan | ..................... | G01N 33/551 356/136 |
| 2009/0244542 A1* | 10/2009 | Cho | ..................... | G01N 21/553 356/445 |
| 2010/0078546 A1* | 4/2010 | Kyoung | ............... | G02B 6/4249 250/237 G |
| 2011/0310394 A1* | 12/2011 | Li | ......................... | G01N 21/553 356/450 |
| 2015/0253243 A1* | 9/2015 | Cho | ....................... | G01N 21/41 356/366 |

FOREIGN PATENT DOCUMENTS

WO    WO-0046589 A1 *  8/2000   ........... G01N 21/553

* cited by examiner

*Primary Examiner* — Sunghee Y Gray
(74) *Attorney, Agent, or Firm* — Saliwanchik, Lloyd & Eisenchenk

(57) ABSTRACT

Systems, devices, and methods for analysis of biological matter using plasmon resonance are provided. A plasmonic device can include a sensing platform, a base, and a fluidic module. The sensing platform can include a sensor disposed on a prism, which can be disposed on a substrate. The substrate can further include a light source and a refraction detector.

17 Claims, 59 Drawing Sheets

Amplitude of the Probability Wavefunction $|\Psi(x)|^2$

1. $E\Psi(x) = \frac{-\hbar^2}{2m}\frac{d^2\Psi(x)}{dx^2} + V\Psi(x)$ $\Psi(x) = \sqrt{\frac{2}{L}}\cos\left(\frac{n\pi x}{L}\right)$ for $n=1,3,5\ldots$ $\Psi(x) = \sqrt{\frac{2}{L}}\sin\left(\frac{n\pi x}{L}\right)$ for $n=2,4,6\ldots$ 2. $E = \frac{\hbar^2 n^2 \pi^2}{2mL^2}$

Energy Densities of the electrical and magnetic fields

3. $\oint B \cdot ds = \mu_0 I + \mu_0 \varepsilon_0 \frac{d\phi_E}{dt}$ $U_B = \frac{B^2}{2\mu_0}$ $U_B = \frac{\varepsilon_0 E^2}{2}$ For light $U_E = U_B$ $U_{Total} = U_E + U_B = \varepsilon_0 E^2$ $|E| = h \cdot f$ $\boxed{U_{Total} = \varepsilon_0 (h \cdot f)^2}$ 4. $V = \frac{1}{\sqrt{\mu_0 \varepsilon_0}}$

6. $U_2 = U_1 + K_1 + U'_1 + K'_1$

7. $\varepsilon(hf)^2 = \frac{\hbar^2 n^2 \pi^2}{2mL^2} + k\frac{Q_1 Q_2}{r}$ $\bar{c} = \frac{r}{3.52 \times 10^{-28} k}$ 8. $\sin(\theta_E) = \sqrt{\frac{\varepsilon_r \varepsilon_o}{(\varepsilon_{r_o} \varepsilon_{oo})\chi_o}}$ $\frac{\hbar^2 n^2 \pi^2}{2mL^2} = \varepsilon(hf)^2$ $Q_2 = \bar{c} \cdot \frac{\varepsilon(hf)^2}{\varepsilon hf}$ 9. $\Phi_E = 4\pi d^2 |E|$ $Q_1 = -3.52 \times 10^{-29} |E|e$

FIG. 2(e)

| | Frequencies (Hz) | Relative Energy |
|---|---|---|
| Level 1 | 250-500 | 2.37% |
| Level 2 | 112-279 | 2.22% |
| Level 3 | 55.7-137 | 1.50% |
| Level 4 | 27.9-68.3 | 0.90% |
| Level 5 | 13.9-34.1 | 0.57% |
| Level 6 | 6.96-17.1 | 0.57% |
| Level 7 | 3.48-8.53 | 1.27% |
| Level 8 | 1.74-4.27 | 6.27% |
| Approx. | 0-1.9 | 84.32% |

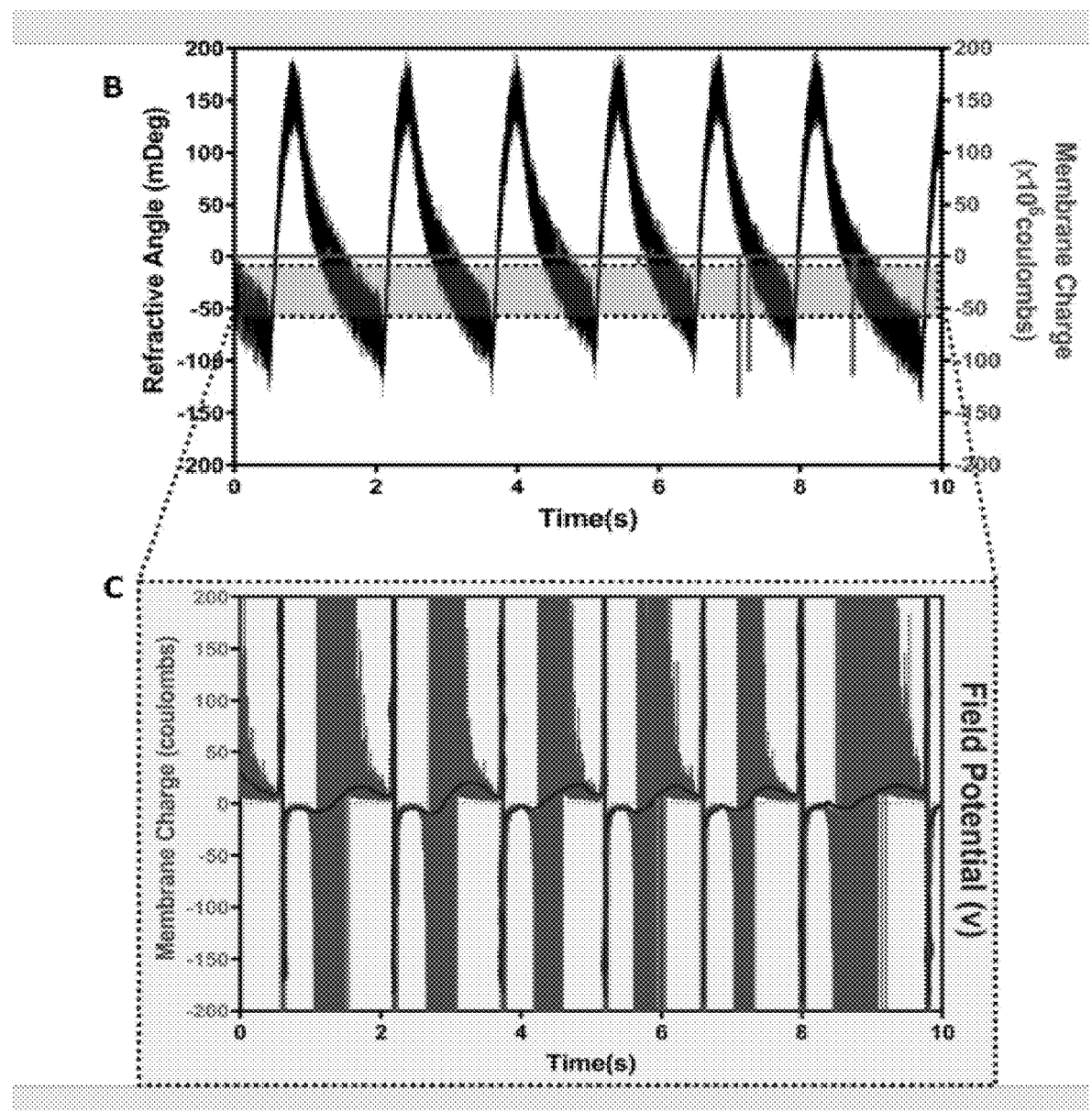
FIG. 10(b) - (c)

| Substance | $K_a$ ($M^{-1}s^{-1}$) | $K_d$ ($s^{-1}$) | $K_D$ (M) | $R_{MAX}$ (RU) |
|---|---|---|---|---|
| Verapamil | 271797.57 | 0.012 | $2.37*10^{-6}$ | 429.87 |
| Caffeine | 18.09 | 0.015 | $0.97*10^{-3}$ | 860.57 |
| Blebbistatin | 6718.1 | 0.021 | $3.77*10^{-6}$ | 3199.13 |

FIG. 16(g)

DEVICES AND METHODS FOR ANALYSIS OF BIOLOGICAL MATTER USING PLASMON RESONANCE

GOVERNMENT SUPPORT

This invention was made with government support under 1647837 awarded by the National Science Foundation. The government has certain rights in the invention.

BACKGROUND

In quantum physics, advanced technologies based on plasmonic sensing modalities offer many advantages to record and understand molecular biology functions. However, cellular biologists do not typically work with plasmons as a transducer for a biosensor and are therefore not comfortable doing so, primarily due to the complexities that arise when large-scale biological matter (e.g., cells) interact with the quantum scale events of a plasmon's resonance. As a result of these complexities and lack of research in the area, oversimplification and/or misinterpretation of data output is common.

BRIEF SUMMARY

Embodiments of the subject invention provide novel and advantageous systems, devices, and methods for analysis of biological matter using plasmon resonance. A plasmonic device can include a sensing platform, a base, and a fluidic module. The sensing platform can include a sensor disposed on a prism, which can be disposed on or inserted on a base or bedrock of the device (e.g., disposed on a circuit substrate in or on the base). The base can further include a light source (e.g., one or more light emitting diodes (LEDs) or other suitable light source(s)) and a refraction detector.

In an embodiment, a device for analysis of biological matter can comprise: a base comprising a bottom surface and four walls extending upward from the bottom surface; a circuit substrate disposed over the bottom surface of the base and within the four walls of the base; a light source disposed on the circuit substrate; a refraction detector disposed on the circuit substrate and spaced apart from the light source; a first prism disposed on the circuit substrate and spaced apart from the refraction detector and the light source; a first sensor disposed on the first prism, the first sensor comprising a first detection area configured to receive the biological matter; and a first gasket configured to be disposed on the first sensor and comprising a first fluidic device comprising at least one inlet and at least one outlet. The device can further comprise a (non-transitory) computer readable medium in operable communication with the circuit substrate and having software stored thereon that, when executed by a processor in operable communication with the computer readable medium, receives data of the biological matter and extracts a plurality of biological parameters from the data. The biological matter can comprise a cell, and the plurality of biological parameters can comprise a subtype of the cell (e.g., the cell can be a cardiac cell, the data can comprise a plasmonic eukaryography (PEG) signal (e.g., a plasmonic cardio-eukaryography (P-CeG) or plasmonic neuro-eukaryography (P-NeG) signal), and the subtype of the cardiac cell can be extracted based on the signal). The first fluidic device can be a microfluidic device and/or can comprise at least two inlets, and the first prism can be a micro prism. The base can be (or function as) a Faraday cage. The first gasket can be disposed on a cover that is connected to the base by at least one hinge, such that the cover is configured to open and expose the first sensor and to close such that the first gasket covers the first sensor. The light source can comprise, for example, at least one LED (e.g., at least one micro LED). The device can further comprise at least one light splitter (e.g., an LED splitter, such as a micro LED splitter) and/or at least one polarizer (e.g., a micro polarizer) disposed in a path traveled by light between the light source and the refraction detector. The device can further comprise: a second prism disposed on the circuit substrate and spaced apart from the first prism, the refraction detector, and the light source; and a second sensor disposed on the second prism, the second sensor comprising a second detection area configured to receive the biological matter. The device can further comprise a second gasket configured to be disposed on the second sensor and comprising a second microfluidic device comprising at least one inlet and at least one outlet. The second fluidic device can be a microfluidic device and/or can comprise at least two inlets, and the second prism can be a micro prism. The second gasket can be disposed on the cover that is connected to the base by at least one hinge, such that the cover is configured to open and expose the second sensor and to close such that the second gasket covers the second sensor. The first sensor and/or the second sensor can comprise gold. The first sensor can be disposed directly on and in physical contact with the first prism and/or the second sensor (if present) can be disposed directly on and in physical contact with the second prism (if present). The biological matter can be, for example, excitable cells (e.g., mammalian excitable cells such as human excitable cells).

In another embodiment, a method for analyzing biological matter can comprise: providing a device for analyzing biological matter as disclosed herein; providing the biological matter to a detection area of the (first or second) sensor; operating the device to provide light, via the light source, to the (first or second) sensor through the (first or second) prism; and detecting refracted light with the refraction detector to obtain data of the biological matter. The device can comprise the (non-transitory) computer readable medium in operable communication with the circuit substrate and having software stored thereon that, when executed by a processor in operable communication with the computer readable medium, receives data of the biological matter and extracts a plurality of biological parameters from the data; and the method can further comprise executing the software to extract the plurality of biological parameters from the data. The biological matter can comprise a cell, and the plurality of biological parameters can comprise a subtype of the cell (e.g., the cell can be a cardiac cell, the data can comprise a PEG signal (e.g., a P-CeG or P-NeG signal), and the subtype of the cardiac cell can be extracted based on the signal). Each fluidic device present can be a microfluidic device and/or can comprise at least two inlets, and each prism present can be a micro prism. The base can be (or function as) a Faraday cage. Each gasket present can be disposed on a cover that is connected to the base by at least one hinge, such that the cover is configured to open and expose each sensor and to close such that the gasket(s) cover(s) the sensor(s) (respectively). The light source can comprise, for example, at least one LED (e.g., at least one micro LED). The device can further comprise at least one light splitter (e.g., an LED splitter, such as a micro LED splitter) and/or at least one polarizer (e.g., a micro polarizer) disposed in a path traveled by light between the light source and the refraction detector. Any or all of the sensors present can comprise gold. The first sensor can be disposed directly on and in physical contact with the first prism and/or the second sensor (if present) can be disposed directly on and in physical contact with the second prism (if present).

BRIEF DESCRIPTION OF DRAWINGS

FIG. 2(e) shows equations for a cell-SPR model.

FIG. 10(b) shows a plot of refractive angle (in mDeg) (left y-axis; the curve with the highest peak at time of ~8 s) and membrane charge (in $10^6$ C) (right y-axis; the curve with the low peak at a time of ~7 s) versus time (in s) for a P-CeG signal.

FIG. 10(c) shows a plot of membrane charge (in C) (left y-axis; the curve with thicker bands) and field potential (in Volts (V)) (right y-axis; the curve that appears more like a line) versus time (in s). FIG. 10(c) is an expansion of the shaded block in FIG. 10(b).

FIG. 13(a) shows a plot of refractive index (in mDeg) versus time (in s) for consecutive injections of blebbistatin. The curve on the right-hand side is control signal, and the next curves are (right to left) for 1 micromolar (μM), 3 μM, 5 μM, 7 μM, and 9 μM injections, respectively, of blebbistatin. FIG. 13(b) shows a plot of refractive angle (in mDeg) versus time (in s) for the different injection amounts of blebbistatin; the control signal has the highest refractive angle values, followed generally by 1 μM, 3 μM, 5 μM, 7 μM, and 9 μM. FIG. 13(c) shows a plot of FWHM duration (in s) versus time (in s) for the different injection amounts of blebbistatin. FIG. 13(d) shows a bar chart of refractive index change (in mDeg) for the different injection amounts of blebbistatin; from left to right, the bars are for control, 1 μM, 3 μM, 5 μM, 7 μM, and 9 μM, respectively. FIG. 13(e) shows a bar chart of FWHM duration (in s) for the different injection amounts of blebbistatin; from left to right, the bars are for control, 1 μM, 3 μM, 5 μM, 7 μM, and 9 μM, respectively. FIG. 13(f) shows a plot of depolarization amplitude (log[charge (in C)]); FIG. 13(g) shows a plot of repolarization amplitude (log[charge (in C)]); FIG. 13(h) shows a plot of field potential duration (in s); FIG. 13(i) shows a plot of normalized refractive angle change (in mDeg); FIG. 13(j) shows a plot of FWHM duration (in s); and FIG. 13(k) shows a plot of action potential per minute (APM). In each of FIGS. 13(f)-13(k), the values are for the P-CeG signal at different injection values of blebbistatin (across the x-axis from left to right—control, 1 μM, 3 μM, 5 μM, 7 μM, and 9 μM, respectively). FIG. 13(l) shows a plot of membrane charge (log[charge (in C)]) versus time (in s) at different blebbistatin concentrations. FIG. 13(m) shows a plot of refractive angle change (in mDeg) versus time (in s) for different blebbistatin concentrations. In FIG. 13(m), the curve with the highest value at 0.4 s is for control; the curve with the second-highest value at 0.4 s is for 1 μM; the curve with the third-highest value at 0.3 s is for 3 μM; the curve with the fourth-highest value at 0.3 s is for 5 μM; the curve with the second-highest value at 2.4 s is for 7 μM; and the curve with the only shown value at 2.9 s is for 9 μM.

FIG. 14(a) shows a plot of refractive index (in mDeg) versus time (in s) for consecutive injections of verapamil. The curve on the right-hand side is control signal, and the next curves are (right to left) for 50 nanomolar (nM), 100 nM, 200 nM, and 500 nM injections, respectively, of verapamil. FIG. 14(b) shows a plot of refractive angle (in mDeg) versus time (in s) for the different injection amounts of verapamil; the control signal has the highest refractive angle values, followed generally by 500 nM, 50 nM, 100 and 200 nM. FIG. 14(c) shows a plot of FWHM duration (in s) versus time (in s) for the different injection amounts of verapamil. FIG. 14(d) shows a bar chart of refractive index change (in mDeg) for the different injection amounts of verapamil; from left to right, the bars are for control, 50 nM, 100 nM, 200 nM, and 500 nM, respectively. FIG. 14(e) shows a plot of depolarization amplitude (log[charge (in C)]); FIG. 14(f) shows a plot of repolarization amplitude (log[charge (in C)]); FIG. 14(g) shows a plot of field potential duration (in s); FIG. 14(h) shows a plot of normalized refractive angle change (in mDeg); FIG. 14(i) shows a plot of FWHM duration (in s); and FIG. 14(j) shows a plot of action potential per minute (APM). In each of FIGS. 14(e)-14(j), the values are for the P-CeG signal at different injection values of verapamil (across the x-axis from left to right—control, 50 nM, 100 nM, 200 nM, and 500 nM, respectively). FIG. 14(k) shows a plot of membrane charge (log[charge (in C)]) versus time (in s) at different verapamil concentrations. In FIG. 14(k), the curve with the first peak (starting at time of 0 s and moving to the right across the x-axis) is for 50 nM; the curve with the second peak is for 100 nM; the curve with the third peak is for control; the curve with the fourth peak is for 200 nM; and the curve with the fifth peak is for 500 nM. FIG. 14(l) shows a plot of refractive angle change (in mDeg) versus time (in s) for different verapamil concentrations. In FIG. 14(l), the curve with the highest value at 0.5 s is for control; the curve with the second-highest value at 0.5 s is for 50 nM; the curve with the second-lowest value at 0.1 s is for 500 nM; the curve with the lowest value at 0.5 s is for 100 nM; and the curve with the third-lowest value at 0.1 s is for 200 nM.

FIG. 15(a) shows a plot of refractive index (in mDeg) versus time (in s) for consecutive injections of caffeine. The curve on the right-hand side is control signal, and the next curves are (right to left) for 2 millimolar (mM), 4 mM, 6 mM, and 8 mM injections, respectively, of caffeine. FIG. 15(b) shows a plot of refractive angle (in mDeg) versus time (in s) for the different injection amounts of caffeine; the points with the generally highest refractive angle values are for 6 mM, followed generally by 4 mM, control, 2 mM, and 8 mM. FIG. 15(c) shows a plot of FWHM duration (in s) versus time (in s) for the different injection amounts of caffeine; the curve with the highest FWHM values is for 8 mM. FIG. 15(d) shows a bar chart of refractive index change (in mDeg) for the different injection amounts of caffeine; from left to right, the bars are for control, 2 mM, 4 mM, 6 mM, and 8 mM, respectively. FIG. 15(e) shows a bar chart of FWHM duration (in s) for the different injection amounts of caffeine; from left to right, the bars are for control, 2 mM, 4 mM, 6 mM, and 8 mM, respectively. FIG. 15(f) shows a plot of depolarization amplitude (log[charge (in C)]); FIG. 15(g) shows a plot of repolarization amplitude (log[charge (in C)]); FIG. 15(h) shows a plot of field potential duration (in s); FIG. 15(i) shows a plot of normalized refractive angle change (in mDeg); FIG. 15(j) shows a plot of FWHM duration (in s); and FIG. 15(k) shows a plot of action potential per minute (APM). In each of FIGS. 15(f)-15(k), the values are for the P-CeG signal at different injection values of caffeine (across the x-axis from left to right—control, 2 mM, 4 mM, 6 mM, and 8 mM, respectively). FIG.

15(*l*) shows a plot of membrane charge (log[charge (in C)]) versus time (in s) at different caffeine concentrations. In FIG. 15(*l*), the curve with the first peak (starting at time of 0 s and moving to the right across the x-axis) is for 2 mM; the curve with the second peak is for control; the curve with the third peak (essentially overlapped with the control at its initial peak) is for 4 mM; the curve with the fourth peak is for 6 mM; and the curve with the fifth peak is for 8 mM. FIG. 15(*m*) shows a plot of refractive angle change (in mDeg) versus time (in s) for different caffeine concentrations. In FIG. 15(*m*), the curve with the highest value at 0.4 s is for control; the curve with the highest value at 0.75 s is for 2 mM; the curve with the lowest value at 0.5 s is for 6 mM; the curve with the lowest value at 1.7 s is for 4 mM; and the curve with the lowest value at 0.4 s is for 8 mM.

FIG. 16(*b*) shows a plot of SPR Response (in RU) versus concentration (in μM) for blebbistatin binding to CMs.

FIG. 16(*c*) shows a plot of SPR Response in (in RU) versus time (in s) showing verapamil binding to CMs.

FIG. 16(*d*) shows a plot of SPR Response (in RU) versus concentration (in nM) for verapamil binding to CMs.

FIG. 16(*e*) shows a plot of SPR Response in (in RU) versus time (in s) showing caffeine binding to CMs.

FIG. 16(*f*) shows a plot of SPR Response (in RU) versus concentration (in mM) for caffeine binding to CMs.

FIG. 16(*g*) shows a table of $K_a$ (per mole per second ($M^{-1}s^{-1}$)), $K_d$ (per second ($s^{-1}$)), $K_D$ (in moles (M)), and $R_{MAX}$ (in RU) for blebbistatin, verapamil, and caffeine.

DETAILED DESCRIPTION

Figures 1A, 1B, 1C:
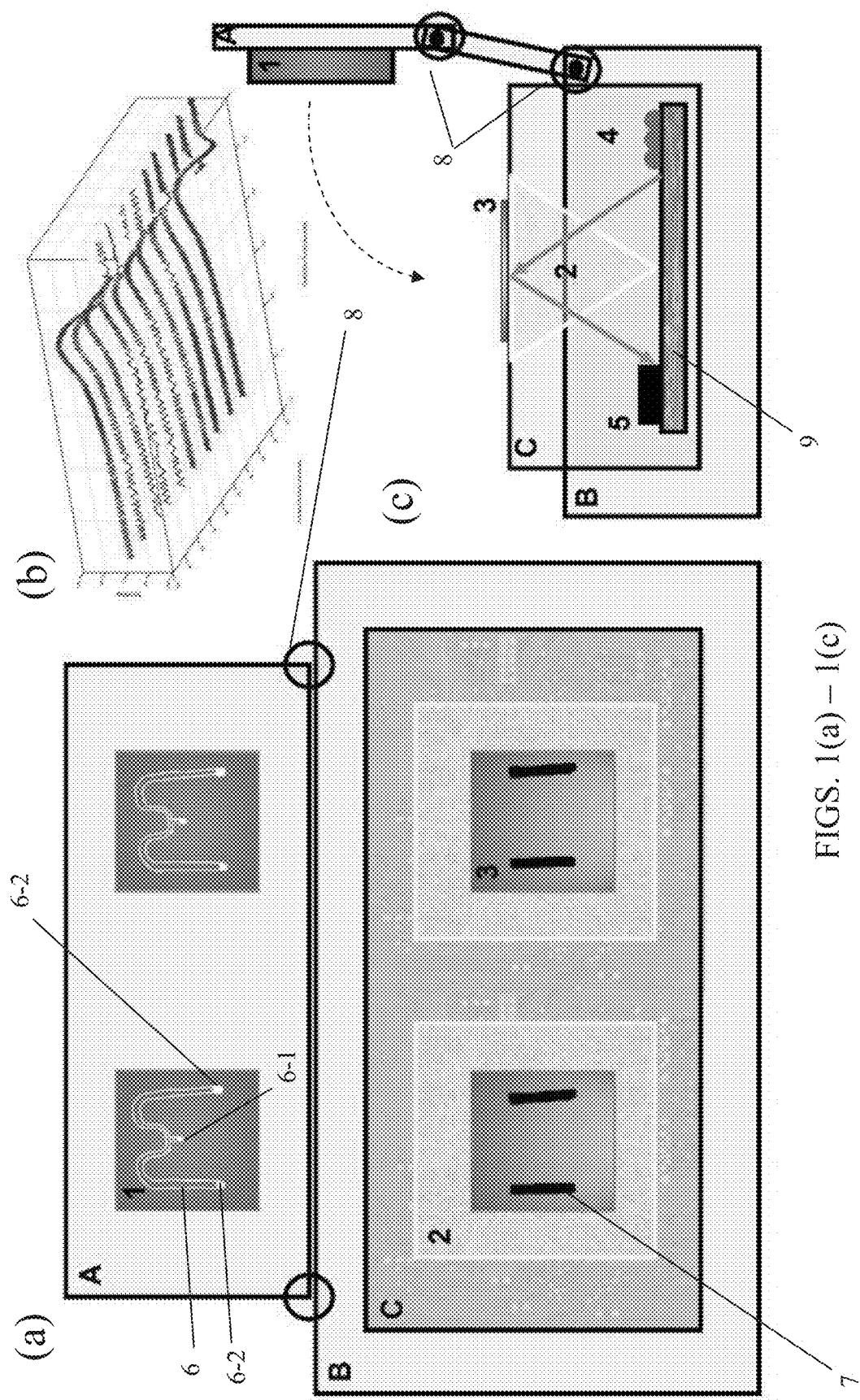
FIG. 1(a) shows a top view of a plasmonic device for analysis of biological matter, according to an embodiment of the subject invention.
FIG. 1(b) shows a plot of multiple individual action potentials obtained by the device of FIG. 1(a).
FIG. 1(c) shows a side view of the device shown in FIG. 1(a).

Embodiments of the subject invention provide novel and advantageous systems, devices, and methods for analysis of biological matter using plasmon resonance. A plasmonic device can include a sensing platform, a base, and a fluidic module. The sensing platform can include a sensor disposed on a prism, which can be disposed on or inserted on a base or bedrock of the device (e.g., disposed on a circuit substrate in or on the base). The base can further include a light source (e.g., one or more light emitting diodes (LEDs) or other suitable light source(s)) and a refraction detector.

Plasmons are quasi-particles born when a polarized light hits a noble metal surface (e.g., gold) and resonates the valence electrons of the metal atoms. This resonance forms an arbitrary continuum, called an electron density cloud. Embodiments of the subject invention can, for the first time in the art, successfully extract, correlate, and quantify an action potential comprehensively as it travels through and interacts with the electron density cloud. As a result, the ionic activities of non-voltage gated and voltage-gated ion channels of live excitable cells can be tracked. In addition, the most relevant properties of excitable cells can be extracted, such properties including but not necessarily limited to conductivity, excitability, rhythmicity, and contractility (e.g., in the case of cardiac cells); all of these properties are essential in overall cell health analysis. Machine learning and artificial intelligence techniques can be used to extract the most clinically relevant information from this data to help progress the understanding of fundamental cardiovascular physiology and channelopathies.

Plasmons are a negatively charged sea of resonance of valence electrons of matter. If the matter is a noble metal (e.g., gold), this sea becomes a sensitive continuum and interacts with charged particles near it (i.e., distance of 200 nanometers (nm) or less). This sensitivity to charge distribution makes plasmons suitable for sensing biologically driven charge variations, such as in an excitable cell. These variations are carried out through the exquisite ion-channel machinery of the excitable cells. Plasmonic sensing platforms/devices/systems/methods of embodiments of the subject invention can extract and quantify ion channel activities of excitable cells. Also, possible mechanical waves in the detectable region can be identified and extracted from the signal (e.g., in the case of contracting cells such as cardiomyocytes).

FIG. 1(*a*) shows a top view of a plasmonic device for analysis of biological matter, according to an embodiment of the subject invention, and FIG. 1(*c*) shows a side view of the device. Referring to FIGS. 1(*a*) and 1(*c*), the device can include a fluidic module A, a base B, and a sensing platform C. The fluidic module A can include at least one gasket 1, each of which can include a fluidic device 6. The fluidic device 6 can include at least one inlet 6-2 (e.g., two inlets) and at least one outlet 6-1 (e.g., one outlet). The fluidic device 6 can be, for example, a microfluidic device. The sensing platform C can include at least one sensor 3 each disposed on a prism 2, which can be disposed on a substrate 9, which can for example be a circuit board or other circuit substrate. Each sensor 3 can be, for example, a gold sensor or other noble metal sensor. The sensing platform C can include at least one light source 4 (e.g., one or more LEDs) and a refraction detector 5, both of which can be disposed on the substrate 9. The size of the light source and the refraction detector are not depicted to scale; these elements are much smaller than the substrate 9, the prism 2, and the sensor 3. The base B can include the sensing platform C disposed therein and can be, for example, a Faraday cage. The fluidic module A can be connected to the base B by one or more hinges 8 or similar connectors that allow movement and/or rotation, and the fluidic module A can swing/close such that the at least one fluidic device 6 is disposed over (and/or comes in direct physical contact with) the at least one sensor 3, respectively. That is, the fluidic module A can function as a cap of the device and/or the base B. The at least one gasket 1 can have a size corresponding to the at least sensor 3, respectively, and can be disposed over (and/or come in direct physical contact with) the at least one sensor 3, respectively, when the fluidic module A swings closed. The substrate can include one or more printed circuit boards (PCBs) and/or computer interface connectors. The sensor(s) 3 can have different configurations (e.g., micro-milled for single-cell analysis or flat for a monolayer of cells) as desired (e.g., depending on the type of analysis desired) and can be disposed on top of the prism 2, which can be for example a micro prism. The sensor(s) 3 can include one or more detection areas 7 for single-cell or multicell analysis. The locations of the detection areas 7 can correspond to those of inlets 6-2 of the fluidic device 6 when the fluidic module A is closed.

The device can be small and portable (for example, dimensions of 12 centimeters (cm)×7.5 cm×5 cm). The device can include light sources (e.g., LEDs, such as micro LEDs), light splitters (e.g., LED splitters), prisms (e.g., micro prisms), polarizers (e.g., micro polarizers), and/or detectors (e.g., micro detectors) that induce plasmonic waveguides and detect changes in the electrical/mechanical activity of a cell membrane. Cellular function of mechanical and electrical origins is filtered and sorted using software in operable communication with the sensing platform, and are then compared to the physiological parameters of a healthy cell. The detection area is located directly under the gasket, which can have a fluidic device therein (e.g., etched or carved therein). For example, each gasket can have a microfluidic device (e.g., microchannels that are 6 millimeters (mm) or about 6 mm long, 2 mm or about 2 mm wide and 0.15 mm or about 0.15 mm deep).

The hinged cap can have heavy-duty gaskets (e.g., made from polydimethylsiloxane (PDMS) or similar material) attached thereto, which can close on the sensors, thereby sealing and protecting the sensors from the penetration of light and other environmental disturbances. Micropumps and microtubing on the fluidic module or the sensing platform can drive the flow of the cell medium (i.e., the medium being analyzed) from its attached reservoir. The base of the device can act as a Faraday cage for the micro settings of plasmonic induction and detection, as well as related PCB boards and/or computer interface connectors of the sensing platform.

The non-invasive nature of the sensor's transducer (plasmons) interactions with biological matter makes the device unique for accurate sensing. The non-invasive approach also inflicts near-zero disruptions on the cellular micro-environment compared to other techniques such as patch clamping and fluorescent microscopy. The sensor designs allow for entrapment and analysis of single excitable cells and cells grown/cultured in a monolayer. Patch clamping is designed for observing the membrane potential of one cell only, and while microelectrode Arrays (MEAs) do allow for monitoring cellular monolayers, no MEA design provides high-resolution data for ion channel recordings.

Cell-specific substrate modification and the microfluidic module geometry of embodiments of the subject invention help cells form closer to their native shape, accounting for more precise data collection. Special substrate modifications and the algorithm(s) of detection allow for mapping of ion channels of a network of excitable cells in massive cellular networks. Such applicability is not limited to the two-dimensional (2D) plane and can be applied to three-dimensional (3D) biological constructs as well (e.g., cardiac tissue). In addition, biocompatibility of all device components is assured for cell physiological applications.

In an embodiment, a piezo electrode sensing board can be used and allows for simultaneous readings from electrical and mechanical signals of cells such as cardiomyocytes (CMs). Extracting both mechanical and electrical features makes the device an all-in-one and precisely controllable device compared to currently available alternatives. In addition, the multiparameter detector and multi-entrapment sensor/substrate result in the ability to significantly upscale for high throughput single-cell analysis.

The handheld and portable design of devices of embodiments of the subject invention allows for many different uses, including use inside a cell culture incubator, which helps maintain appropriate environmental conditions for optimal cellular viability and long-term function.

The device can be adjustable, such that it can be configured based on a user's needs. Please note that the design of the device, as has been depicted in the intro section of this document, is an adjustable design, based on the end users' need. The sensors, the microfluidics, and the configuration of the circuit substrate (e.g., to allow for electric field induction) are all flexible, alterable, and/or removable from the device. The user can select, configure, and design the device in a desired configuration according to the needs of the user.

The device can include comprehensive, user-friendly software (e.g., installed on a computer-readable medium and executable by a processor, one or both of which is/are in operable communication with the sensing platform (e.g., via a connector on the circuit substrate) configured to monitor, manipulate, and/or analyze clinically relevant features of excitable cells (e.g., ion-channel specific arrhythmia detection) under desired experimental conditions. The software can be configured to extract many (e.g., ten or more) biological parameters of clinical importance from excitable cells. Other current technologies require the user to write multiple algorithms to extract clinically relevant features from biological signals. The versatile "plug-and-play" platform allows for, for example, angiogenesis studies (inducing vascularization and exploring its effect on cell signaling). In addition, the full range of the device's applicability can be enhanced through a permeable membrane-floored microfluidic module, inserted in the place of the device's original microfluidic element, for co-culture with cells lining the blood vessels. Because a main goal of the device design is to be accessible to researchers around the globe, its design allows its price to be significantly lower than that of laboratory equipment for the ionic channel activity of cells (e.g., fluorescent microscope with environmental control chamber, Surface Plasmon Resonance table-top devices, patch-clamp set up), while still being as reliable.

Data collected from the device can be transmitted in order to go through the software accompanying the device, which can result in one or more different sensograms (e.g., displayed on a display in operable communication with the processor and/or computer-readable medium having the software stored thereon) for each detection area separately and/or simultaneously. There can also be a report of the clinically relevant features of the cells (e.g., beating rate variability, amplitude/FWHM ratio, depolarization, repolarization duration, etc.) presented for analysis at the end of each run.

Embodiments of the subject invention advantageously provide real-time and non-invasive observation of ion channel activities of cells (e.g., excitable cells, such as mammalian excitable cells (e.g., cardiac cells, neurons) including human excitable cells). Single-cell structural and functional analysis for normal and diseased cell lines can be performed simultaneously. This allows for immediate observation and comparison of differences in electromechanical behavior of normal and diseased cells simultaneously, a feature that is missing from current technologies for excitable single-cell analysis. The devices of embodiments of the subject invention can extract both electrical and mechanical (if desired, such as in the case of cardiac cells (e.g., contraction of cells)) sensograms simultaneously, using plasmons and piezo sensors, respectively, as transducers. Adjustments to device design can be made to fit it for applications, such as cardiac catheterization procedures (e.g., for diagnosis of cardiac channelopathies).

The device can be highly efficient in determining the subtype of a cell. For example, in the case of cardiac cells (e.g., stem cell-derived cardiac cells), based on the shape of a signal (e.g., a P-CeG signal) received, the type of cardiomyocyte can be determined, as well as whether the cells are from the sinoatrial/atrioventricular (SA/AV) nodes or a ventricular myocyte or an atrial one. Such variables in determining cellular subtype are highly useful in optimizing differentiation protocols of stem cells into cardiac or neuronal cells. The device can also be used for respiration analysis of cells, and the software can utilize a particular form of data analysis for such an analysis of cells.

One primary reason clinical trials of novel drug treatments fail is due to the variations inherent in every individual's cellular structure and behavior. Parameters such as race, sex, and age of the target population are often "rounded-up" in drug developments. Developing a personalized drug is the goal for many currently ongoing clinical trials. Such trials can use the devices of embodiments of the subject invention to: understand a patient's target cell behavior (e.g., the personalized force of contraction, action potential conduction speed); improve patient outcomes through personalized treatments based on parameters extracted from the analysis; and test the developed drug on a patient's cells prior to administration in situ, increasing the chance of success.

Figure 2A:
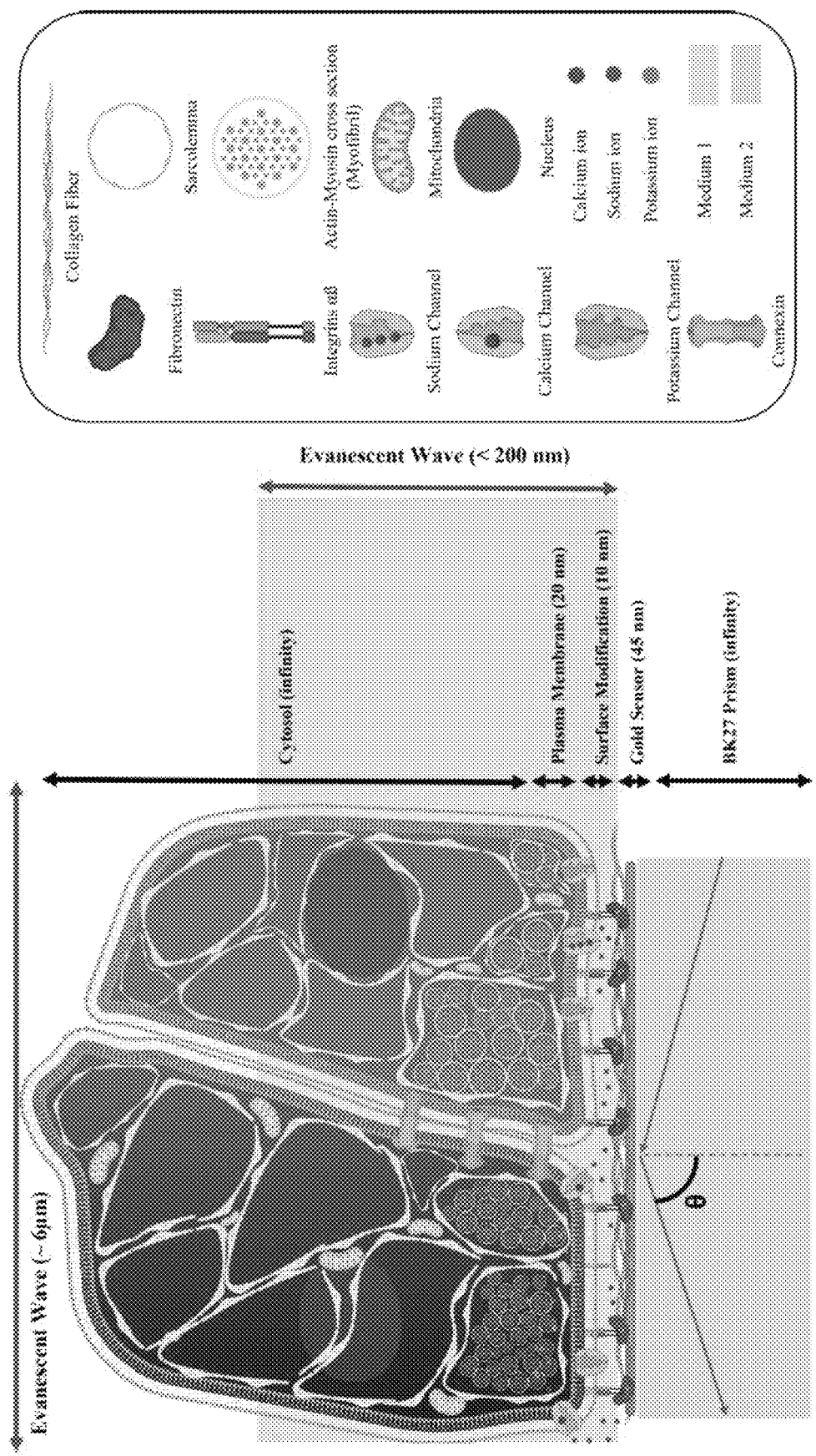
FIG. 2(a) shows an illustration of an excitable cell surface plasmon resonance (SPR) (cell-SPR) model for two adjacent cardiomyocytes (CMs).

FIG. 2(a) shows an illustration of an excitable cell surface plasmon resonance (SPR) (cell-SPR) model for two adjacent CMs. Light with a wavelength of 630 nanometers (nm) is radiated through the prism (n=2.30, medium 2) onto a 45 nm gold film, which is then totally internally reflected. The Kretschman configuration is used as the plasmonic modality to monitor the physiological events of CMs within the evanescent field (medium 1). In the light's travel trajectory, the thickness of the cell (about 10 micrometers (μm) and prism are assumed as an infinite medium, in comparison with plasmonic spatial sensitivity.

Figure 2B:
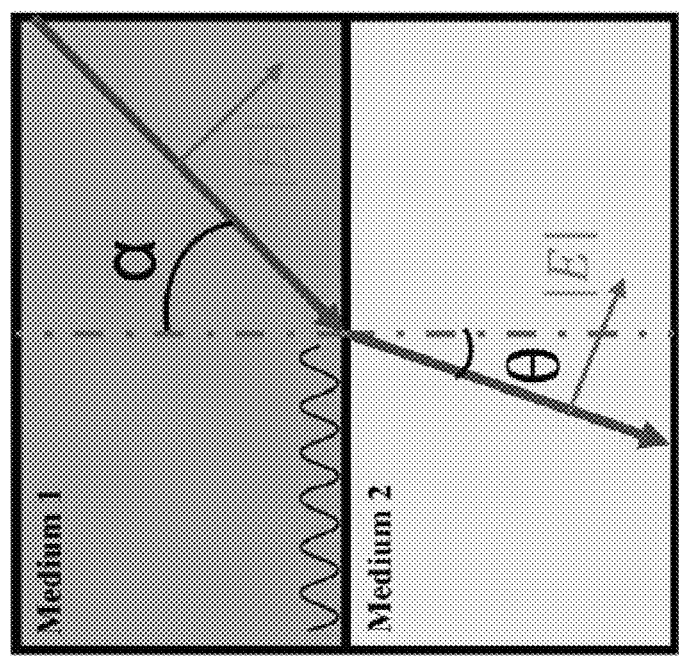
FIG. 2(b) shows an illustration of a cell-SPR model, showing light direction.
Figure 2C:
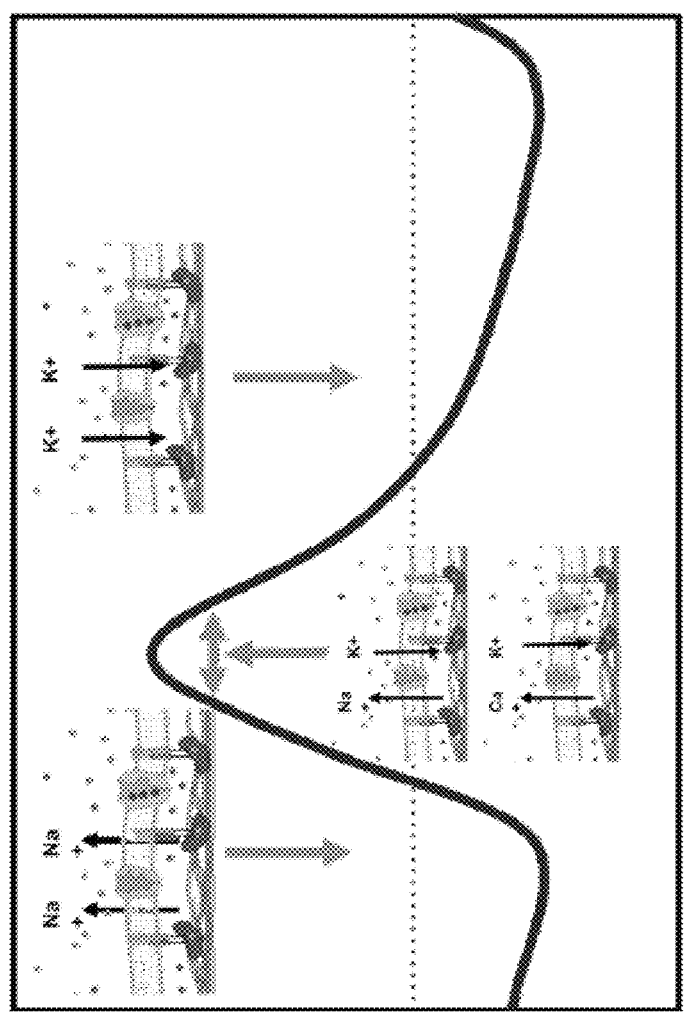
FIG. 2(c) shows an illustration of a cell-SPR model, showing consecutive events of a cardiac action potential overlapped with a sample signal of contracting CMs on an SPR sensor.
Figure 2D:
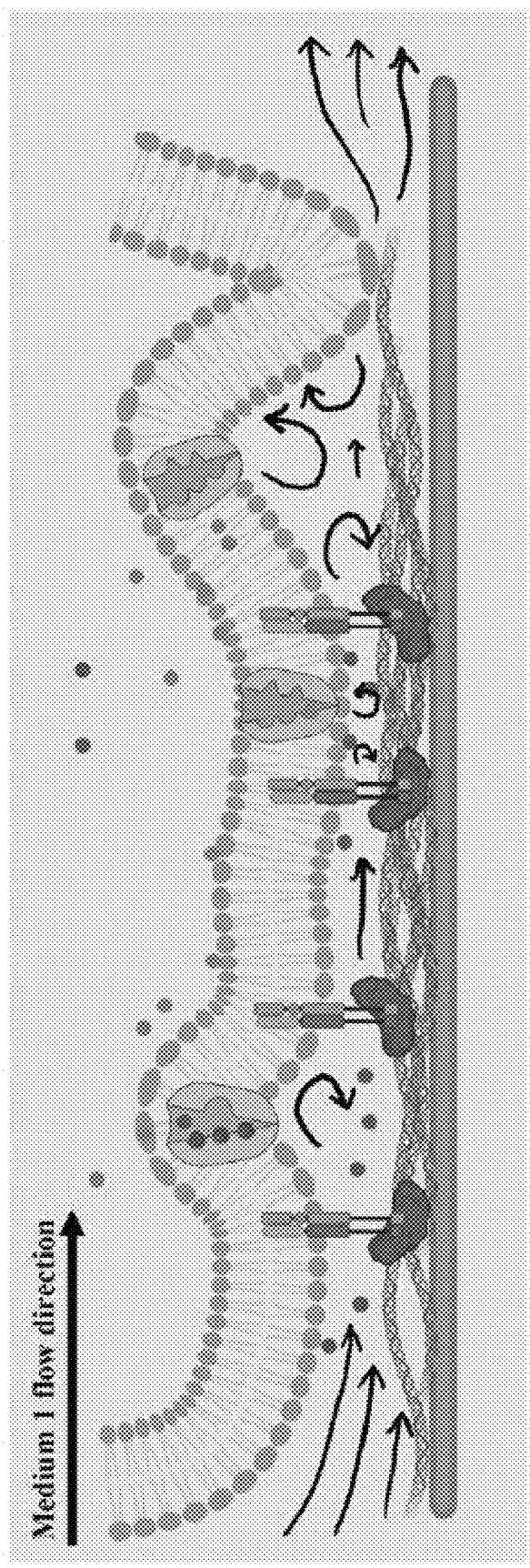
FIG. 2(d) shows an illustration of a cell-SPR model, showing medium flow direction.

FIGS. 2(b)-2(d) show biophysical illustrations of the excitable cell-SPR model. Referring to FIG. 2(b), the direction of light travel, as traced by the arrow, after total internal reflection (TIR) is depicted. Medium 1 constitutes the cell membrane, surface modifications of collagen and fibronectin, and dynamic fluid flow. The wave shows the propagation of electromagnetic waves parallel to the sensor surface because of TIR. Medium 2 is solely the device's prism with a refraction index of n=2.30. Referring to FIG. 2(c), consecutive events of a cardiac action potential are overlapped with a sample signal of contracting CMs on the SPR sensor. Ion channel events of depolarization, plateau, and cardiac action potential repolarization are shown with vertical arrows from left to right, respectively. Referring to FIG. 2(d), the possibility of turbulence fluid flow between the cell and the gold surface is depicted. In the case of CMs, as the cells contract, regions shown with curved arrows indicate that turbulent flow will shrink or expand, increasing and decreasing the turbulence kinetic energy. The horizontal arrow at the top left of the figure shows the direction of the medium flow.

FIG. 2(e) shows equations for the excitable cell-SPR model. Referring to FIG. 2(e), Equation 1 is a probability wavefunction, referred to as $\Psi(t,x)$, defined by Schrödinger's equation, and it can estimate the probability position of electrons in space and time. A time-independent format of Schrödinger's equation can be used in determining the charge-angle correlation function. The Schrödinger equation suggests that the energy probability wavefunction ($E\Psi(x)$) of the electron density cloud's total energy comprises kinetic and potential components. In the equations, E is the electron's total energy, h is the reduced Planck constant ($h/2\pi$), m is the electron's mass, and V is the potential wavefunction of the electron gas cloud. Referring to Equation 2, after solving Schrödinger's equation for E in an enclosed space, the length of L for electrons of state n can define the total energy of the electron density cloud (E). Referring to Equation 3, B is the magnitude of the magnetic field, $\mu_0$ and $\varepsilon_0$ are the magnetic and electrical permeabilities of the space where the wave travels, I is the current, and $\mu_E$ is the electrical flux. Referring to Equation 4, the speed of the electromagnetic wave (V) is inversely proportional to the square root of both permeabilities ($\mu_0$ and $\varepsilon_0$). Referring to Equation 5, the magnitude of the electric field is shown, where h is the Planck's constant and f is the frequency of the light. Referring to Equation 6, the total energy at each medium encompasses potential (U) and kinetic (K) components and elements. In the first medium, where charged particles flow in and out, the total energy can be considered to be a summation of the energies of electron density cloud ($U_1$, $K_1$) and that of the cell membrane ($U'_1$, $K'_1$). Further, the second medium will receive the energy of the refracted light as its total energy ($U_2$). $K_1$ is the kinetic energy of electrons in the electron density cloud of length L. A stationary fluid flow ($K'_1=0$) can be assumed, as can a net constant charge density for the electron gas ($Q_1$), and a net total charge value near the excitable cell's membrane ($Q_2$) due to ion fluxes, which are a constant r distance apart from each other. The electrical potential ($U'_1$) resulting from charge differences between Q1 and Q2 will contribute to the refracted angle in medium 2. Referring to Equation 7, k is Coulomb's constant and c is the dielectric of medium 1 after ions influx, which is empirically extracted for the model. Referring to Equation 8, $\varepsilon_2$ is defined as the dielectric constant of the prism (e.g., BK7 prism) used in the device (e.g., a BI2000 device (Biosensing Instruments, AZ)), with a value of 2.30. On the other hand, the dielectric constant of the medium ($\varepsilon_1$) flowing on top of the sensor surface alters in response to molecular binding events due to the medium's viscosity changes. This variation in the dielectric constant of the medium results in its refractive index (n) to change as well, causing the reflected pseudo-image to shift. Referring to Equation 9, due to Gauss's law, $Q_1$, or the total charge enclosed within volume v of the electron, can be estimated, where d is the radius of the electron cloud (i.e., Bohr radius, 0.529 Å) and the negative sign denotes the nature of the electron density cloud's charge. In the result indicated by the arrow next to Equations 7, 8, and 9, $Q_2$ (in Coulombs (C)) is the total net charge near the cell membrane at each time, and $Q_2$ will show an absolute value for charge distribution near the cell membrane during an action potential event.

Figure 2F:
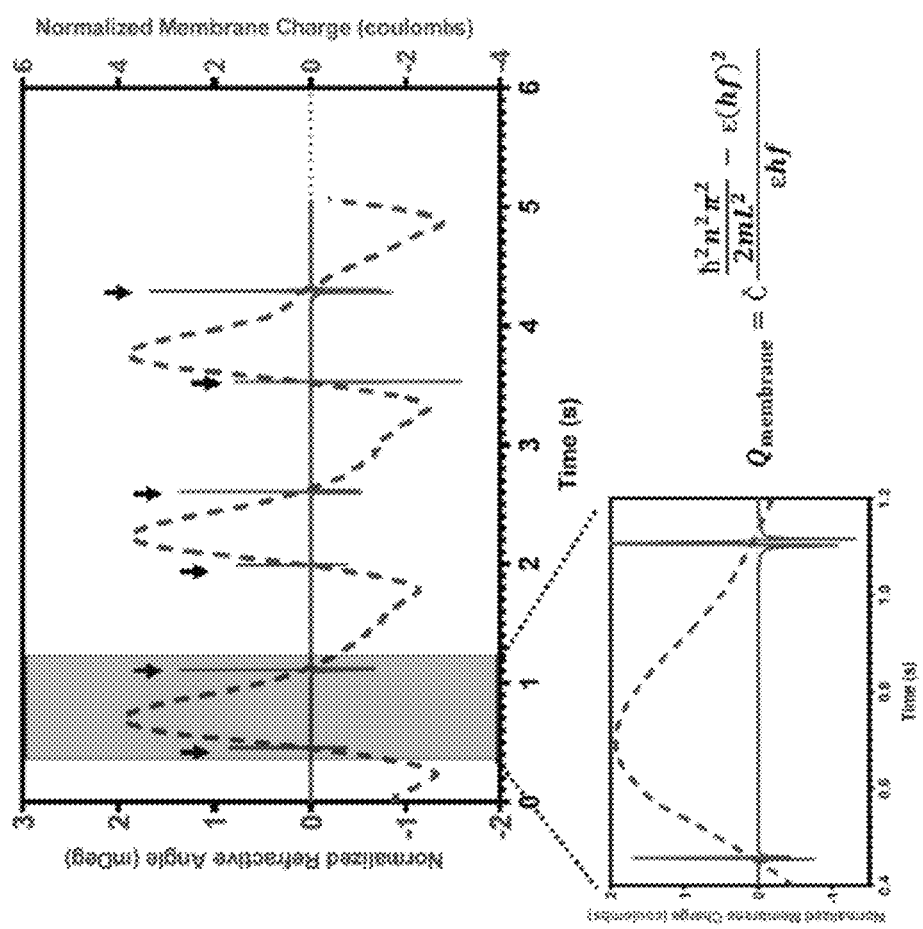
FIG. 2(f) shows a plot of normalized refractive angle (in millidegrees (mDeg)) (left y-axis; dashed curve) and normalized membrane charge (in Coulombs (C)) (right y-axis; solid curve) versus time (in seconds (s)), showing computed charge variation near CM plasma membrane. The shaded area is enlarged in the plot at the lower portion of FIG. 2(f), and the equation for the charge variation is shown to the right of the lower plot.

FIG. 2(f) shows the computed charge variation near a CM plasma membrane. The dashed line is the normalized contraction signal of three periods from tall amplitudes plotted on the left y-axis, and the solid line shows a simulated signal from its corresponding values from the mathematical model shown at the bottom right-hand side of FIG. 2(f).

In an embodiment, a method of analyzing biological cells can comprise providing a device or system as described herein and using according to its normal functions.

Embodiments of the subject invention provide a focused technical solution to the focused technical problem of the complexities that arise when large-scale biological matter (e.g., cells) interact with the quantum scale events of plasmon's resonance. Embodiments of the subject invention improve the sensor by providing additional elements (e.g., the full sensing platform, the fluidic module, and the base).

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Materials and Methods

The device as shown in FIGS. 1(a) and 1(c) was used for experiments and studies. The device had dimensions of 12 cm×7.5 cm×5 cm and had micro LEDs, LED splitters, micro prisms, micro polarizers, and micro detectors that induced plasmonic waveguides and detected changes in the electrical/mechanical activity of a cell membrane. Cellular function of mechanical and electrical origins was filtered and sorted using software in operable communication with the sensing platform, and was then compared to the physiological parameters of a healthy cell. Each gasket had a microfluidic device with microchannels that 6 mm (or about 6 mm) long, 2 mm (or about 2 mm) wide and 0.15 mm (or about 0.15 mm) deep. The hinged cap (fluidic module) had heavy-duty gaskets made from PDMS attached thereto. Micropumps and microtubing on the were used to drive the flow of the cell medium from its attached reservoir. The base of the device acted as a Faraday cage for the micro settings of plasmonic induction and detection, as well as related PCB boards and computer interface connectors of the sensing platform. The refraction index of the prisms was n=2.30 (each prism was a BK7 prism from a BI2000 device (Biosensing Instruments, AZ). The cell-SPR model discussed herein with reference to FIGS. 2(a)-2(f) was used as the cell-SPR model for experiments.

Example 1

Figures 3A, 3B, 3C:
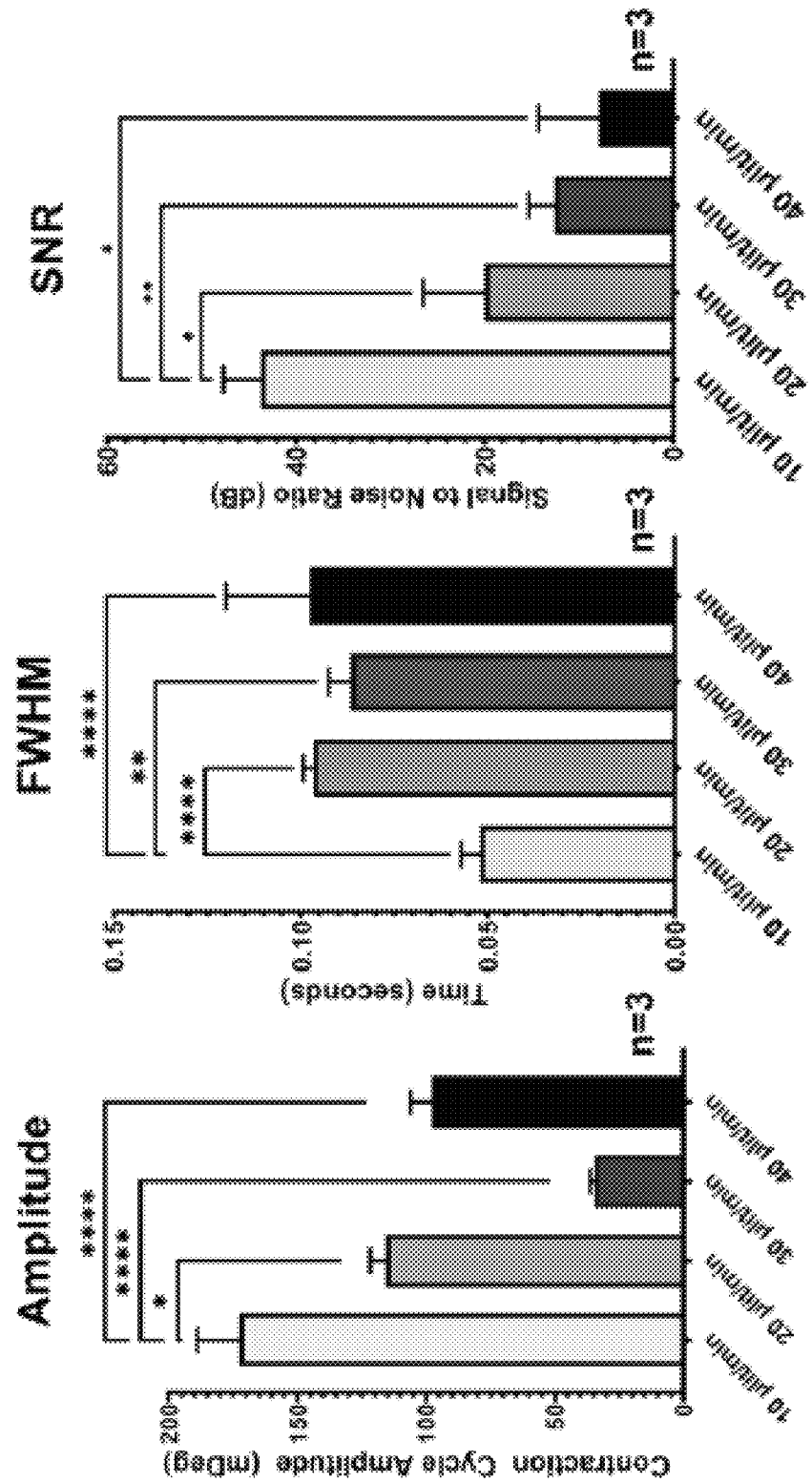
FIG. 3(a) shows a bar chart of contraction cycle amplitude (in mDeg) for different flow rates.
FIG. 3(b) shows a bar chart of full width at half maximum (FWHM) time (in s) for different flow rates.
FIG. 3(c) shows a plot of signal to noise ratio (SNR) (in decibels (dB)) for different flow rates. In each of FIGS. 3(a), 3(b), and 3(c), the left-hand bar is for 10 microliters per minute (μL/min), the second-to-the-left bar is for 20 μL/min, the second-to-the-right bar is for 30 μL/min, and the right-hand bar is for 40 μL/min.
Figure 3D:
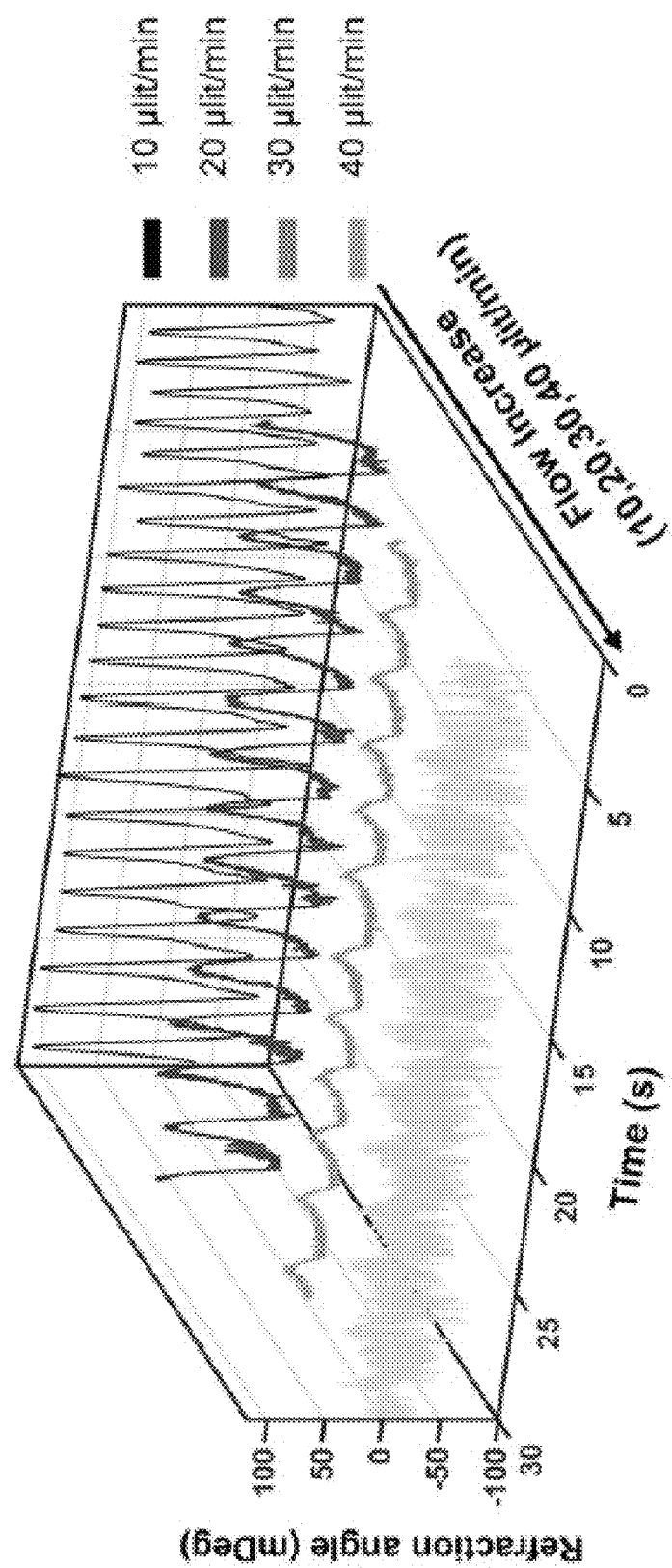
FIG. 3(d) shows a plot of refraction angle (in mDeg) versus time (in s) for different flow rates. The lowest flow rate (10 μL/min) is at the back of the plot, with the flow rate increasing (20 μL/min, then 30 μL/min, then 40 μL/min at the front) towards the front of the plot.

The effects of flow rate on CM contraction profile were examined. FIGS. 3(a)-3(d) show effects of higher flow rates on contraction profile of cultured CM. In FIGS. 3(a) and 3(b), n=3 sensors using Kruskal-Wallis test, p<0.0001, and in FIG. 3(c), n=3 sensors using Brown-Forsythe ANOVA test, p<0.0007. Values of amplitude, FWHM, and SNR of the flow rate of 10 microliters per minute (μL/min) (172.351±16.178, 0.052±0.005, 43.742±3.966 respectively) were significantly different from those of 20 μL/min, 30 μL/min, and 40 μL/min. Referring to FIG. 3(d), a distinctly more potent signal with a higher signal to noise ratio (SNR) was observed for a flow rate of 10 μL/min.

Figures 3E, 3F, 3G:
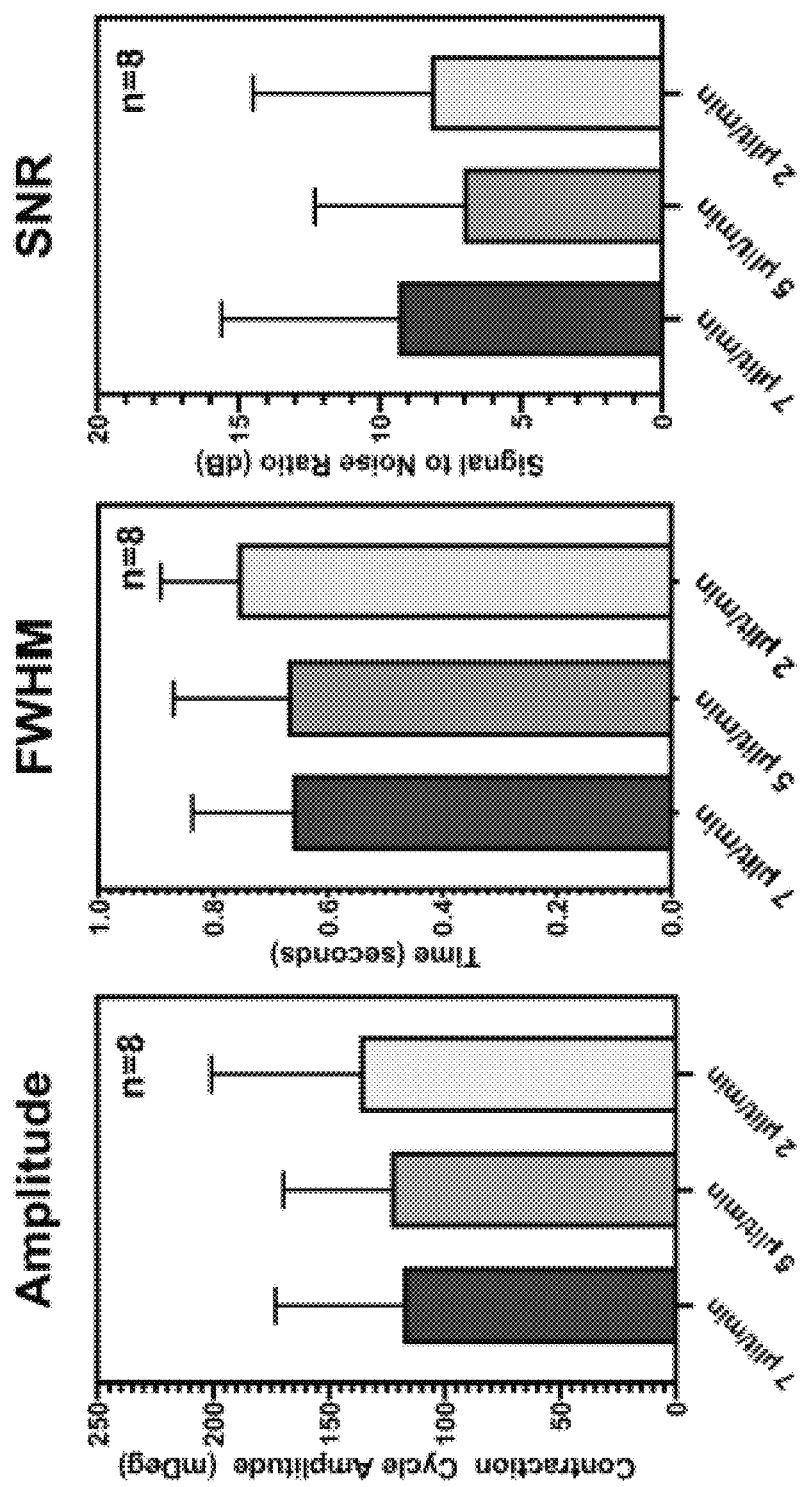
FIG. 3(e) shows a bar chart of contraction cycle amplitude (in mDeg) for different flow rates.
FIG. 3(f) shows a bar chart of FWHM time (in s) for different flow rates.
FIG. 3(g) shows a plot of SNR (in dB) for different flow rates. In each of FIGS. 3(e), 3(f), and 3(g), the left-hand bar is for 7 μL/min, the middle bar is for 5 μL/min, and the right-hand bar is for 2 μL/min.
Figure 3H:
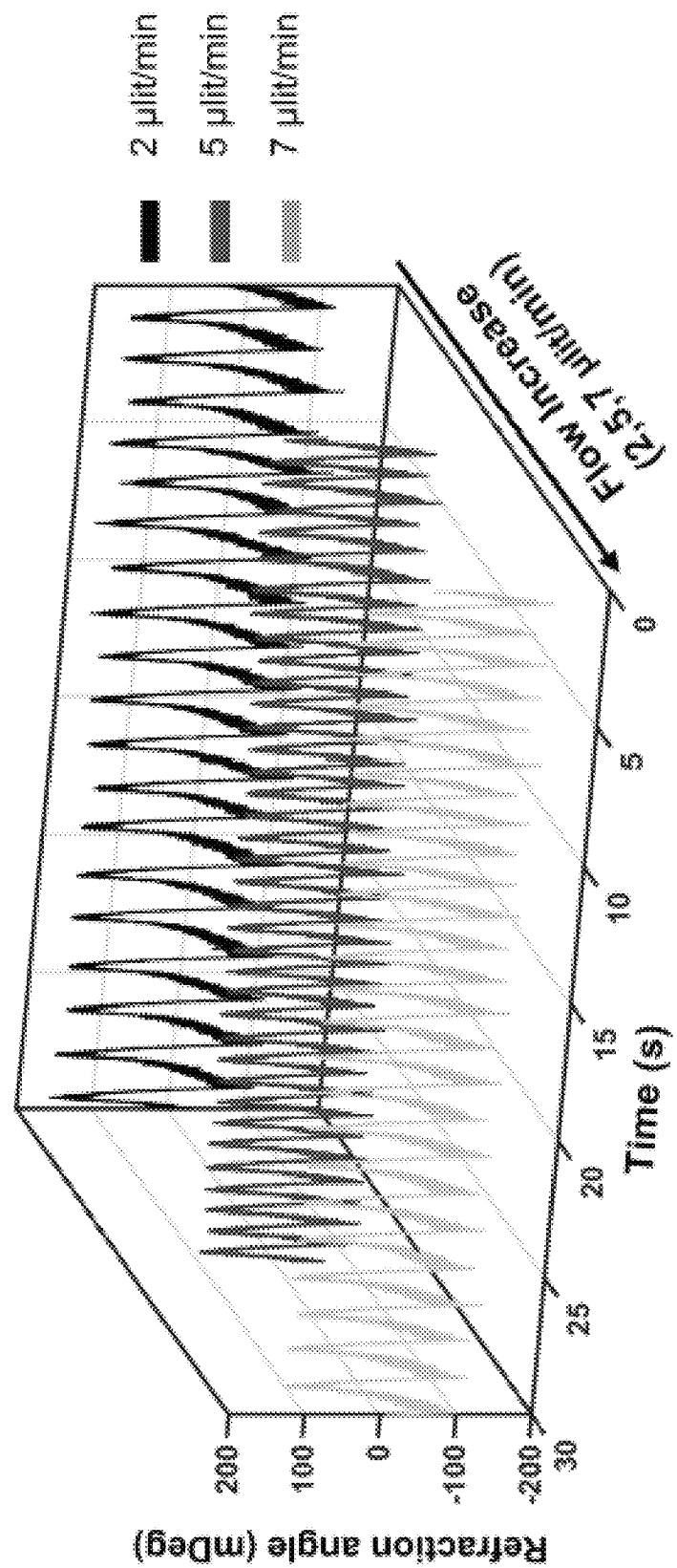
FIG. 3(h) shows a plot of refraction angle (in mDeg) versus time (in s) for different flow rates. The lowest flow rate (2 μL/min) is at the back of the plot, with the flow rate increasing (5 μL/min, then 7 μL/min at the front) towards the front of the plot.
Figures 4A, 4B, 4C, 4D:
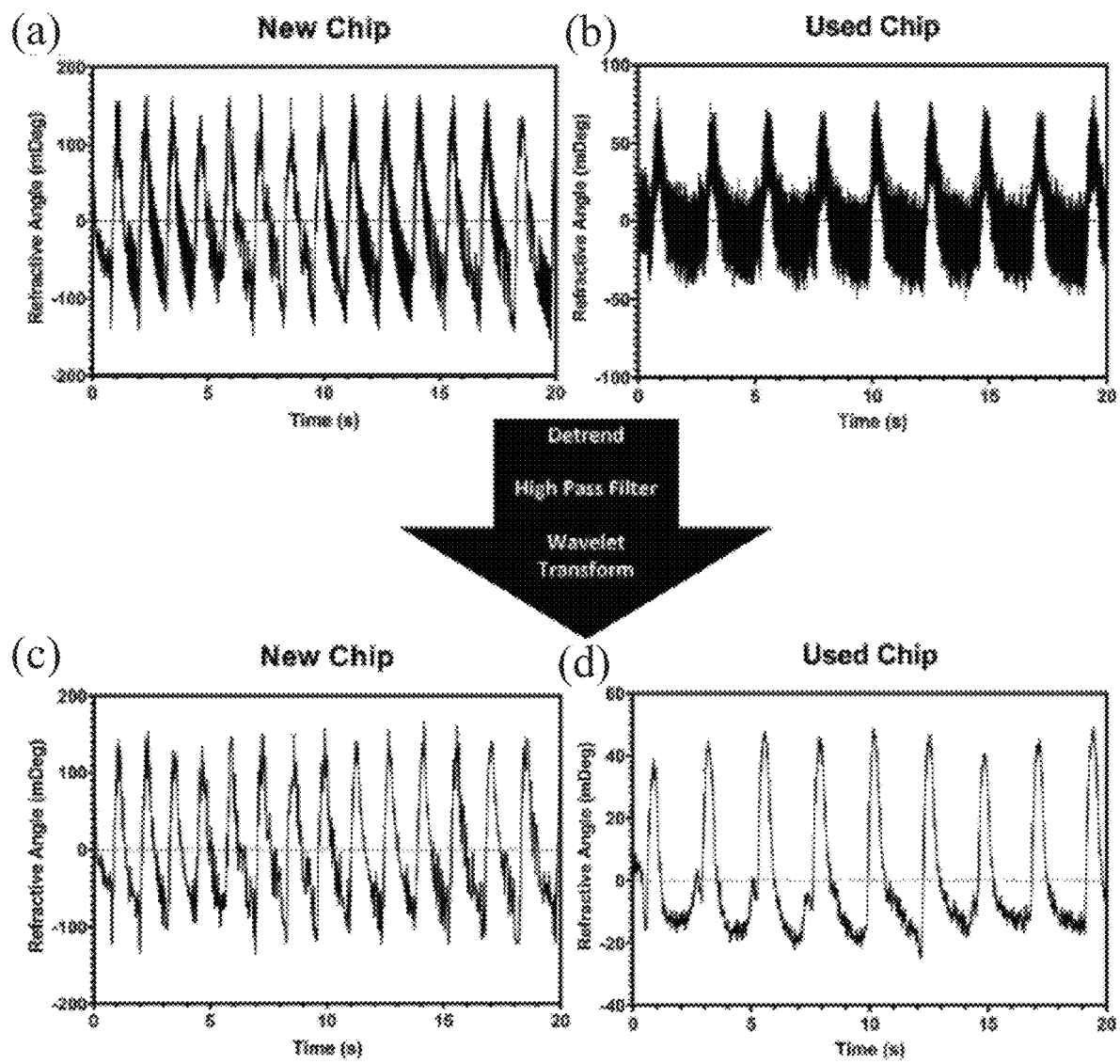
FIG. 4(a) shows a plot of refractive angle (in mDeg) versus time (s) for a new chip.
FIG. 4(b) shows a plot of refractive angle (in mDeg) versus time (s) for a used chip.
FIG. 4(c) shows a plot of refractive angle (in mDeg) versus time (s) for a new chip after detrending, a high pass filter, and a wavelet transform.
FIG. 4(d) shows a plot of refractive angle (in mDeg) versus time (s) for a used chip after detrending, a high pass filter, and a wavelet transform. These figures demonstrate pre-processing of a plasmonic cardio-eukaryography (P-CeG) signal. Though P-CeG signals are utilized for this figure and certain other figures, it is noted that this is for demonstrative purposes only; other types of signals could be used (e.g., a plasmonic neuro-eukaryography (P-NeG) signal).

The effects of flow rates lower than 10 μL/min on contraction profile of cultured CM are shown in FIGS. 3(e)-3(h). In FIGS. 3(e)-3(g), n=8 sensors was used. No significant difference between signal features of 2 μL/min, 5 μL/min, and 7 μL/min flow rate was observed (using one-way ANOVA test, p<0.05). High standard deviation values were due to sensor variability of signal output. Referring to FIG. 3(h), a slight decrease in signal amplitude was observed as the flow increased, which is insignificant.

Example 2

An analysis of P-CeG signals was performed. FIGS. 4(a)-4(d) show pre-processing (detrending, high pass filter, wavelet transform) effects on a new chip and a used chip, where the term chip refers to a system-on-a-chip sensing platform (including the circuit substrate and all items disposed thereon (see FIGS. 1(a) and 1(c) and the accompanying description herein)). The pre-processing can be performed on any chip before sensing, if desired.

Figure 5A:
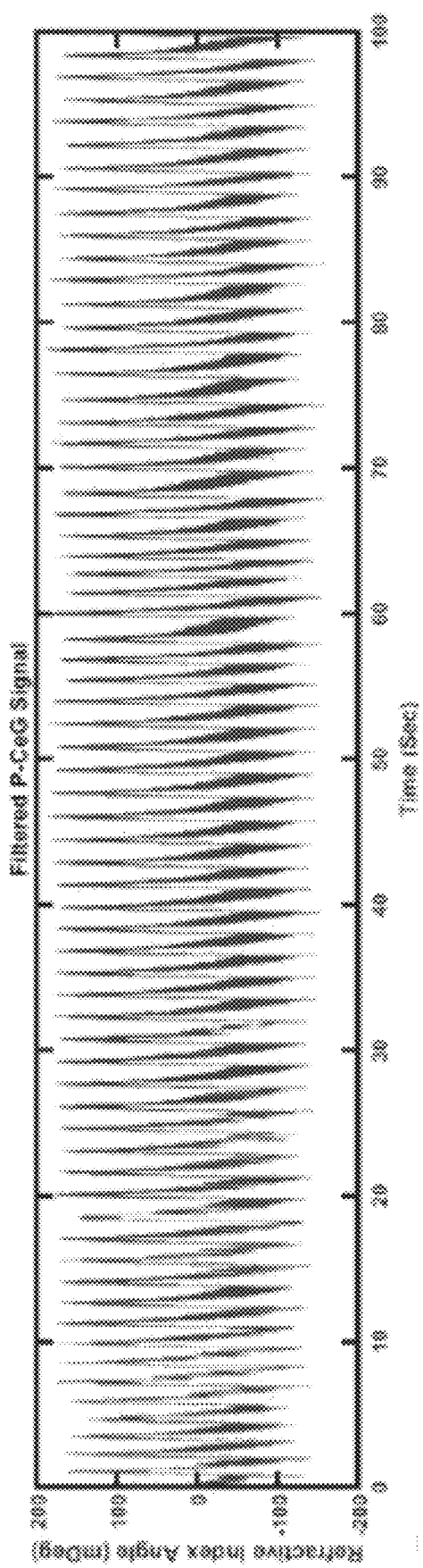
FIG. 5(a) shows a plot of refractive index angle (in mDeg) versus time (in s) for a filtered P-CeG signal.
Figure 5B:
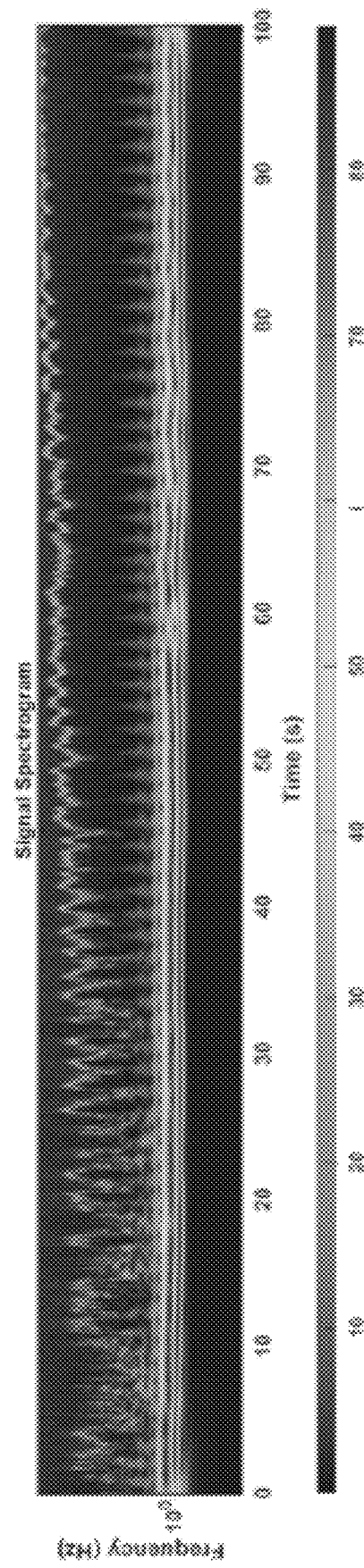
FIG. 5(b) shows a plot of frequency (in Hertz (Hz)) versus time (s) for the signal.
Figure 5C:
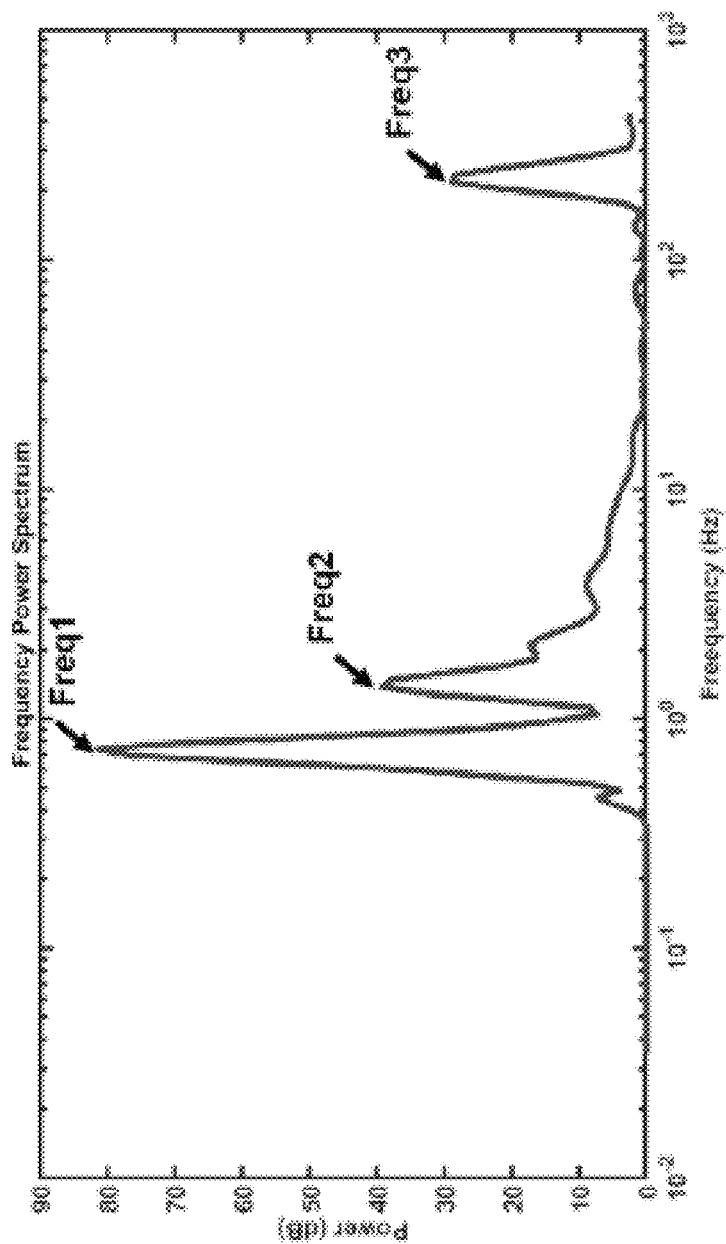
FIG. 5(c) shows a plot of power (in dB) versus frequency (in Hz) for the signal.
Figure 5D:
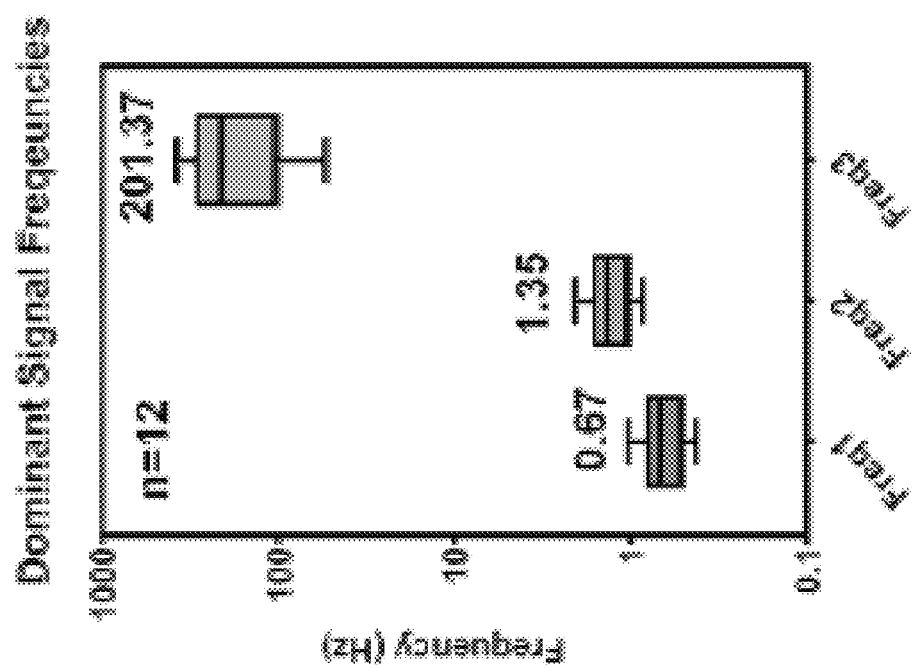
FIG. 5(d) shows a plot of frequency value (in Hz) for different frequencies of the signal, showing dominant signal frequencies.

FIGS. 5(a)-5(d) show results of a P-CeG signal complexity analysis using short-time Fourier transform (STFT). Referring to FIG. 5(a), the detrended P-CeG signal with its removed wandering baseline of a sample CM-cultured gold sensor is shown. FIG. 5(b) shows the spectrogram STFT of the signal shown from FIG. 5(a). The color bar shows the potency of each frequency in decibels (dB). FIG. 5(c) shows the signal's most prevalent frequencies detected using the Fourier transform of the signal. In FIG. 5(d), Freq1=0.67±0.20 Hertz (Hz), Freq2=1.35±0.39 Hz, and Freq3=201.37±103.31 Hz (mean±standard deviation) of n=12 sample CM-cultured gold sensors are graphed. A high variation in Freq3's standard deviation and its high value of about 200 Hz suggests the source of this frequency to be signal noise.

Figure 6A:
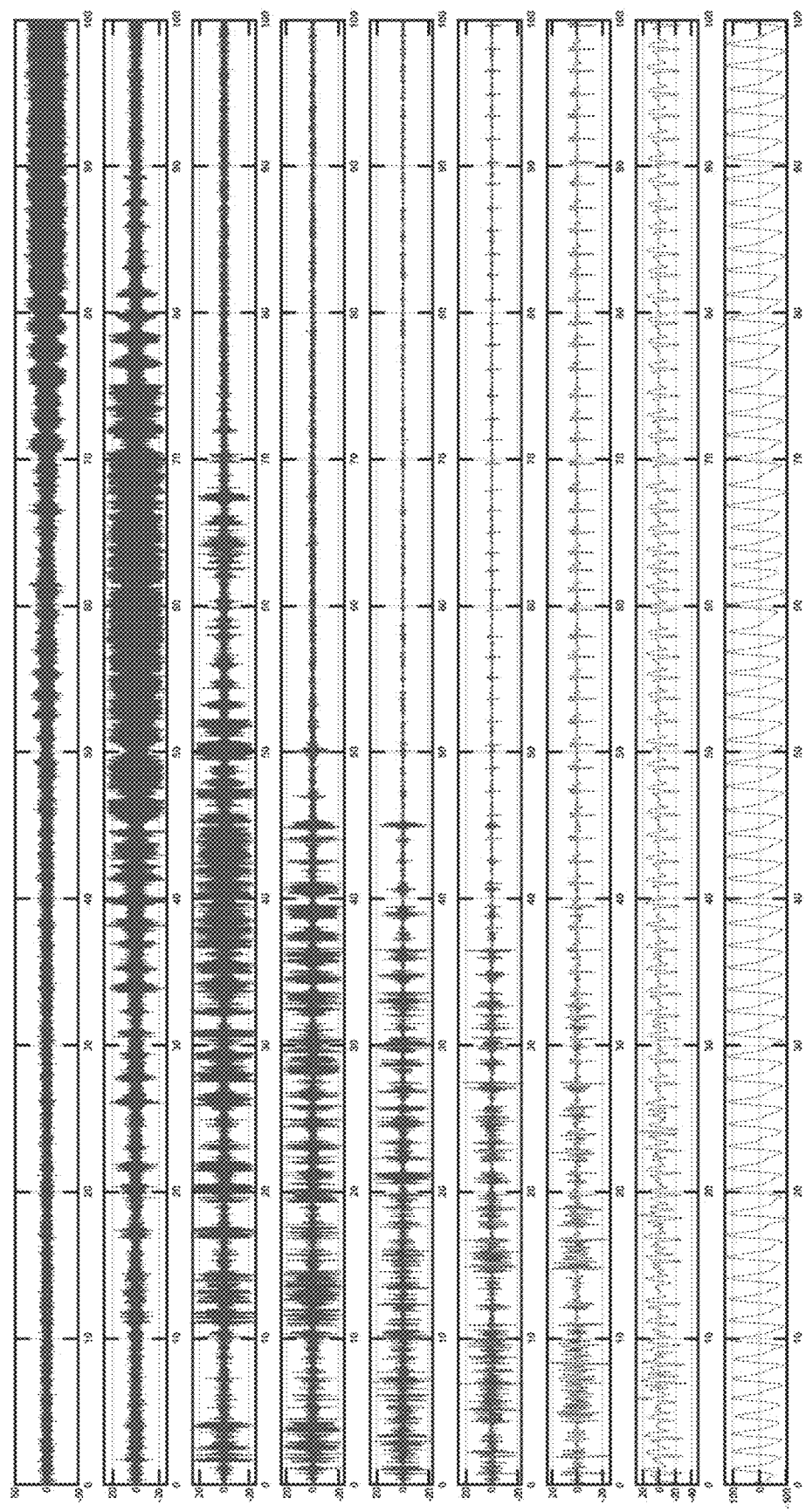
FIG. 6(a) shows a plot of refractive angle (in mDeg) versus time (in s), showing a wavelet decomposition for a sample P-CeG signal.
Figures 6B, 6C:
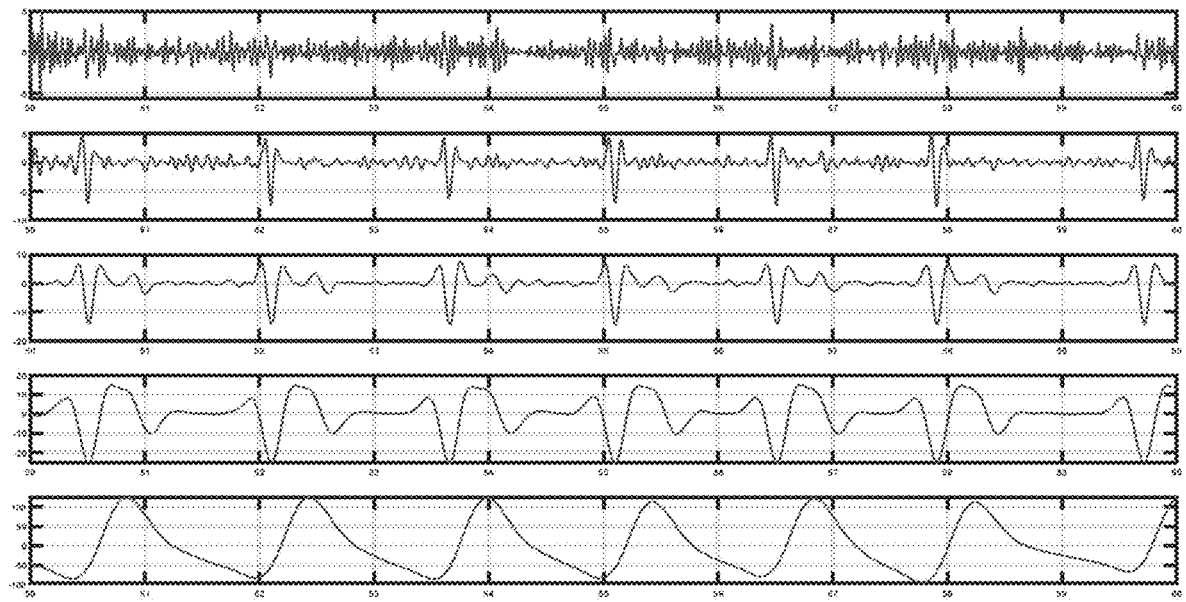
FIG. 6(b) shows and enlargement of the shaded box in FIG. 6(a)
FIG. 6(c) shows a table of levels, frequencies, and relative energies for the signal.

FIGS. 6(a)-6(c) show wavelet decomposition of a P-CeG sample signal. FIG. 6(a) shows results of orthogonal wavelet decomposition of 8 levels (from top to bottom, 1 to 8, respectively) are shown. The first four levels show a noisy activity within the signal, which alters with no distinguishable pattern. FIG. 6(b) shows an expansion of the shaded block from FIG. 6(a), showing levels 5 through 8 of signal decomposition between 50- and 60-second timepoints. The approximate reconstruction of the denoised graph is depicted in the bottom graph as the summation of the four levels illustrated in the graphs above it (levels 5-8). FIG. 6(c) shows a table of a range of frequencies in each signal's decomposition level with their corresponding energy level. The relatively higher energy level of high-frequency events (levels 1 and 2) might be correlated with signal noise, which is removed in Example 3.

Example 3

Figure 7A:
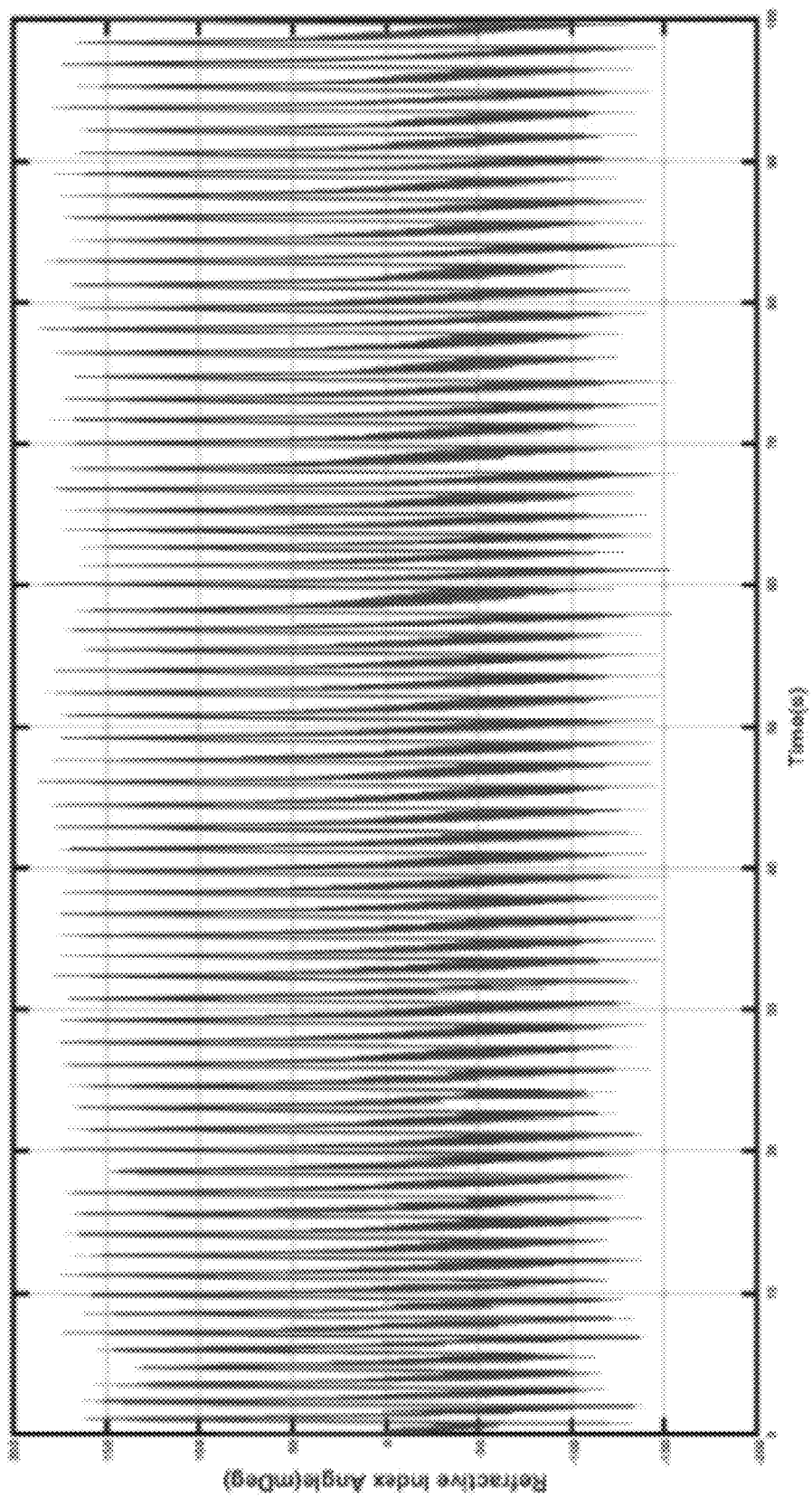
FIG. 7(a) shows a plot of refractive index angle (in mDeg) versus time (in s) for a denoised P-CeG signal.
Figure 7B:
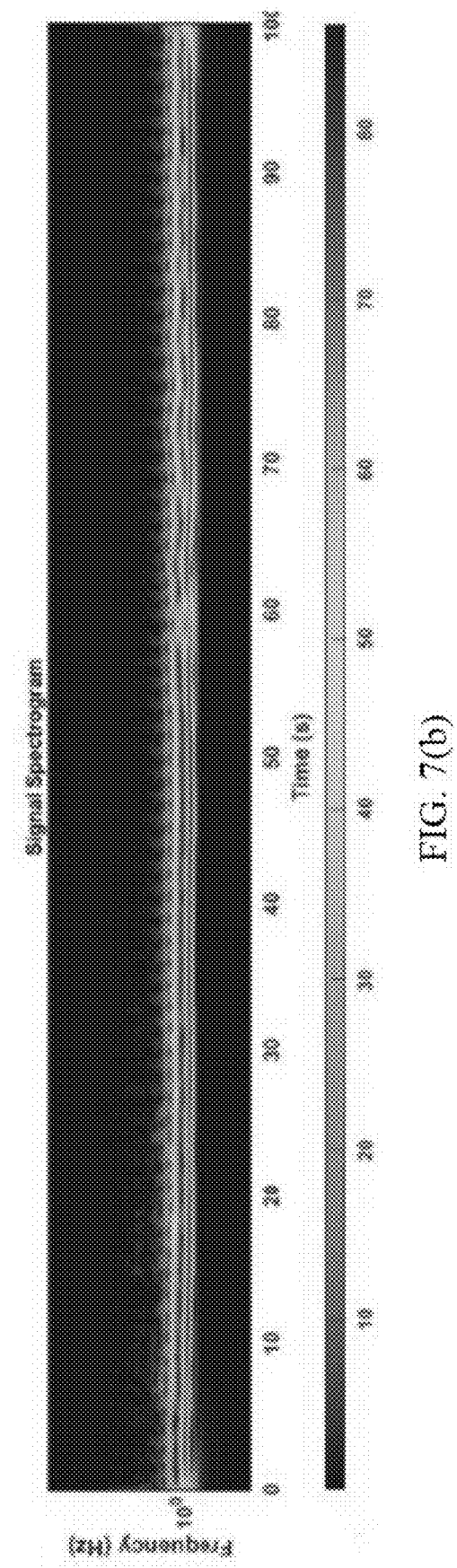
FIG. 7(b) shows a plot of frequency (in Hz) versus time (s) for the signal.
Figure 7C:
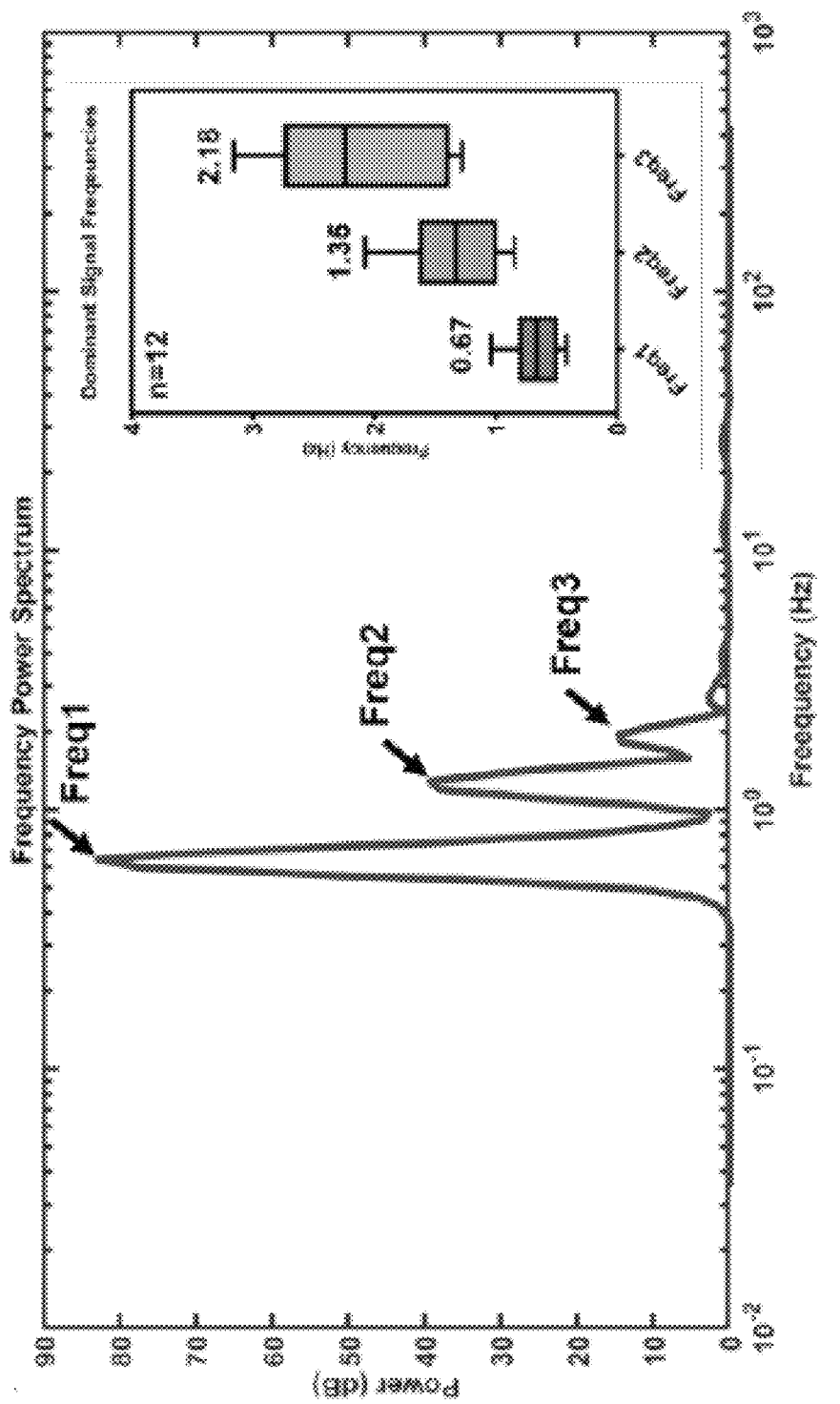
FIG. 7(c) shows a plot of power (in dB) versus frequency (in Hz) for the signal.

Noise reduction was performed on a P-CeG signal. FIGS. 7(a)-7(c) shows results for the denoised signal using wavelet transforms analyzed for complexity. FIG. 7(a) shows the reconstructed signal after wavelet decomposition overlayed on the original dataset. FIG. 7(b) shows the STFT of the sample signal. The color bar shows a range of frequencies' potencies in dB. FIG. 7(c) shows updated predominant frequencies present in the sample P-CeG signal from contracting CMs. The box plot depicts the mean and standard deviation of the three frequency values for the n=12 CM-cultured gold sensors (mean±standard deviation, Freq1=0.67±0.20 Hz, Freq2=1.35±0.39 Hz, and Freq3=2.18±0.67 Hz).

Example 4

Figure 8A:
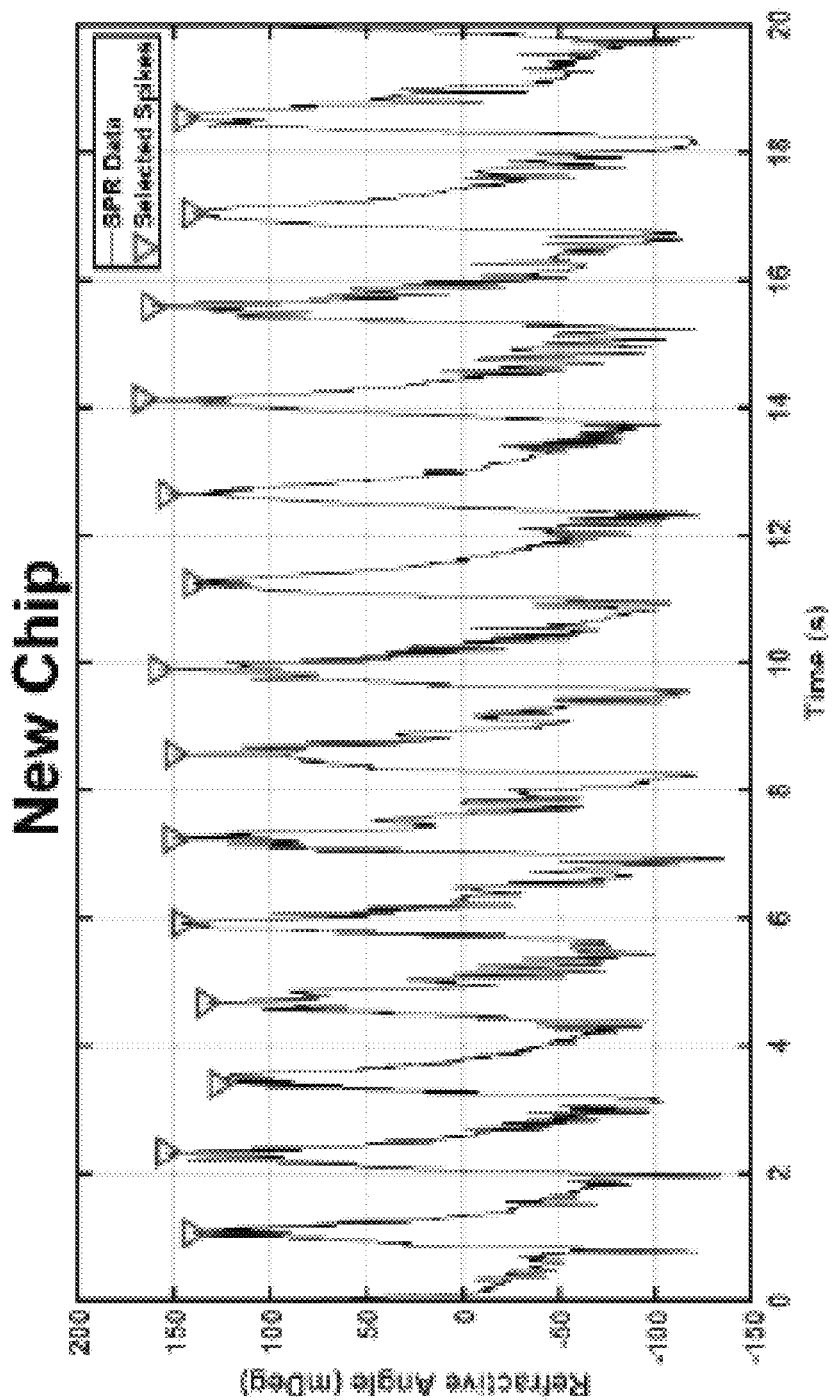
FIG. 8(a) shows a plot of refractive angle (in mDeg) versus time (in s) for a new chip.
Figure 8B:
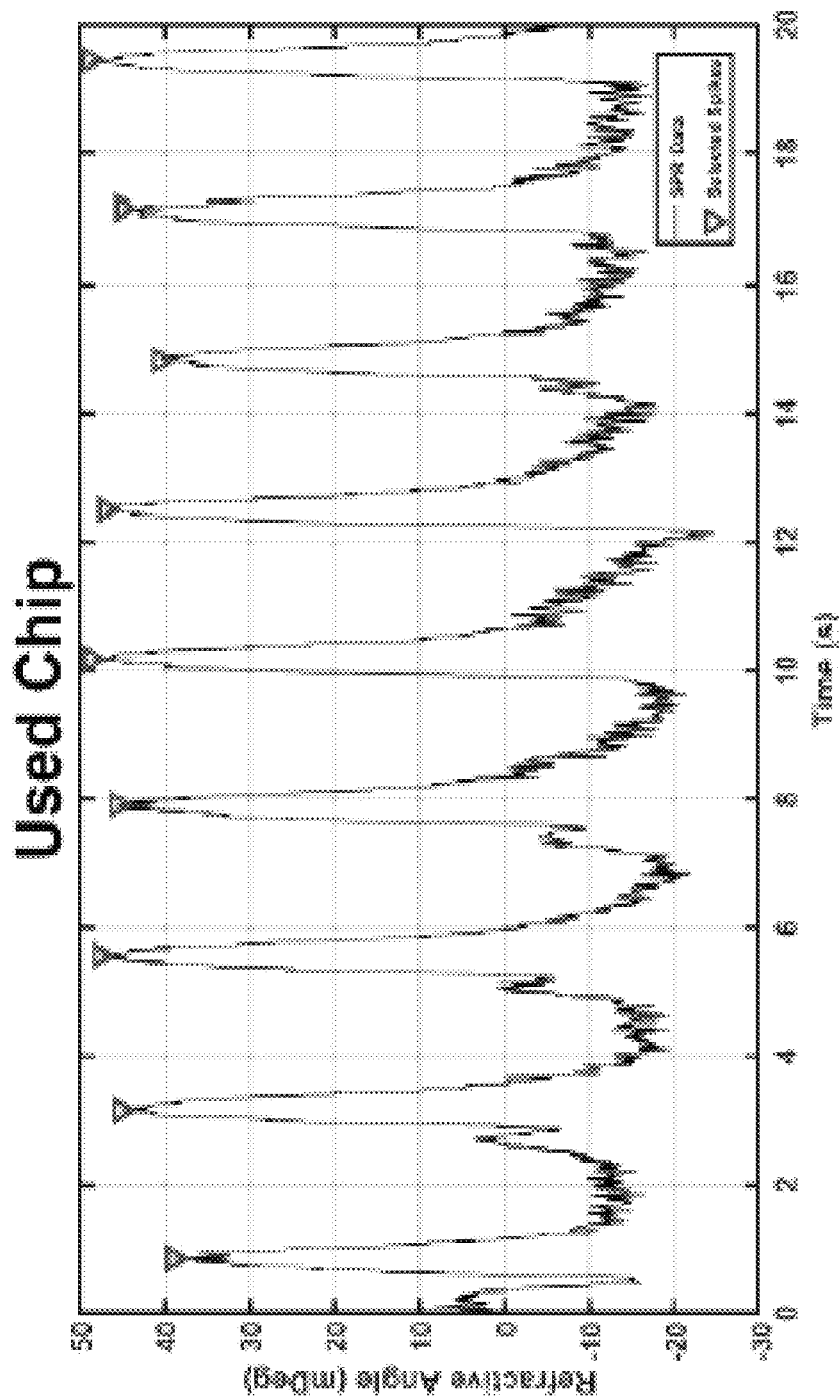
FIG. 8(b) shows a plot of refractive angle (in mDeg) versus time (in s) for a used chip. In both FIG. 8(a) and FIG. 8(b), the triangles indicate selected spikes and the curves themselves are SPR data.
Figure 9A:
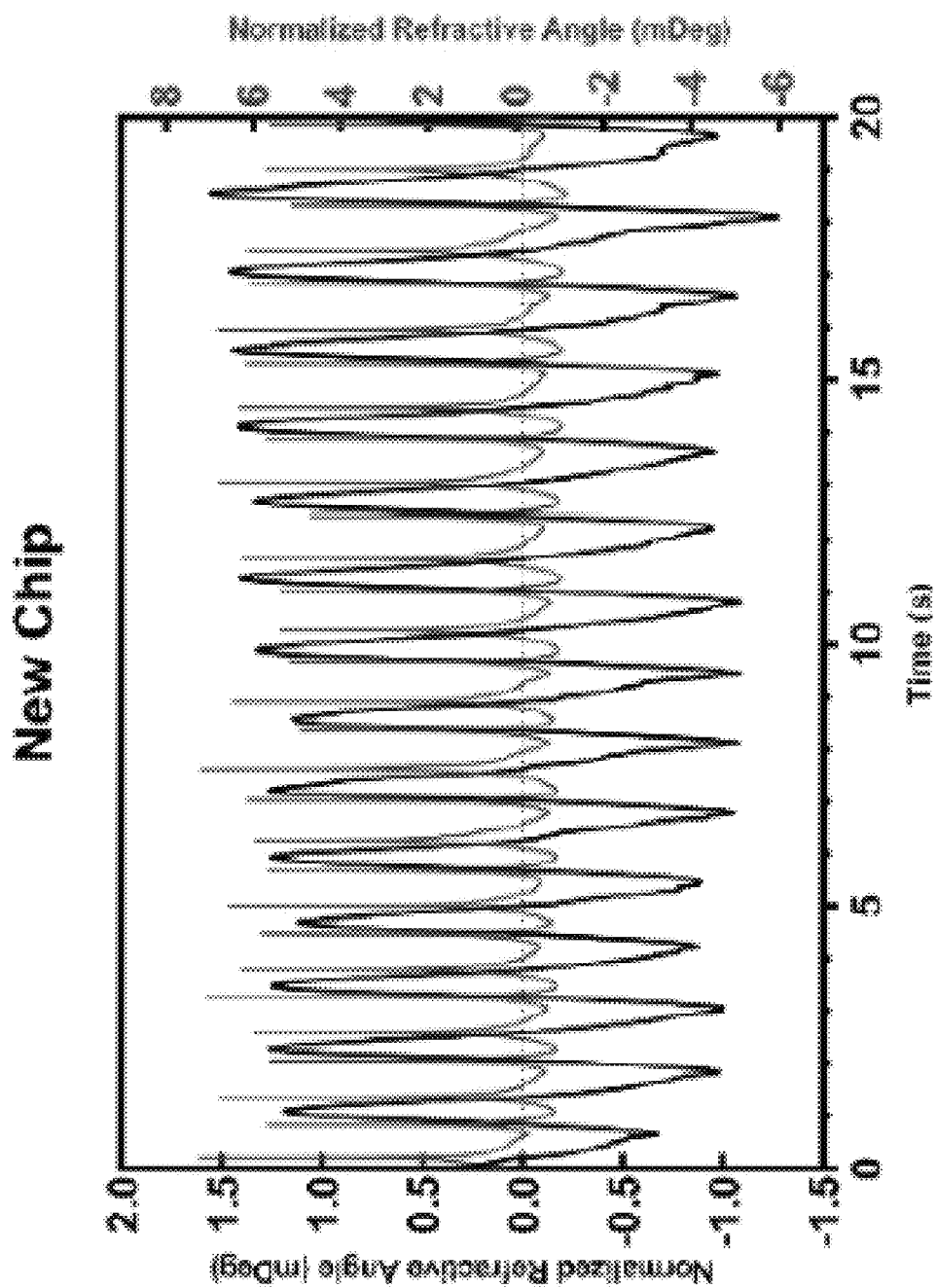
FIG. 9(a) shows a plot of normalized refractive angle (in mDeg) of a P-CeG signal after pre-processing (left y-axis; curve that has all the lower peaks) and normalized refractive angle (in mDeg) of a sample P-CeG signal (right y-axis; curve with lower peaks just below zero) versus time (in s) for a new chip.
Figure 9B:
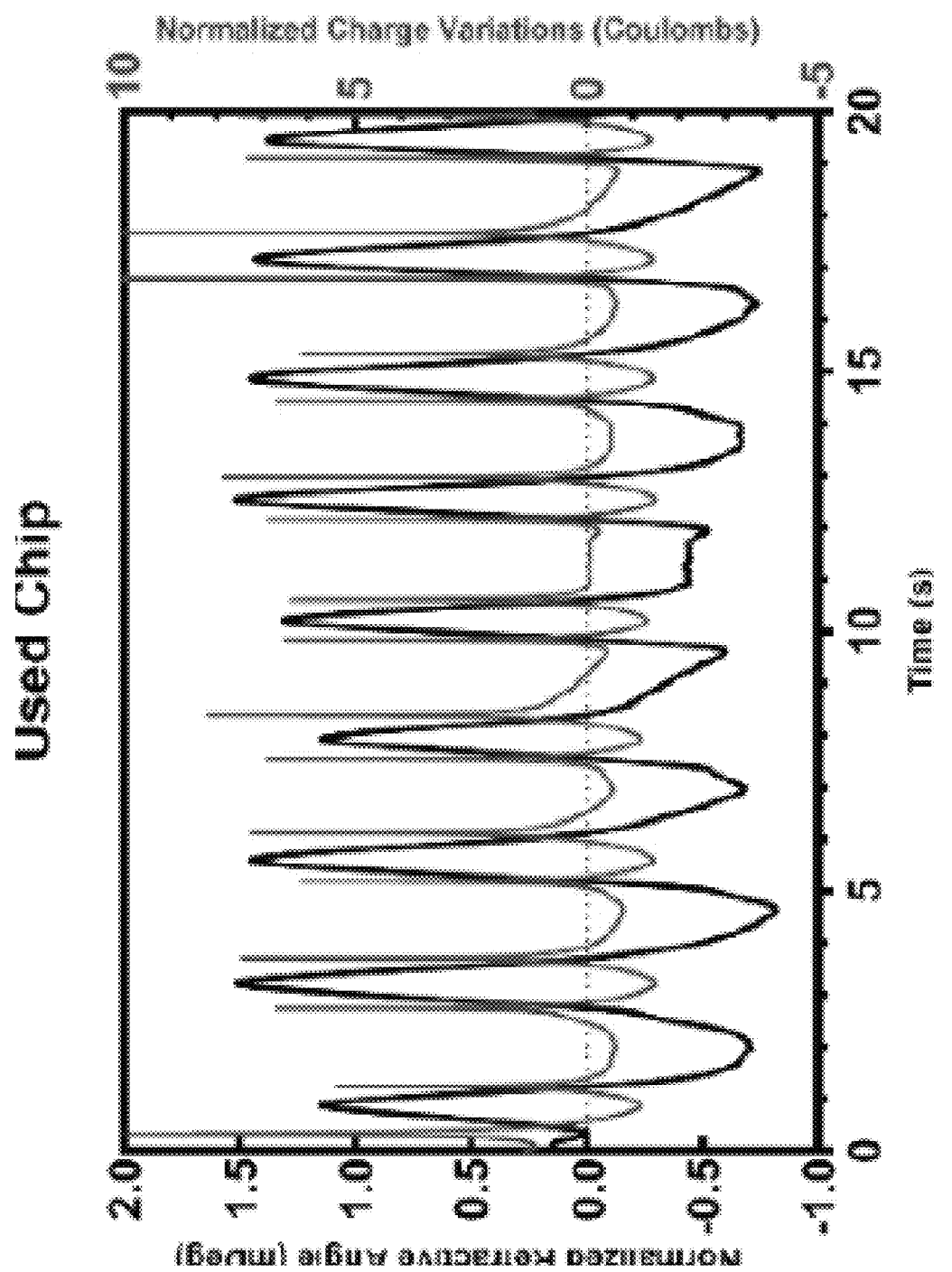
FIG. 9(b) shows a plot of normalized refractive angle (in mDeg) of a P-CeG signal after pre-processing (left y-axis; curve that has all the lower peaks) and normalized refractive angle (in mDeg) of a sample P-CeG signal (right y-axis; curve with lower peaks just below zero) versus time (in s) for a used chip.
Figure 9C:
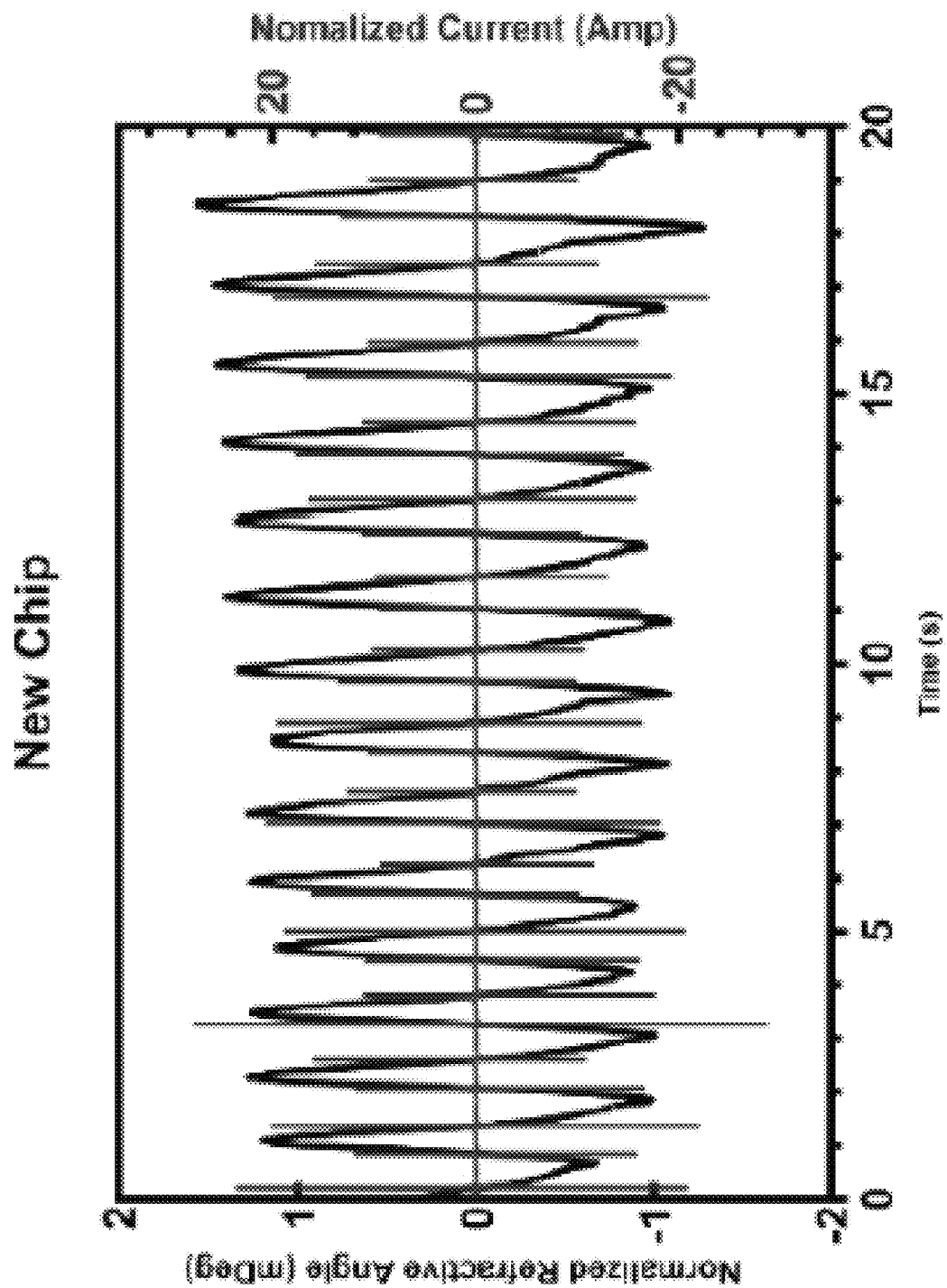
FIG. 9(c) shows a plot of normalized refractive angle (in mDeg) of a P-CeG signal after pre-processing (left y-axis; curve with the highest peak at time of ~19 s) and normalized current (in Amperes (A)) of a sample P-CeG signal (right y-axis; curve with the lowest peak at time of ~3 s) versus time (in s) for a new chip.
Figure 9D:
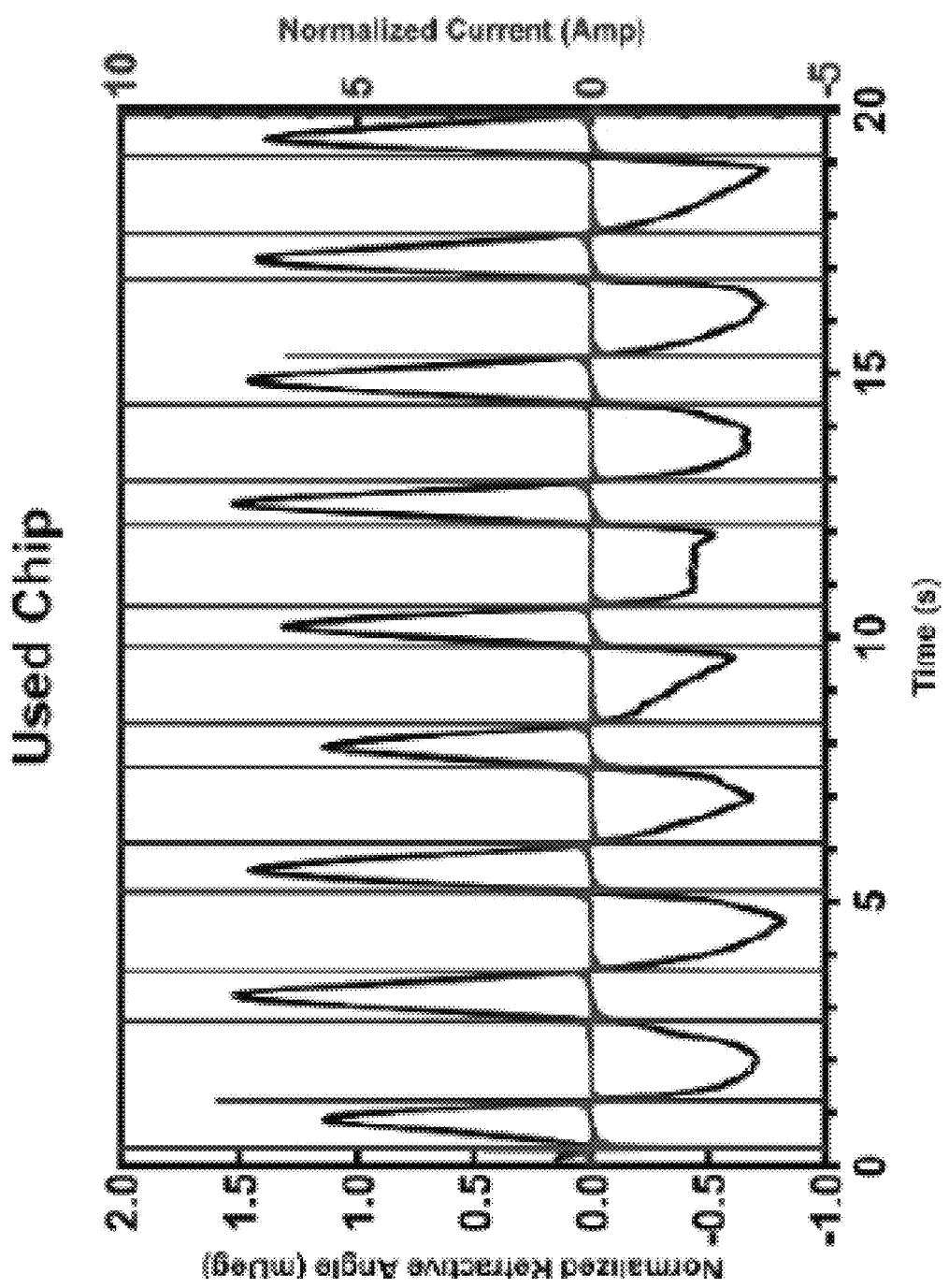
FIG. 9(d) shows a plot of normalized refractive angle (in mDeg) of a P-CeG signal after pre-processing (left y-axis; curve that stays within the plot) and normalized current (in Amperes (A)) of a sample P-CeG signal (right y-axis; curve with peaks that go off the plot) versus time (in s) for a used chip.

Feature Extraction was performed, with byproducts. FIGS. 8(a) and 8(b) show SPR data and selected spikes (triangles in the plots) for a new chip and a used chip, respectively. FIGS. 9(a) and 9(b) show the charge variations near the cell membrane of CMs cultured on new and used sensors, respectively. The P-CeG signal after pre-processing is also shown. FIGS. 9(c) and 9(d) show the derivative of charge variations, which correspond to the current flow within the enclosed space between the cell membrane and the sensor of new and used chips, respectively.

Example 5

Figure 10A:
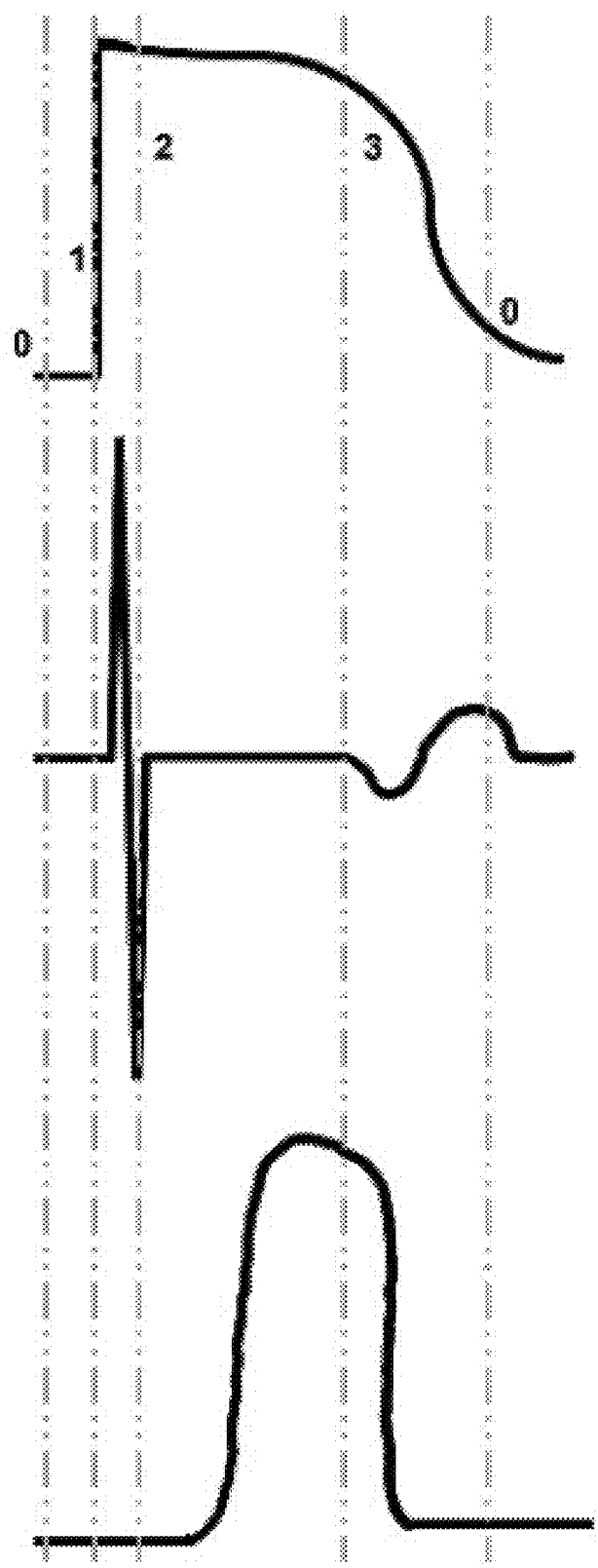
FIG. 10(a) shows plots depicting the four phases in a CM's action potential, field potential, and force of contraction profile (top to bottom, respectively) over time.
Figure 10D:
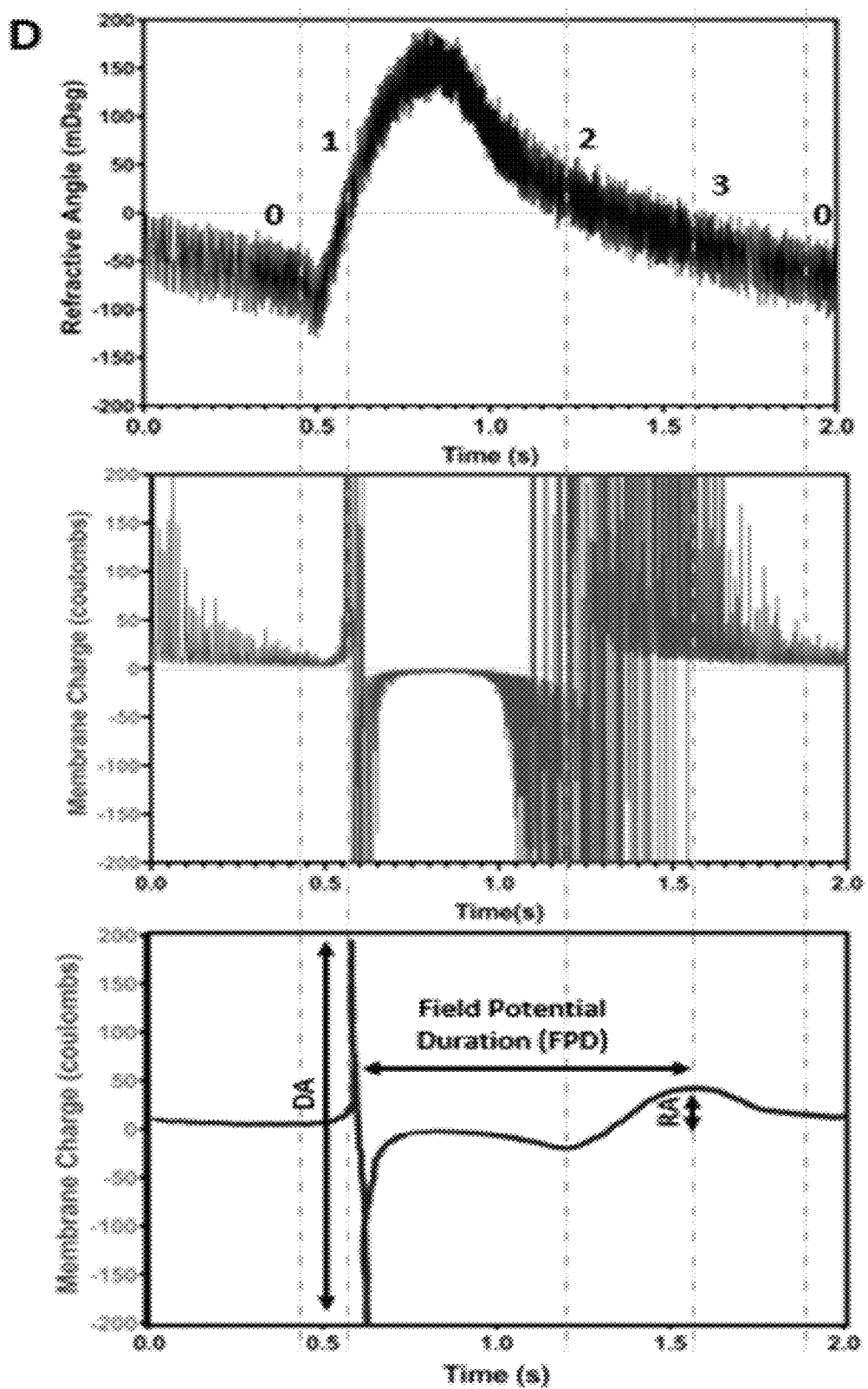
FIG. 10(d) shows a plots of refractive angle (in mDeg), membrane charge (in C), and field potential (in V) (from top to bottom, respectively), all versus time (in s) for a single period of a P-CeG signal. DA and RA stand for depolarization amplitude and repolarization amplitude, respectively.
Figure 10E:
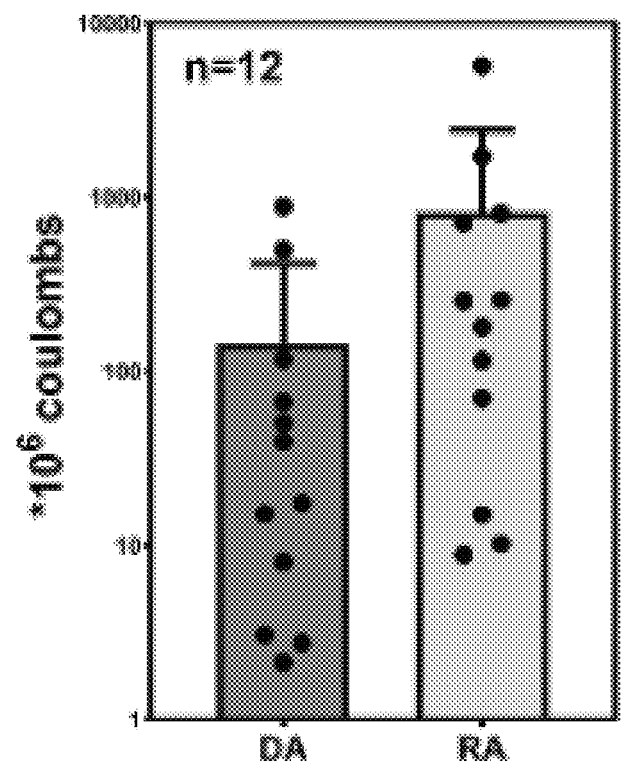
FIG. 10(e) shows a bar chart of membrane charge (in $10^6$ C) for depolarization amplitude (DA) and repolarization amplitude (RA).
Figure 10F:
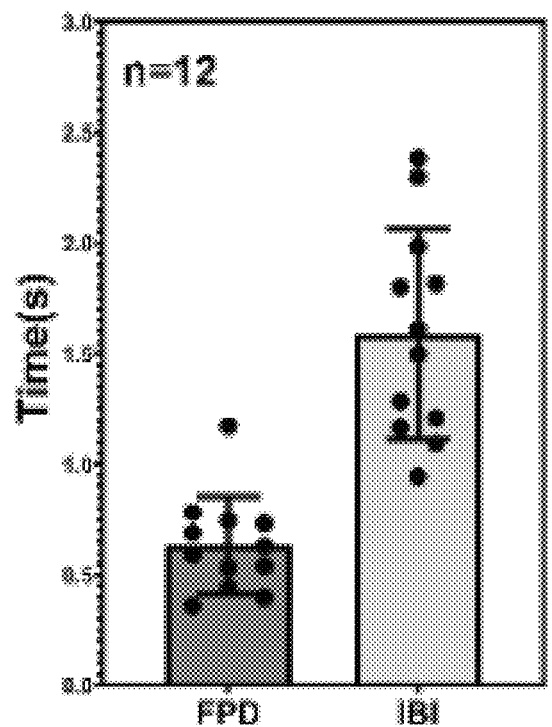
FIG. 10(f) shows a bar chart of time (in s) for field potential duration (FPD) and inter-beat interval (IBI).

Empirical P-CeG data was correlated to the mathematical model of charge distribution near CM's cell membrane. FIG. 10(a) illustrates the four phases in a CM's action potential, field potential, and force of contraction profile (top to bottom, respectively) over time. The dashed vertical lines show phases 0, 1, 2, and 3 of the CM's electromechanical activities. FIG. 10(b) shows raw data of the P-CeG signal in millidegree (mDeg) changes of refractive angle of light, as well as the corresponding charge variations near the CM cell membrane (right y-axis) in megacoulombs ($10^6$ C). Values were extracted using equations from the cell-SPR model. FIG. 10(c) shows an expansion of the shaded block in FIG. 10(b), where the charge variations are graphed (left y-axis), with a manual curve-fitting of the possible field potential near the cell membrane (right y-axis). FIG. 10(d) shows, from top to bottom: a single period of the P-CeG signal; its corresponding charge variations; and an illustration of the possible corresponding field potential. Arrows from left to right in the bottom graph depict the depolarization amplitude (DA), field potential duration (FPD), and the repolarization amplitude (RA) as the main features of a CM's field potential. These are also elaborated on in FIG. 10(e) and FIG. 10(f).

Example 6

Figures 11A, 11B, 11C, 11D, 11E, 11F:
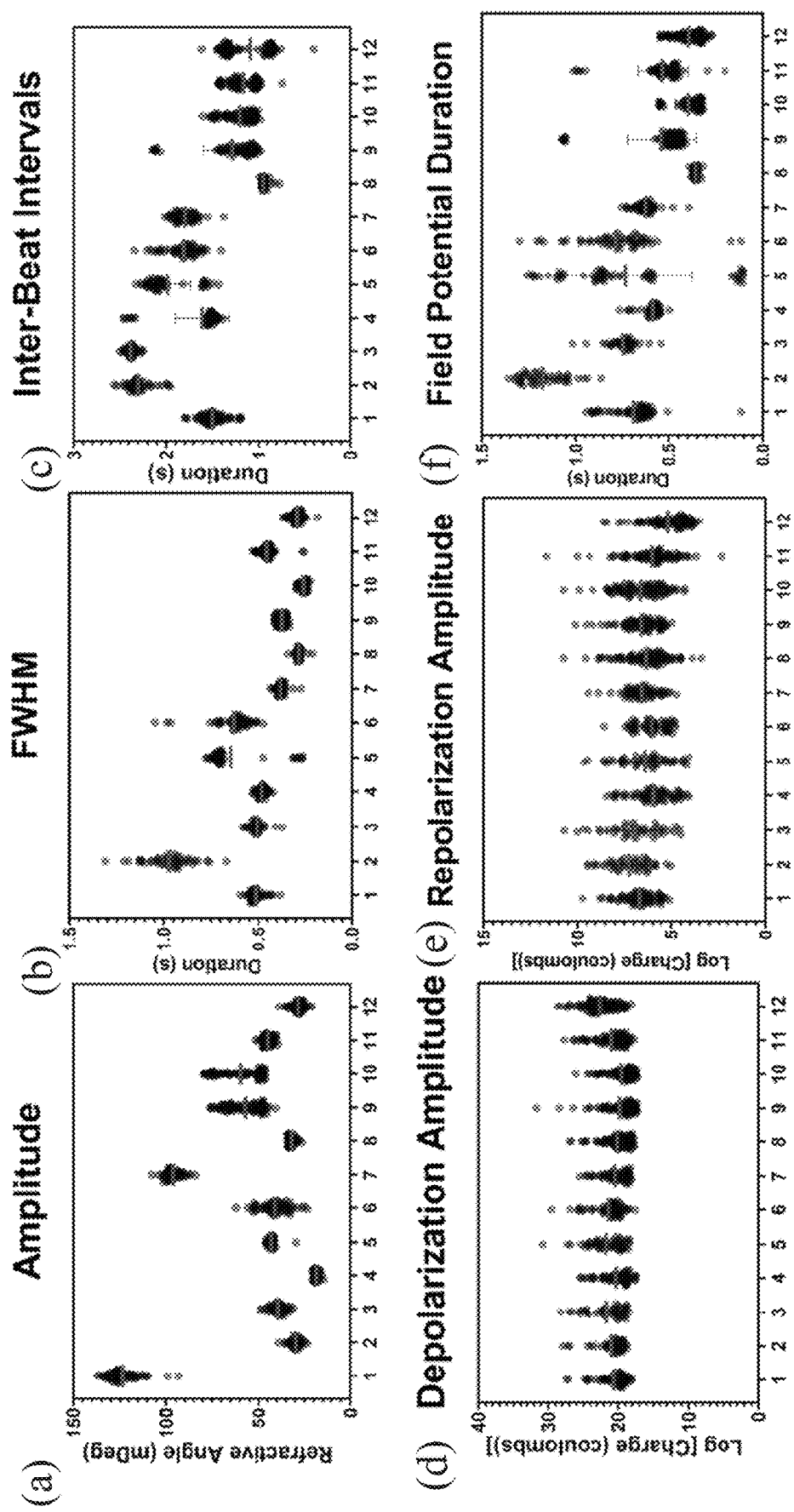
FIG. 11(a) shows a plot of refractive angle (in mDeg)
FIG. 11(b) shows a plot of FWHM duration (in s)
FIG. 11(c) shows a plot of IBI duration (in s)
FIG. 11(d) shows a plot of log[charge (in C)] for DA.
FIG. 11(e) shows a plot of log[charge (in C)] for RA.
FIG. 11(f) shows plot of field potential duration (in s). In each of FIGS. 11(a)-11(f), the plot is for 12 different CM-cultured gold sensors. The values in FIGS. 11(a)-11(c) were obtained for a 100-second epoch from a P-CeG signal obtained from each sensor. The values in FIGS. 11(d)-11(f) were obtained from the charge profiles of the contracting CMs.
Figure 12:
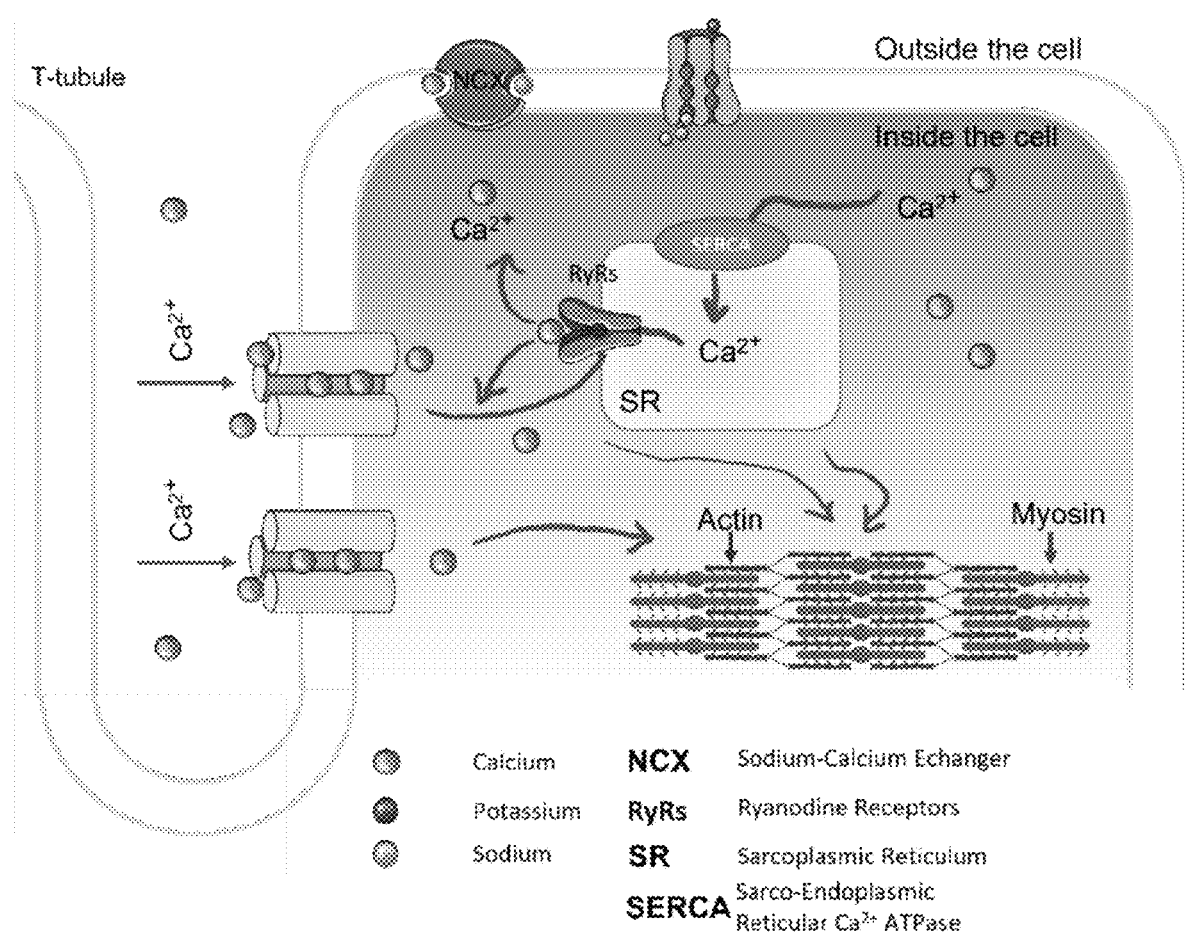
FIG. 12 shows a schematic view of relevant calcium signaling pathways of CMs.

Feature extraction was performed on a P-CeG signal and its correlated charge profile of contracting CMs. FIGS. 11(a), 11(b), and 11(c) show amplitude, full width at half maximum (FWHM), and inter-beat intervals (IBI), respectively, for a 100-second epoch from the P-CeG signal obtained from 12 CM-cultured gold sensors. The high variability of values across different sensors is due to the selected methodology for cell isolation and non-ideal experimental conditions (room temperature and without $CO_2$). FIGS. 11(d), 11(e), and 11(f) show DA, RA, and FPD of contracting CMs obtained from their charge profile.

Example 7

Figure 13A:
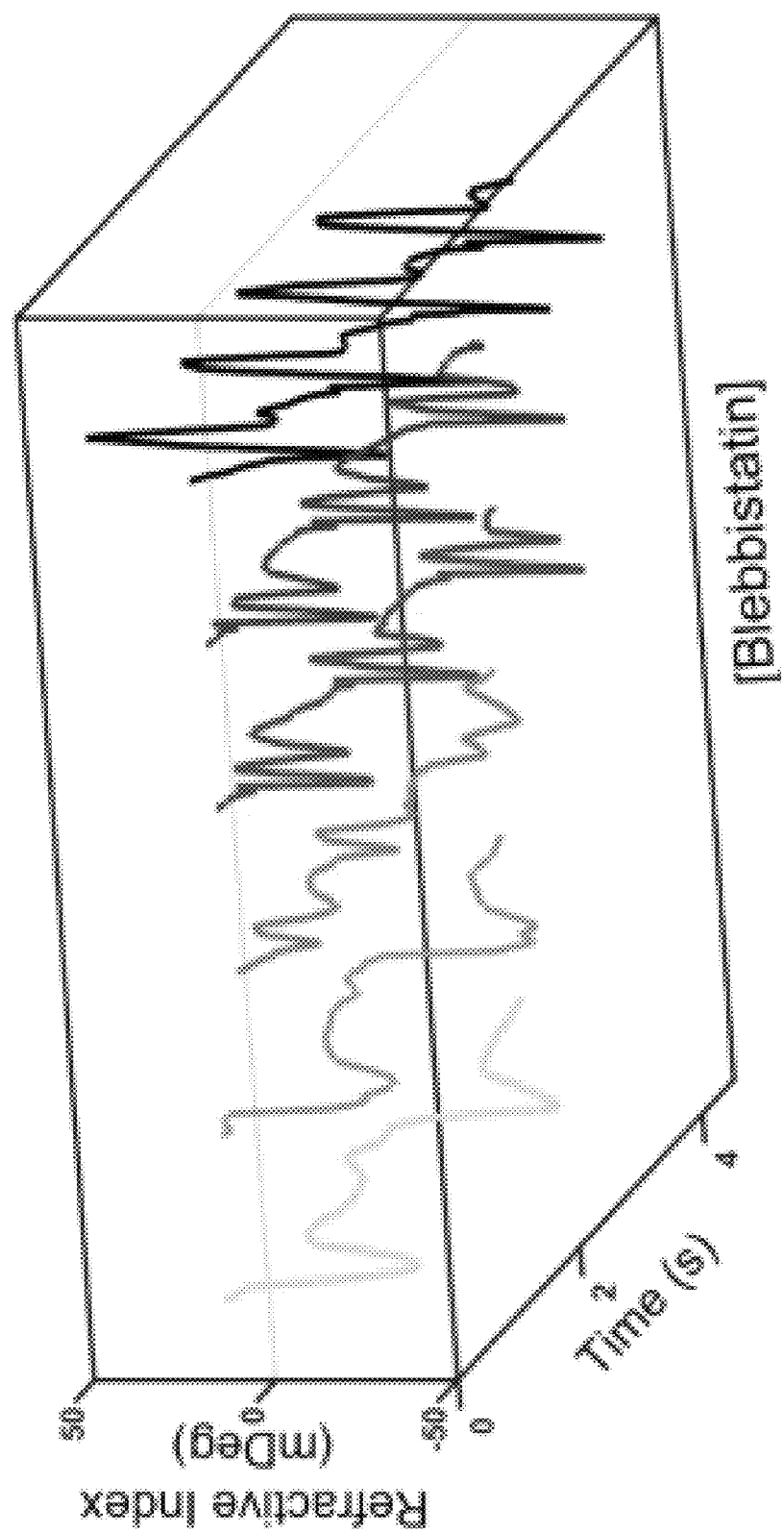
FIGS. 13(a)-13(m) show results of an experiment using blebbistatin.
Figure 13B:
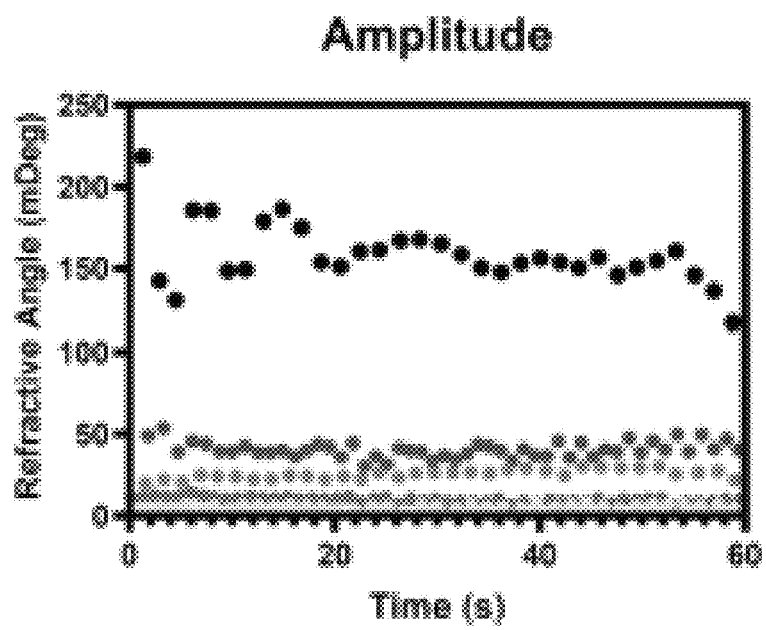
Figure 13C:
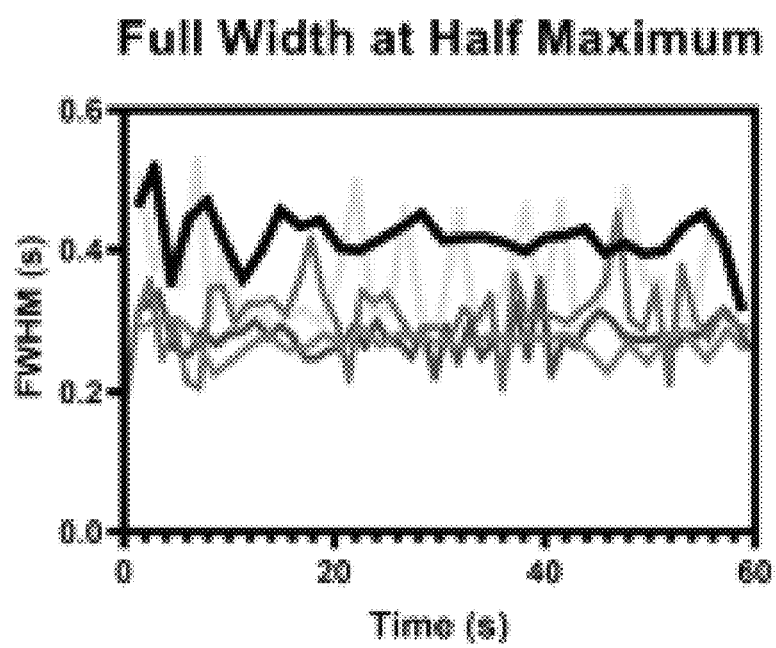
Figure 13D:
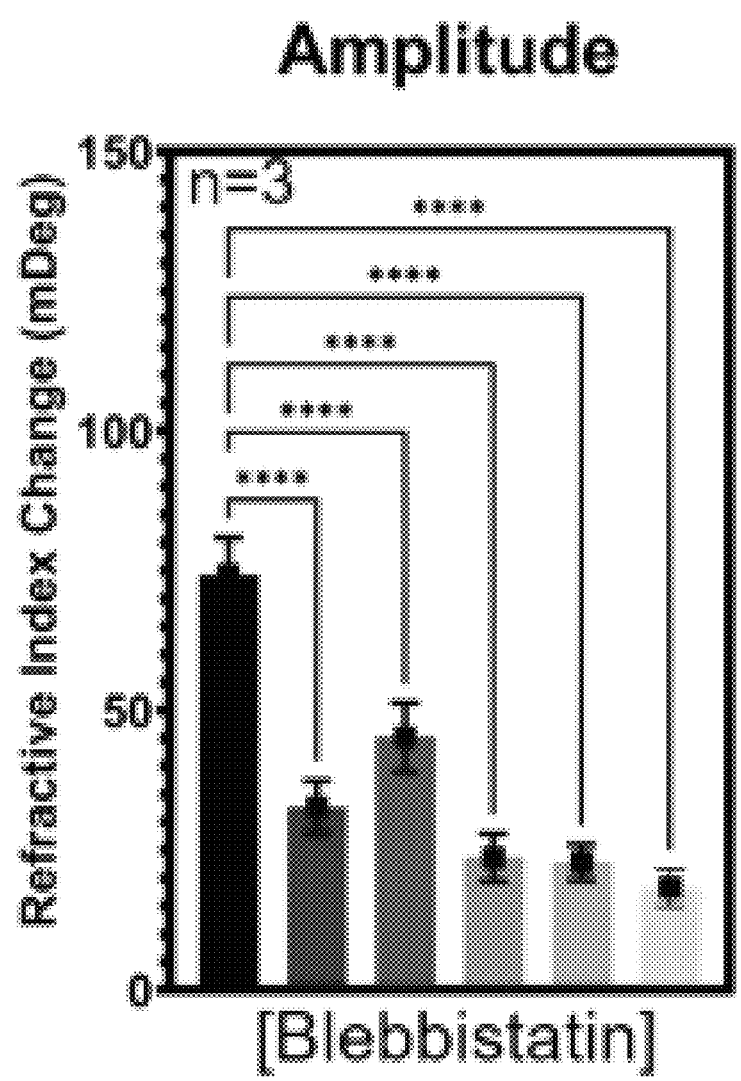
Figure 13E:
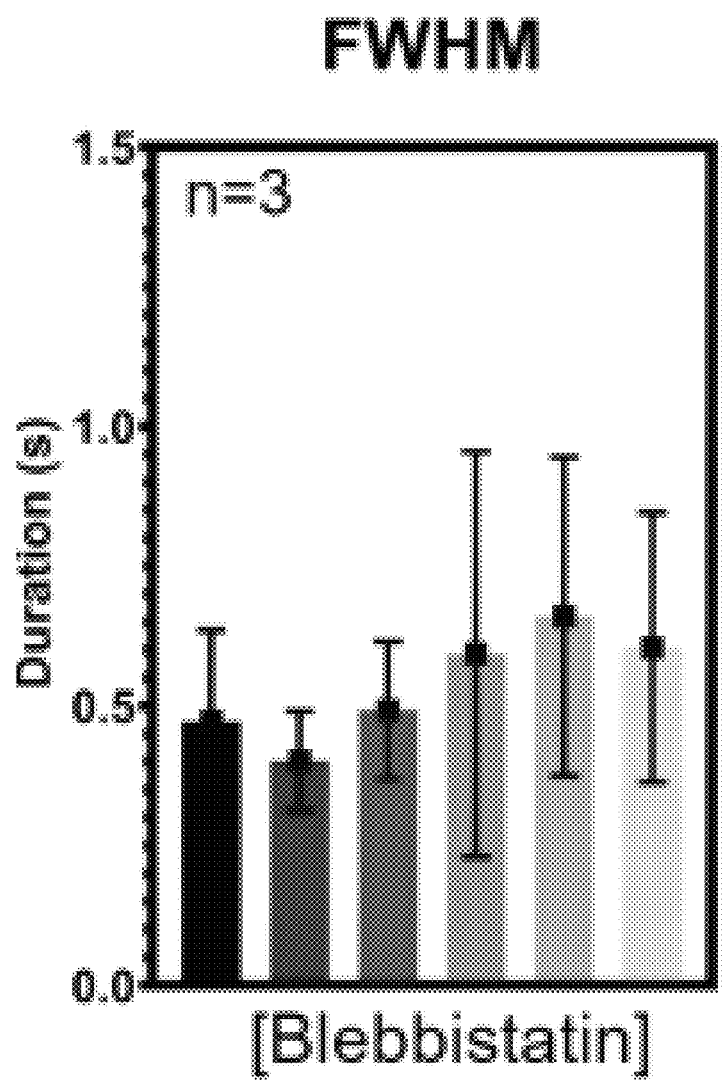
Figure 13H:
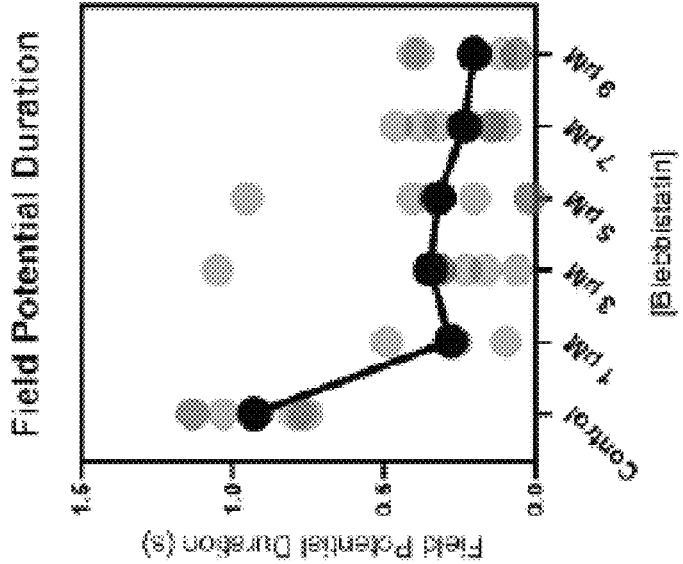
Figure 13G:
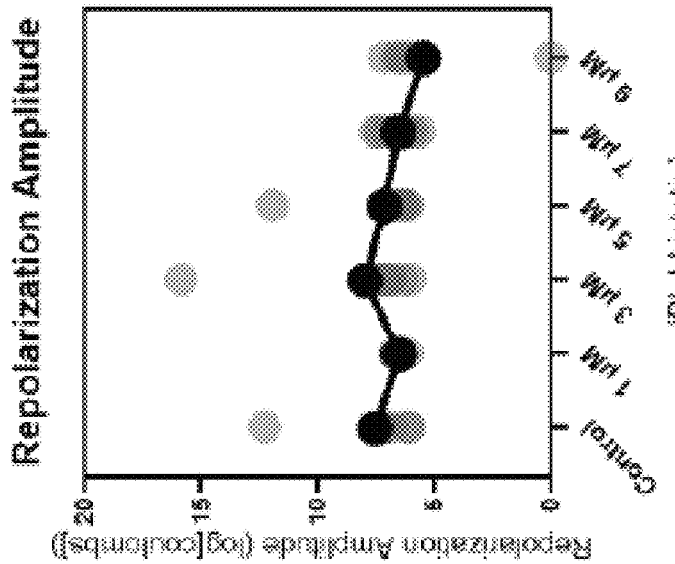
Figure 13F:
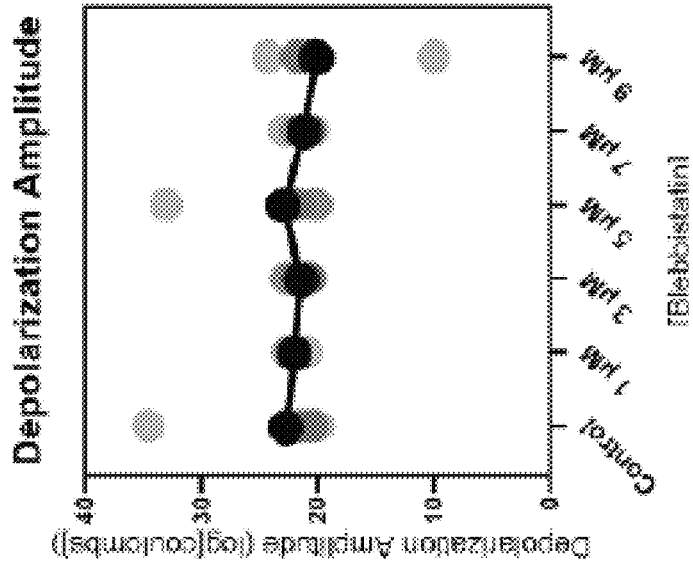
Figure 13K:
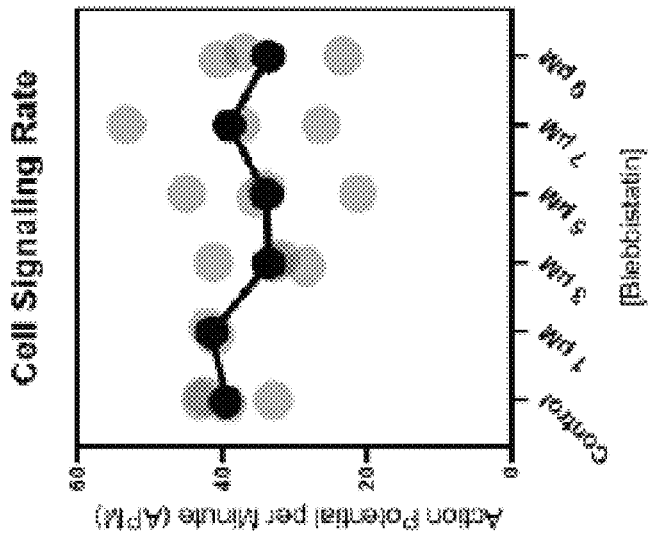
Figure 13J:
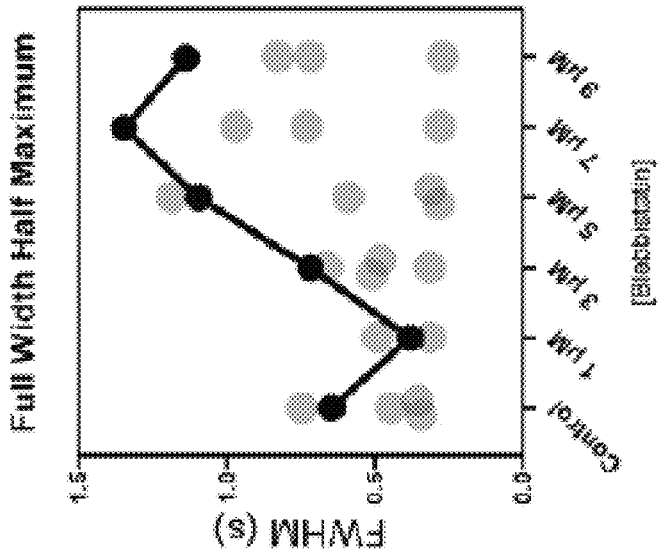
Figure 13I:
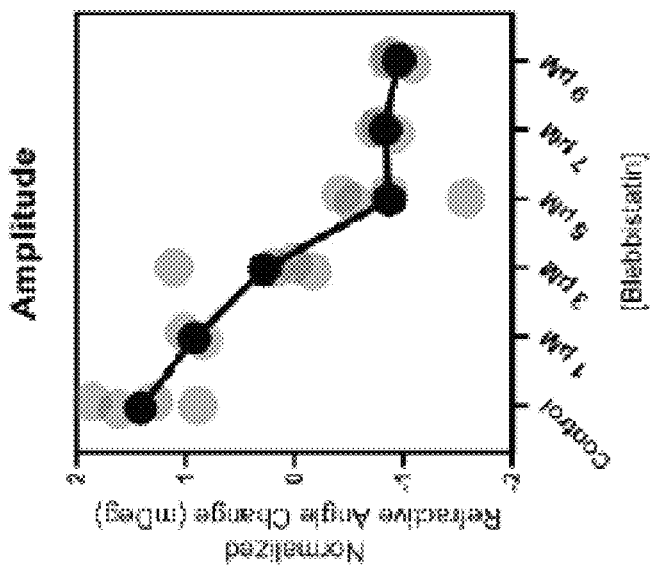
Figure 13L:
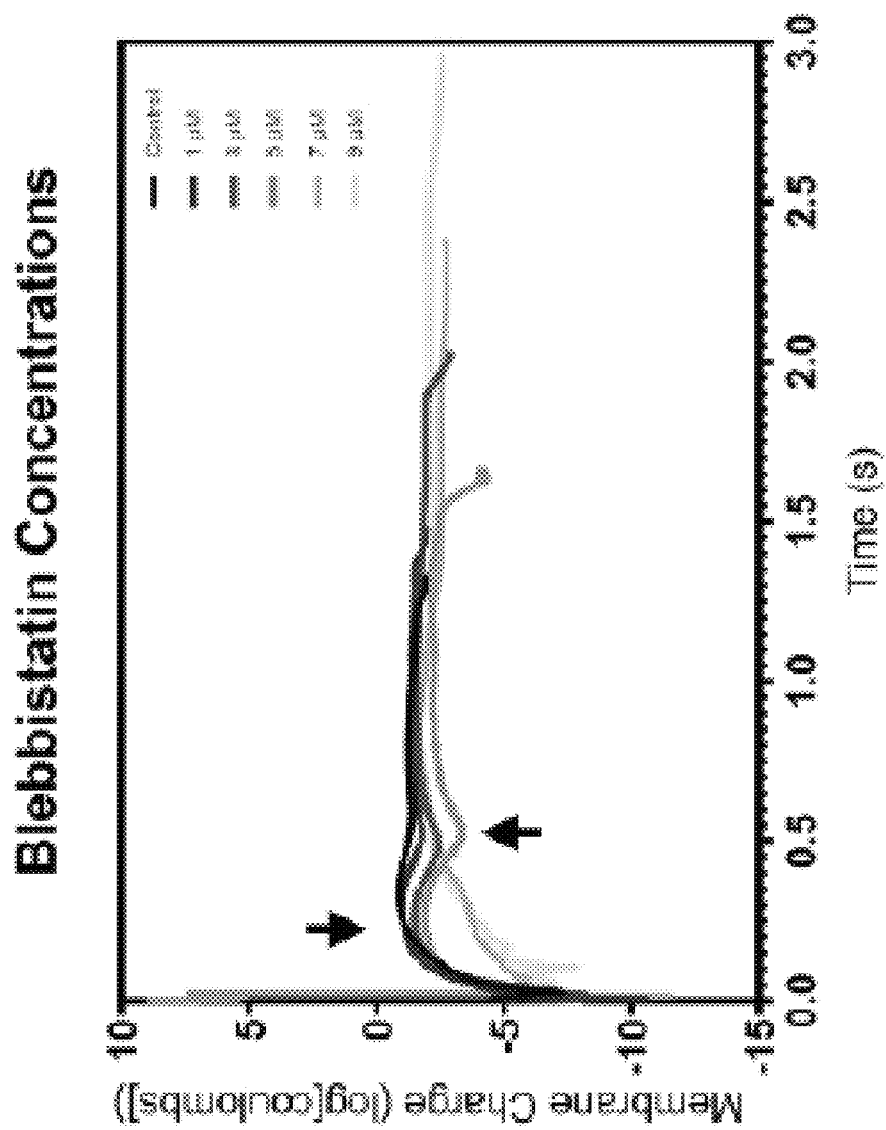
Figure 13M:
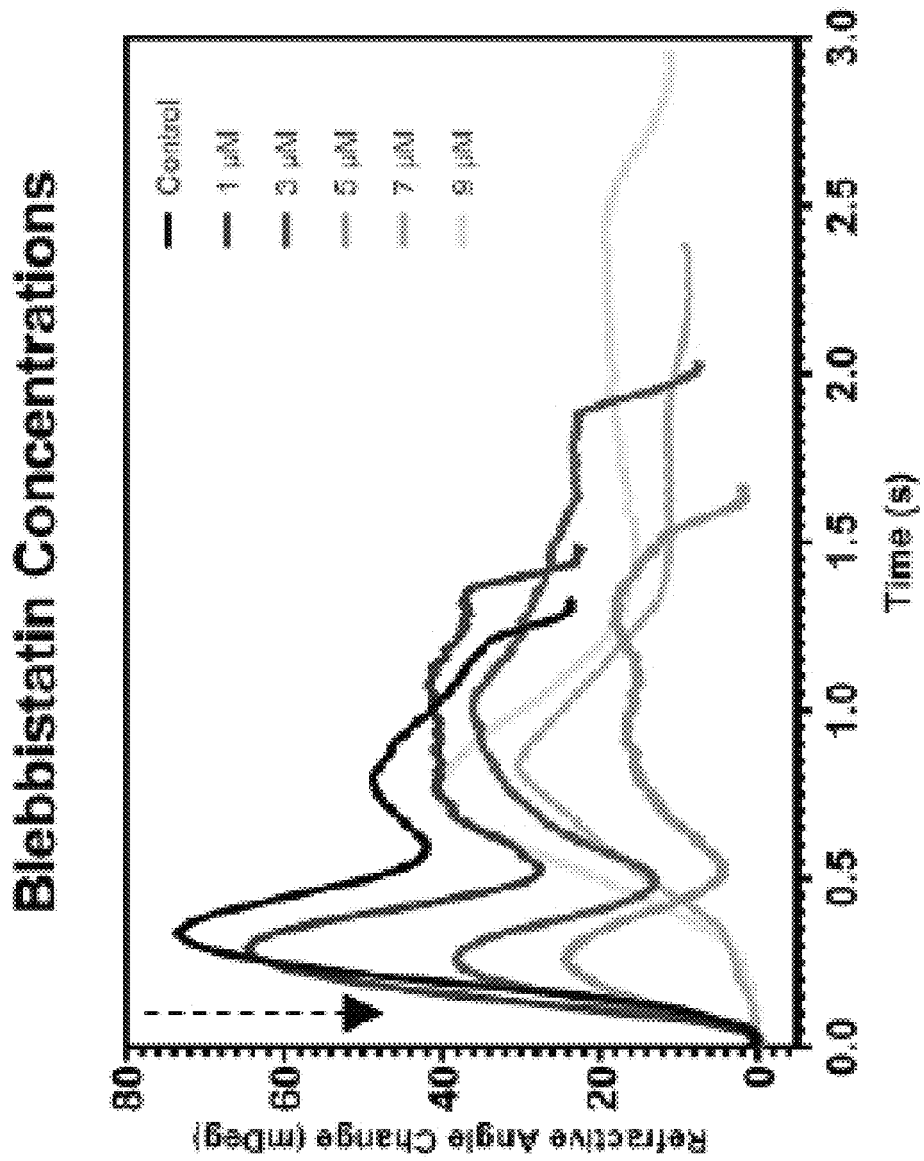

Analysis was performed using blebbistatin as the cells to be analyzed. Consecutive injections of 1 micromolar (04), 3 μM, 5 μM, 7 and 9 μM blebbistatin were performed, and the P-CeG signals were recorded and analyzed. The results are shown in FIGS. 13(a)-13(m). Referring to FIGS. 13(a), 13(b), and 13(d), the continuous decrease in signal amplitude with the increase of blebbistatin concentration suggests the removal of a mechanical cue from the signal. A decrease of the control sample's amplitude and high variability in the FWHM of data with time indicate decreased cellular functionality due to non-ideal experimental conditions. Average data are reported as mean±std: 1-way ANOVA, p<0.0001, 95% CI. Tukey's multiple comparisons test shows the significance of each concentration comparison with control to be (****). Referring to FIGS. 13(f)-13(h), no significant difference in DA and RA features was observed with increasing blebbistatin concentrations. On the other hand, FPD showed a decrease as blebbistatin concentration increased. Referring to FIGS. 13(i)-13(k), while the signal's peak amplitudes have decreased and FWHM has shown higher variability, the cell signaling rate has been relatively unchanged after subjecting the cells to five concentrations of blebbistatin. Referring to FIGS. 13(l) and 13(m), solid arrows mark the location of extracellular membrane charge alteration with increasing blebbistatin concentration, and the dashed black arrow shows the amplitude decrease in the P-CeG signal with increasing blebbistatin concentrations.

Example 8

Figure 14A:
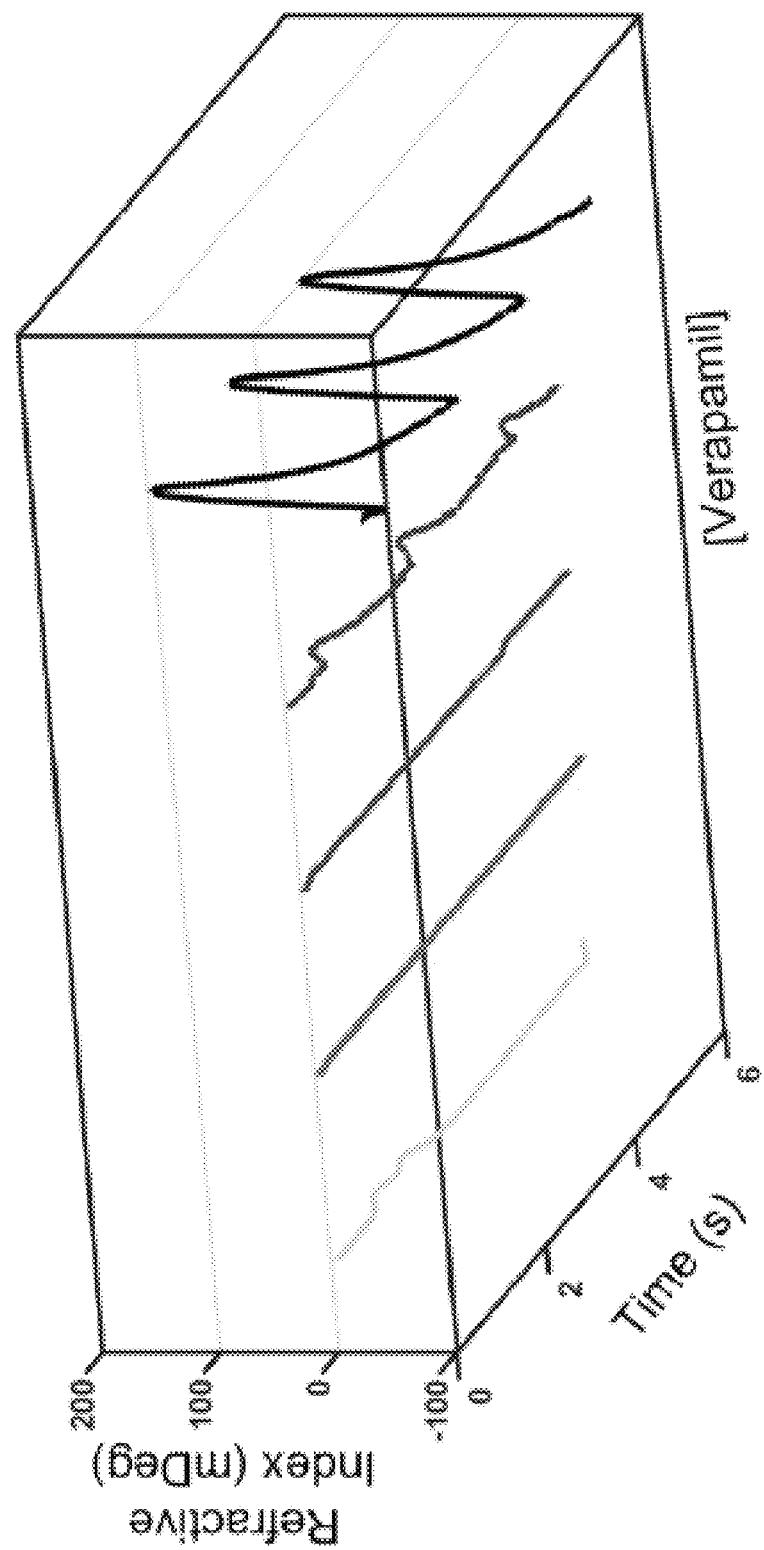
FIGS. 14(a)-14(l) show results of an experiment using verapamil.
Figure 14B:
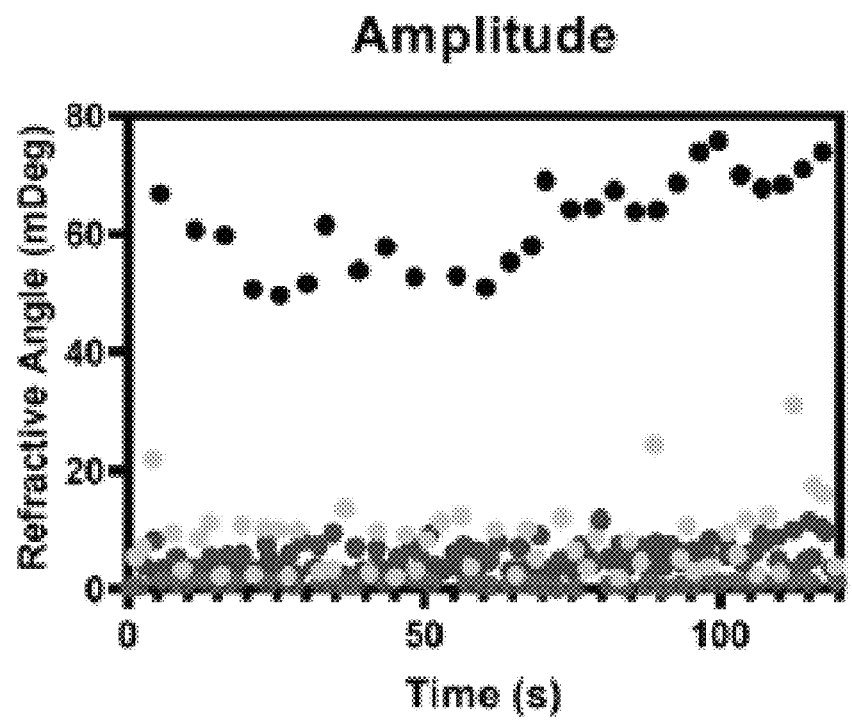
Figure 14C:
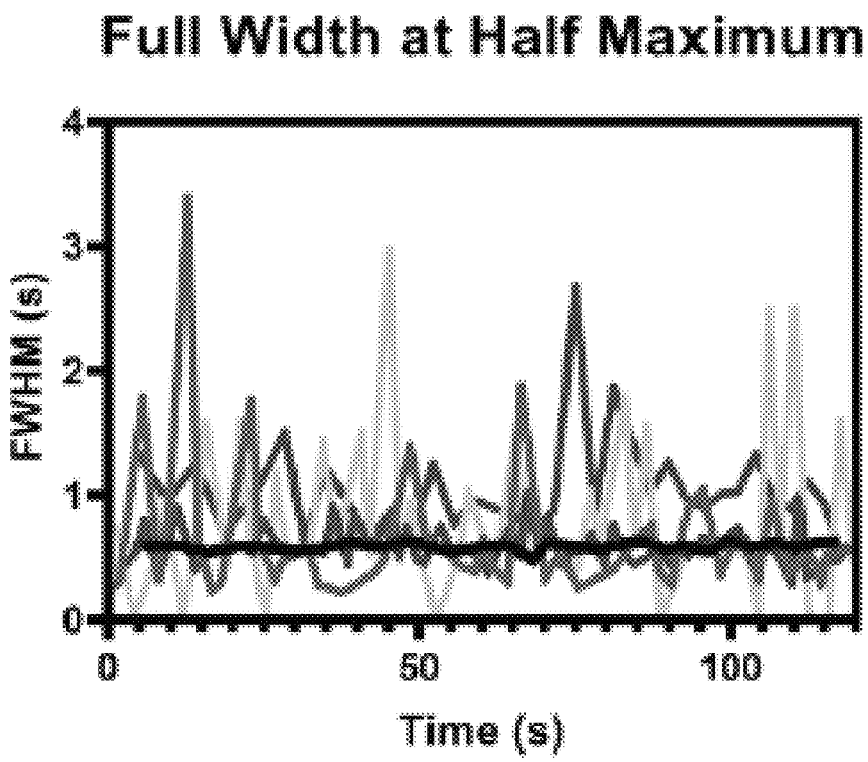
Figure 14D:
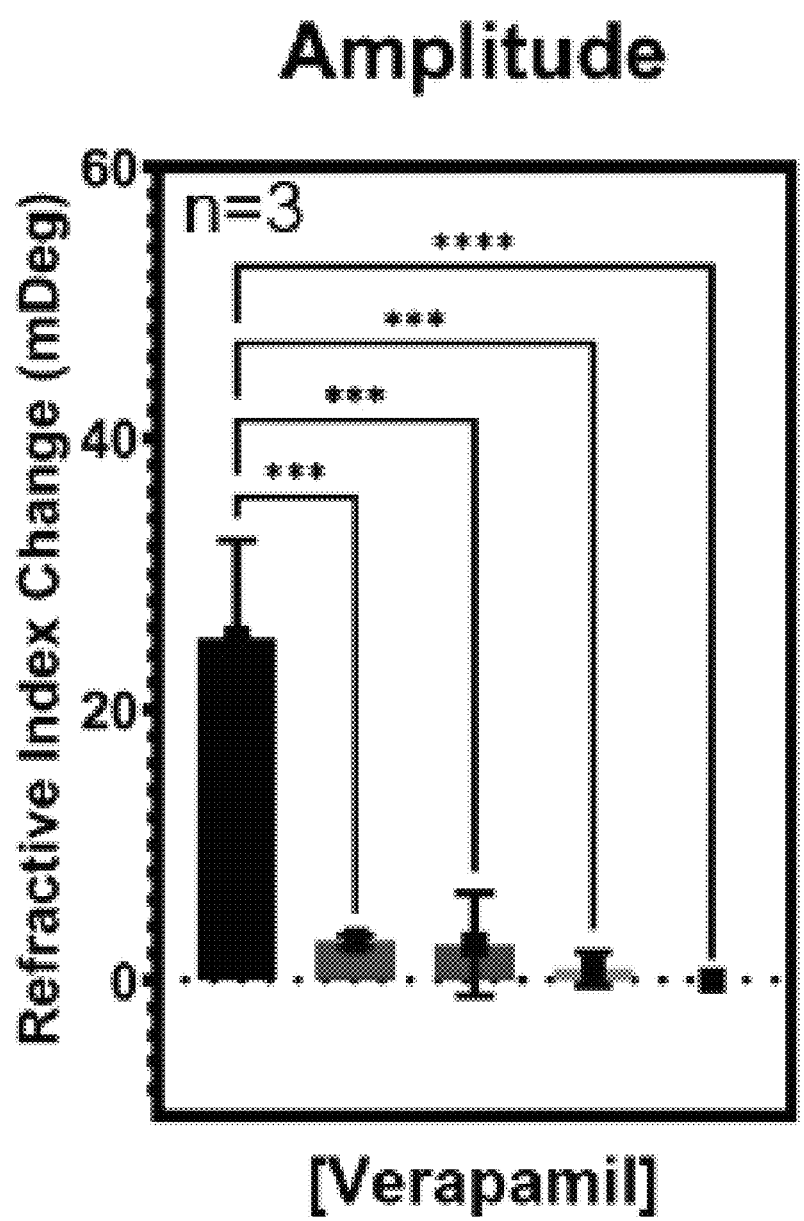
Figure 14G:
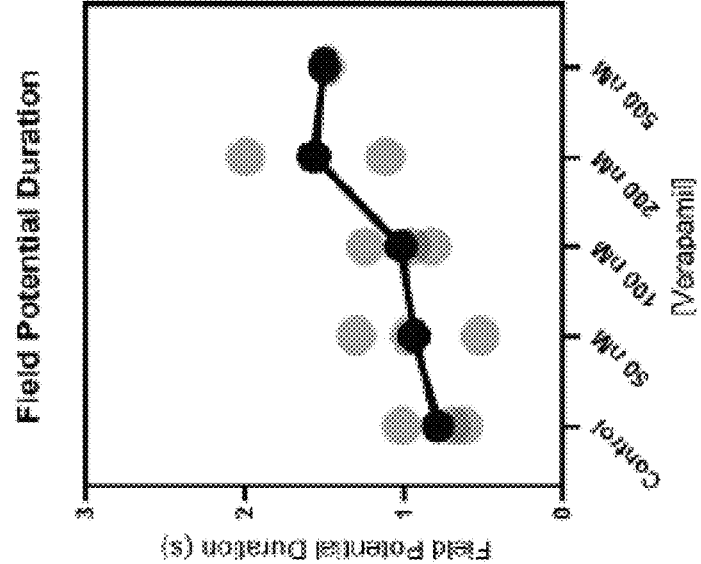
Figure 14F:
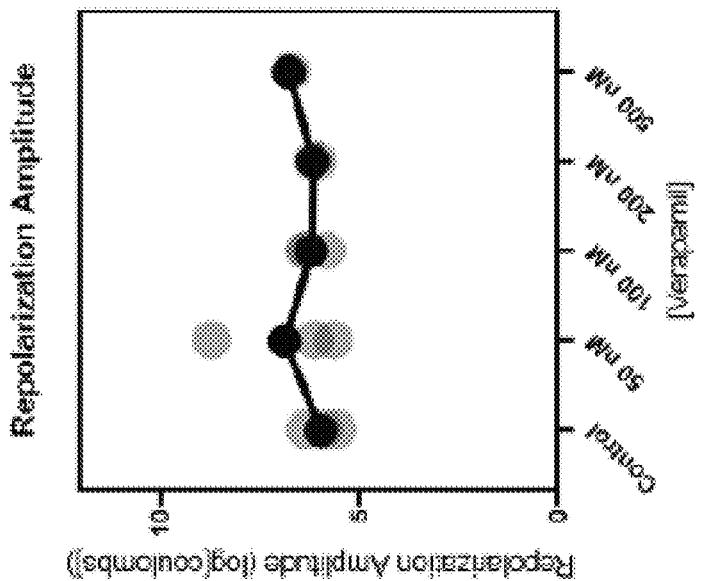
Figure 14E:
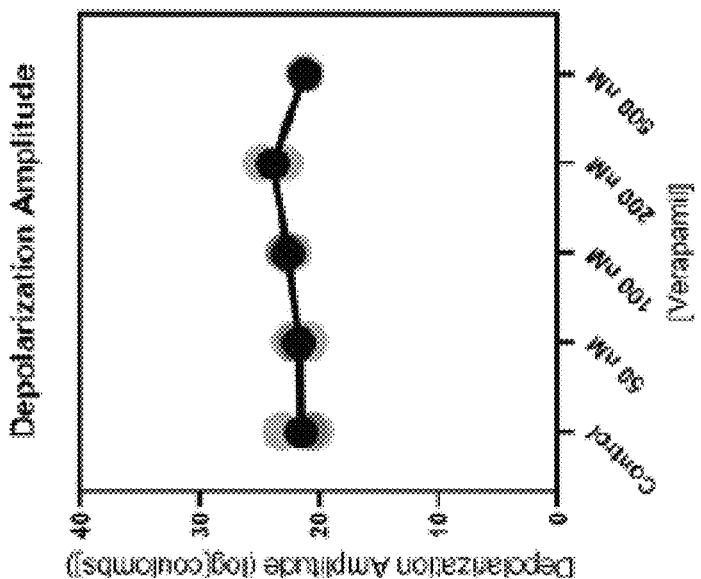
Figures 14H, 14I, 14J:
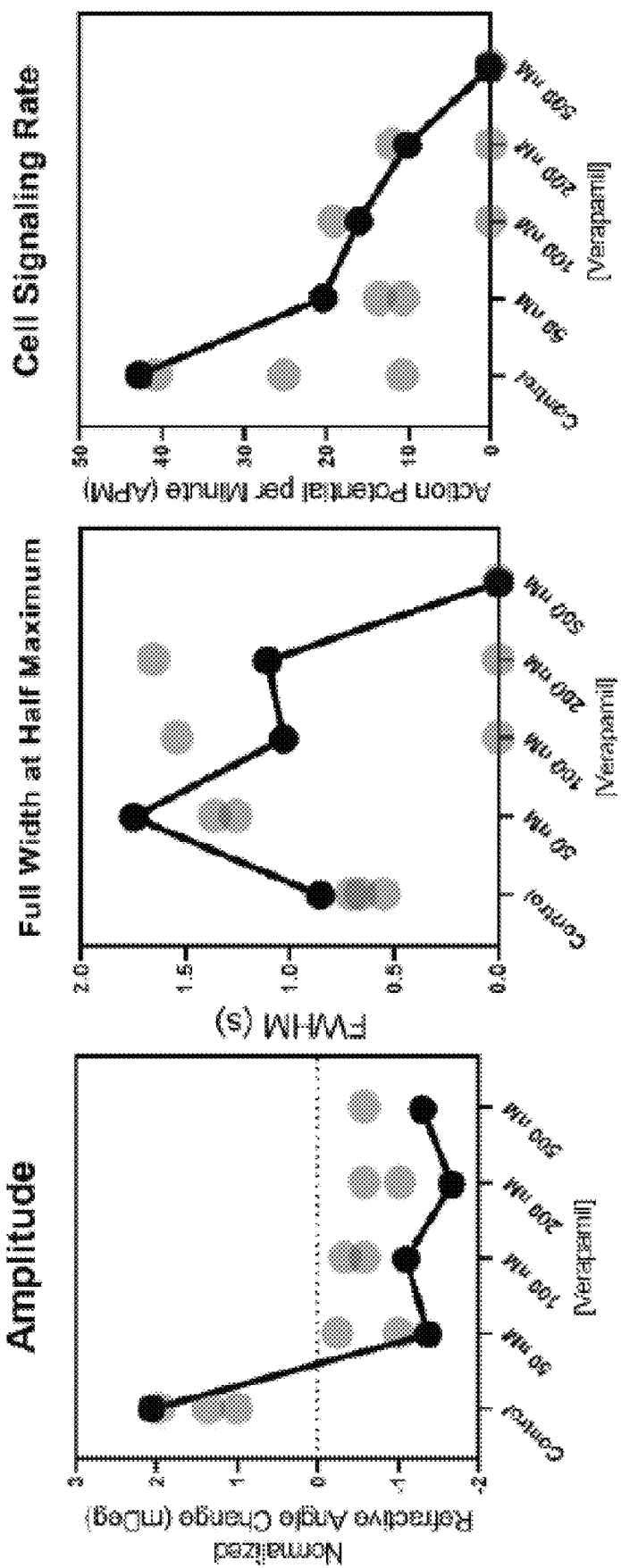
Figure 14K:
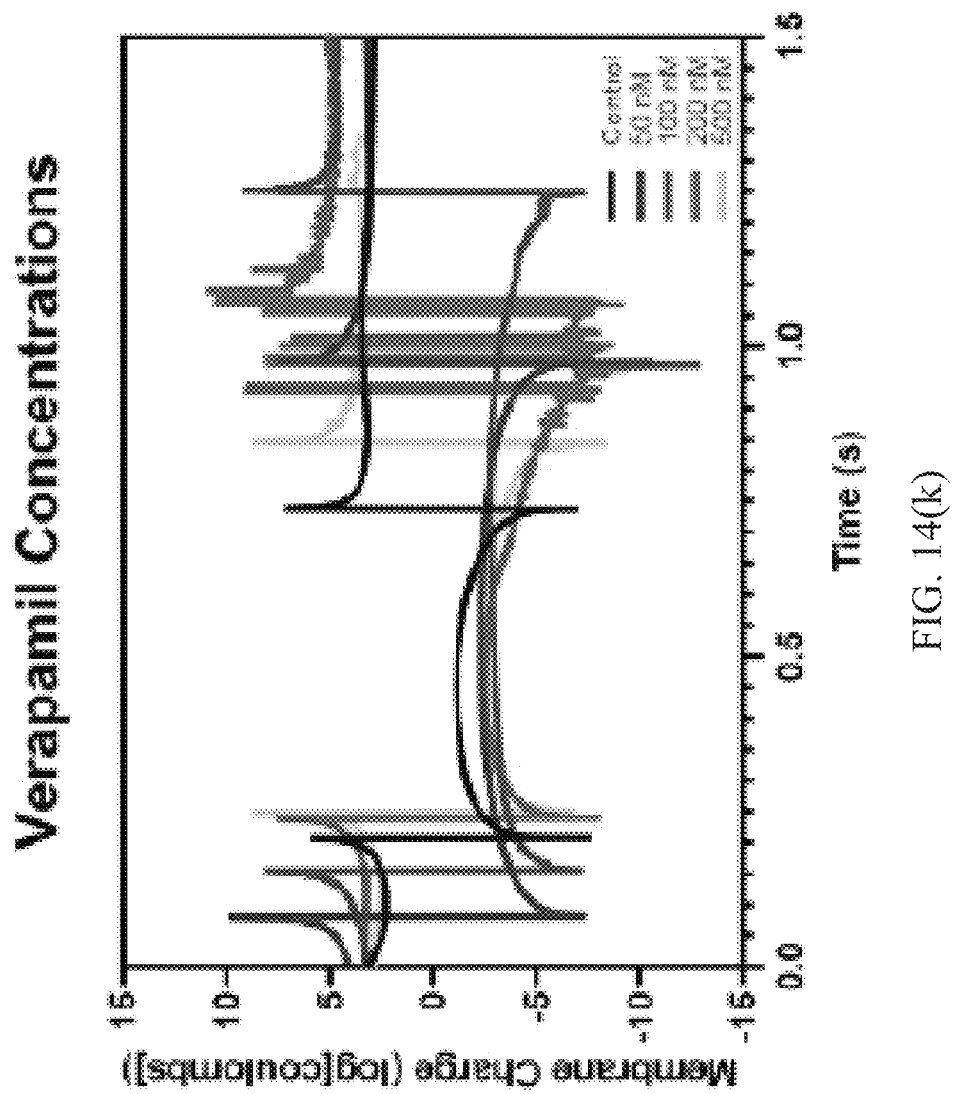
Figure 14:
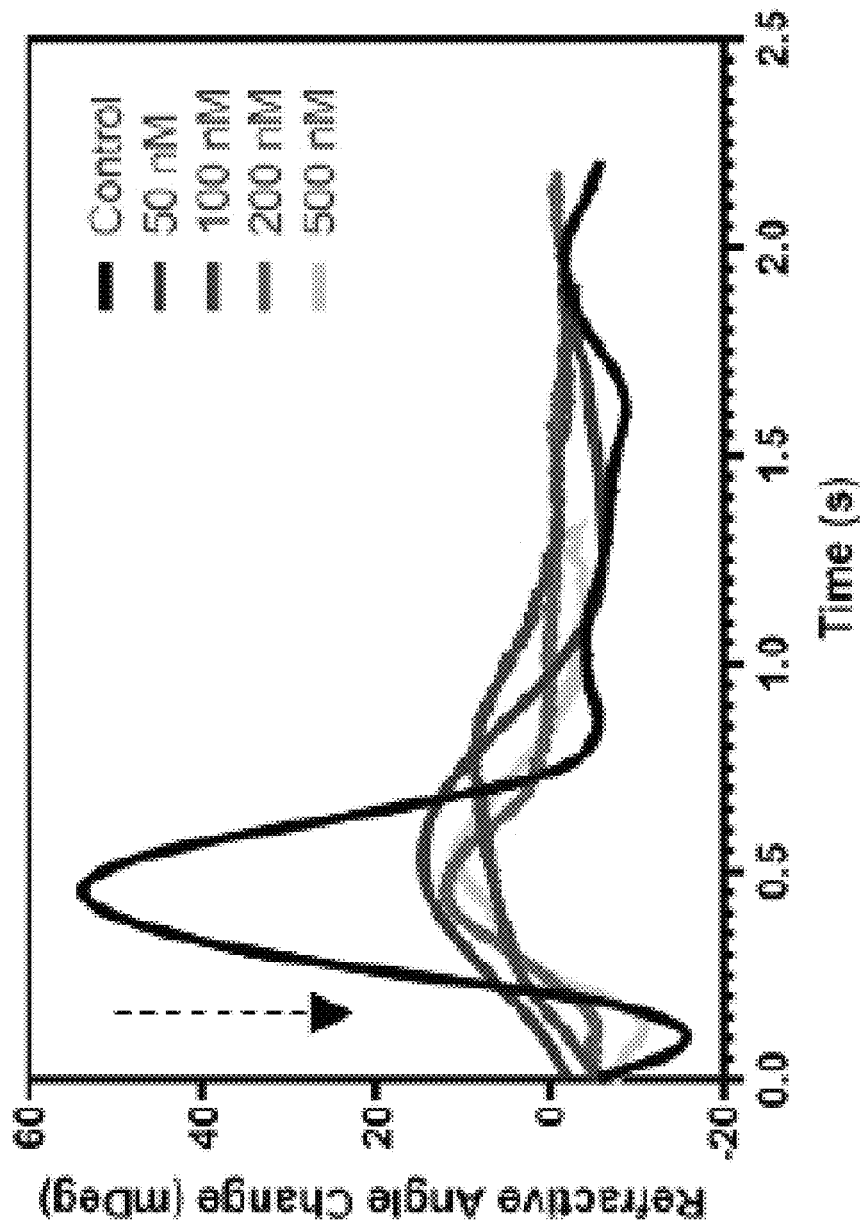

Analysis was performed using verapamil as the cells to be analyzed. Consecutive injections of 50 nanomolar (nM), 100 nM, 200 nM, and 500 nM verapamil were performed, and the P-CeG signals were recorded and analyzed. The results are shown in FIGS. 14(a)-14(l). Referring to FIGS. 14(a), 14(b), and 14(d), a sharp decrease in signal amplitude with the increase of verapamil concentration shows the P-CeG signals' sensitivity to charge variations near CMs' plasma membrane. An increase of the control sample's amplitude and a highly stable FWHM indicates the presence of a relatively healthy cardiac syncytium on the sensor. Average data are reported as mean±std: 1-way ANOVA, p<0.0001, 95% CI. Tukey's multiple comparisons test shows the significance of each concentration comparison with control to be (*), except for the 500 nM concentration, which is (**). Referring to FIGS. 14(e)-14(g), no significant difference in DA and RA features was observed with increasing drug concentrations. On the other hand, FPD showed an increase as verapamil concentration increased. Referring to FIGS. 14(h)-14(j), the peak amplitudes and cell signaling rate decreased with increasing verapamil concentration, while the FWHM slightly increases before it becomes undetectable and is counted as zero. Referring to FIGS.

14(k) and 14(l), an increase in FPD and FWHM of the signals is distinctly observable with increasing verapamil concentrations.

Example 9

Figure 15A:
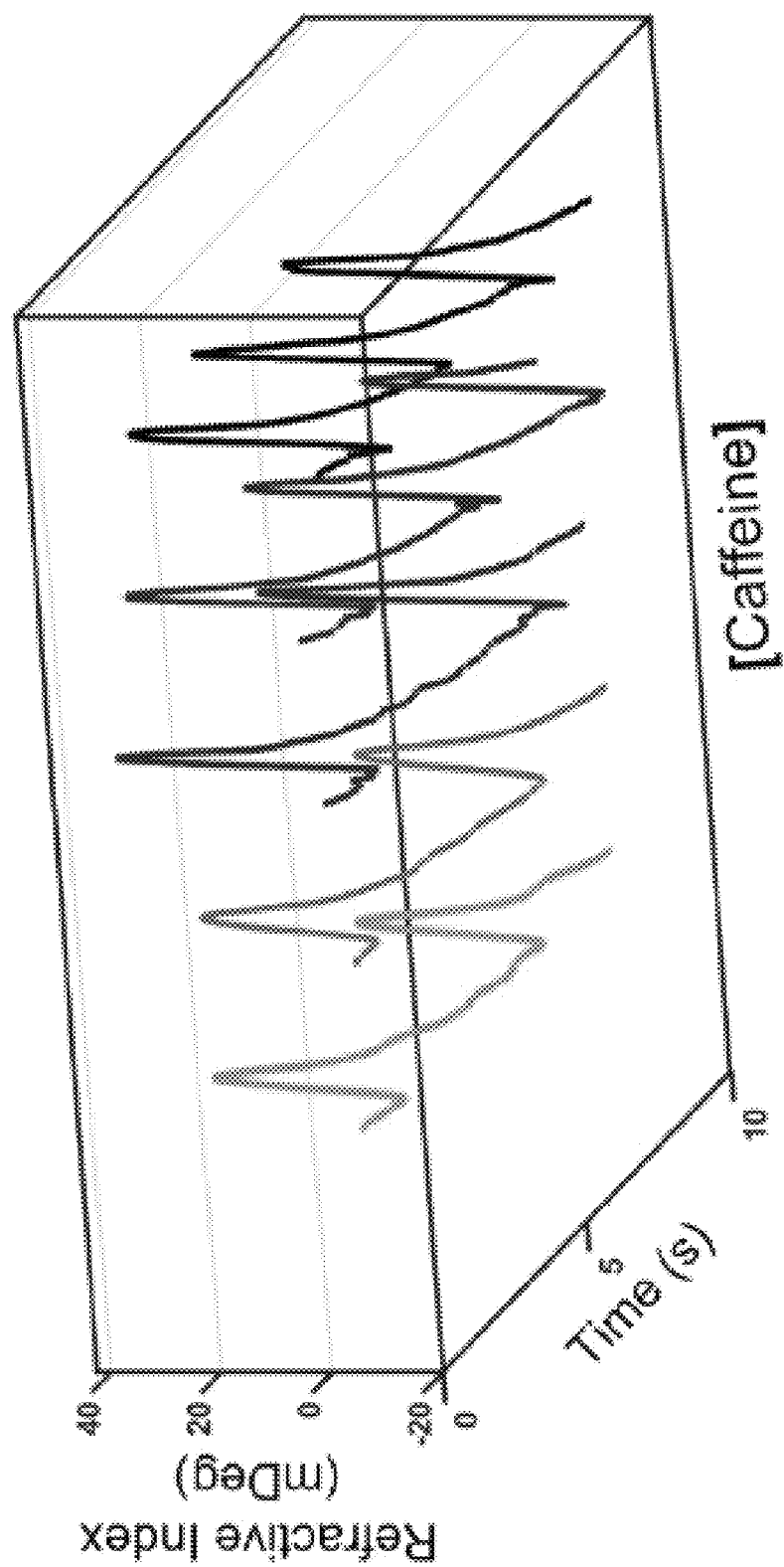
FIGS. 15(a)-15(m) show results of an experiment using caffeine.
Figure 15B:
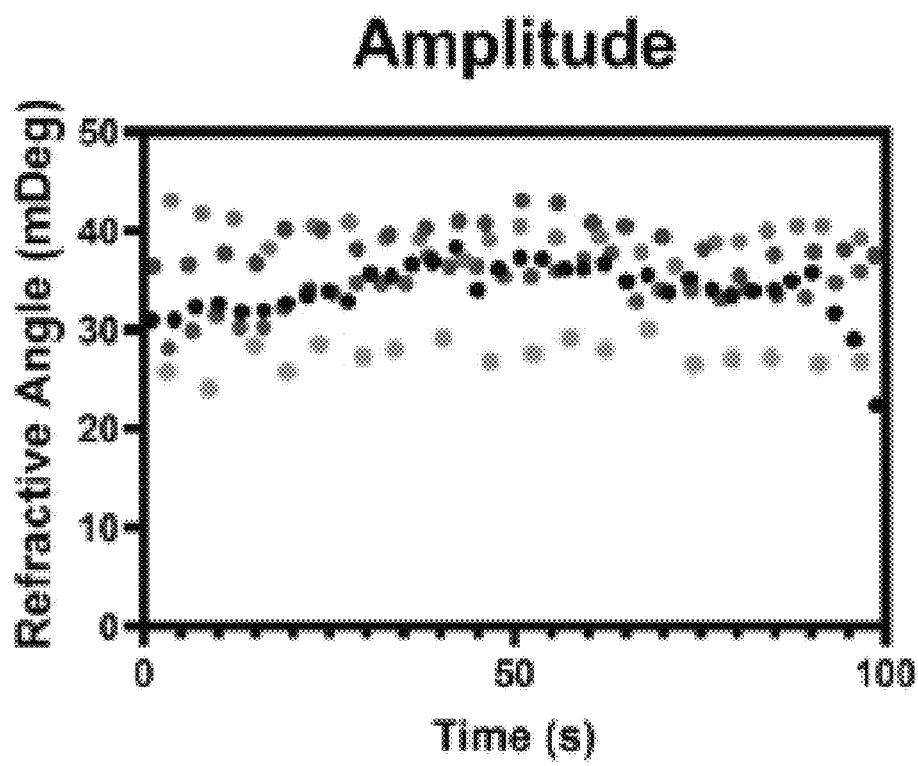
Figure 15C:
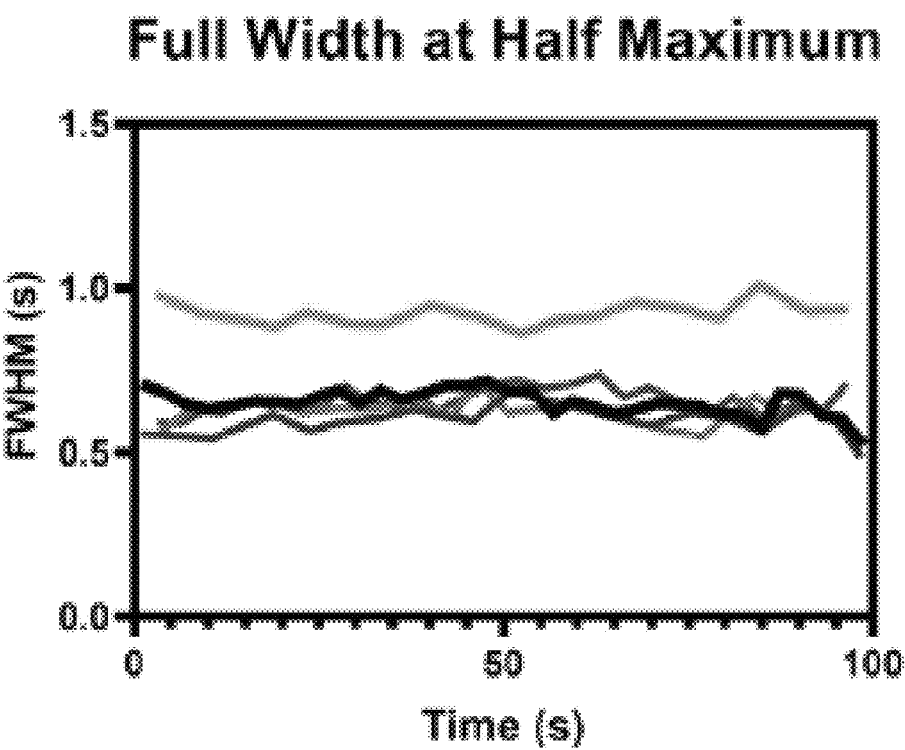
Figure 15D:
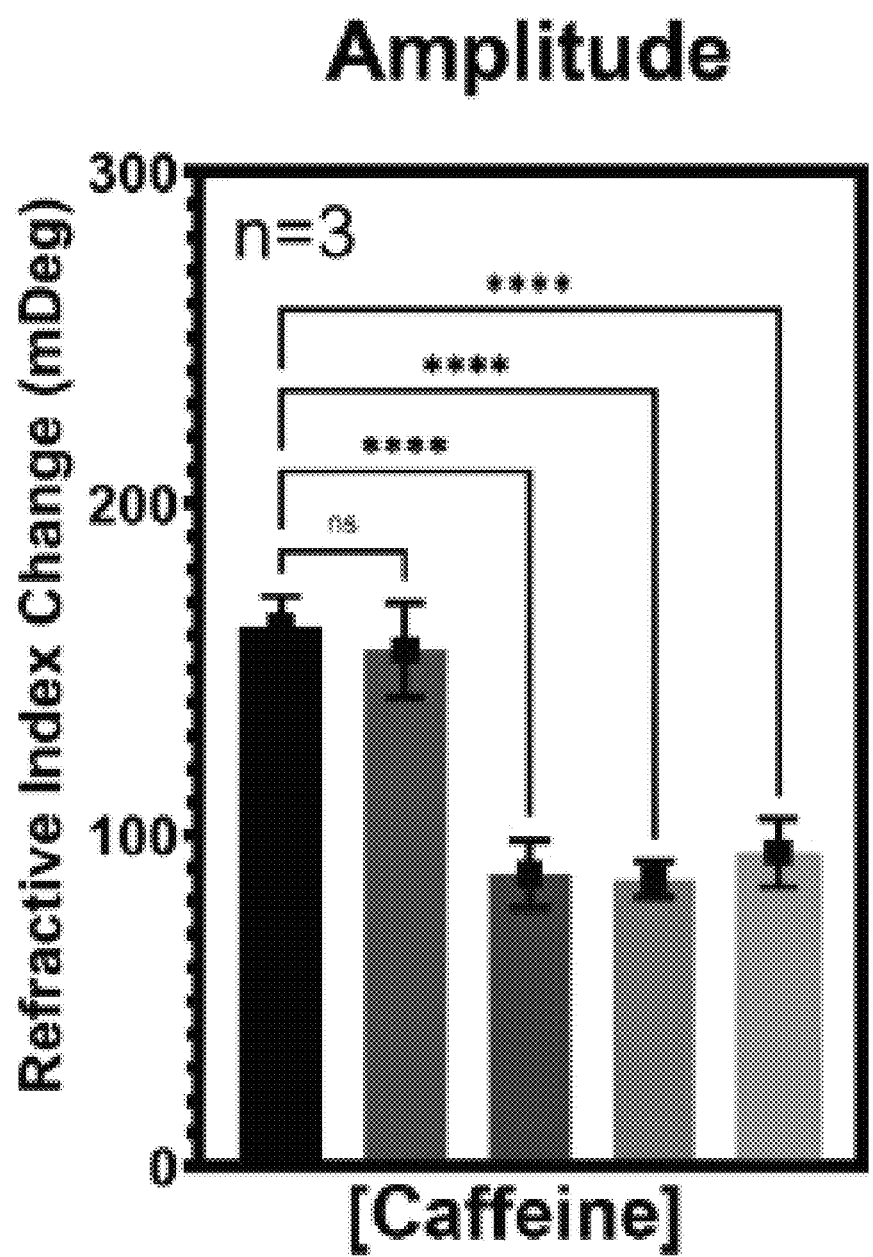
Figure 15E:
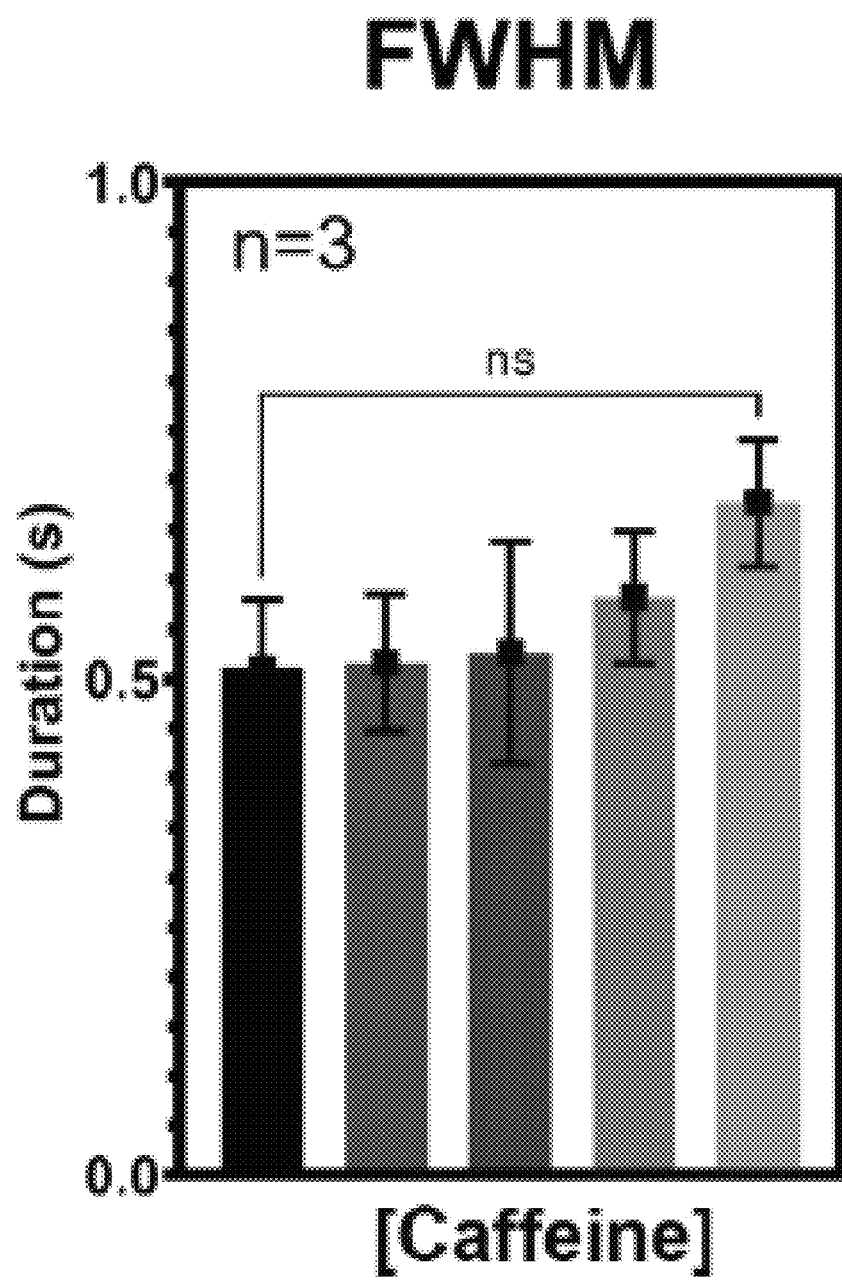

Analysis was performed using caffeine as the cells to be analyzed. Consecutive injections of 2 millimolar (mM), 4 mM, 6 mM, and 8 mM caffeine were performed, and the P-CeG signals were recorded and analyzed. The results are shown in FIGS. 15(a)-15(m). Referring to FIGS. 15(a), 15(b), and 15(d), the presence of detectable signal amplitude with the increase of caffeine concentration shows the P-CeG signals' sensitivity to CM's force of contraction. Average data are reported as mean±std: 1-way ANOVA, p<0.0001, 95% CI. Tukey's multiple comparisons test shows the significance of signal amplitude for all caffeine concentrations to be (****), except for the nonspecific difference for 2 mM caffeine.

Figures 15F, 15G, 15H:
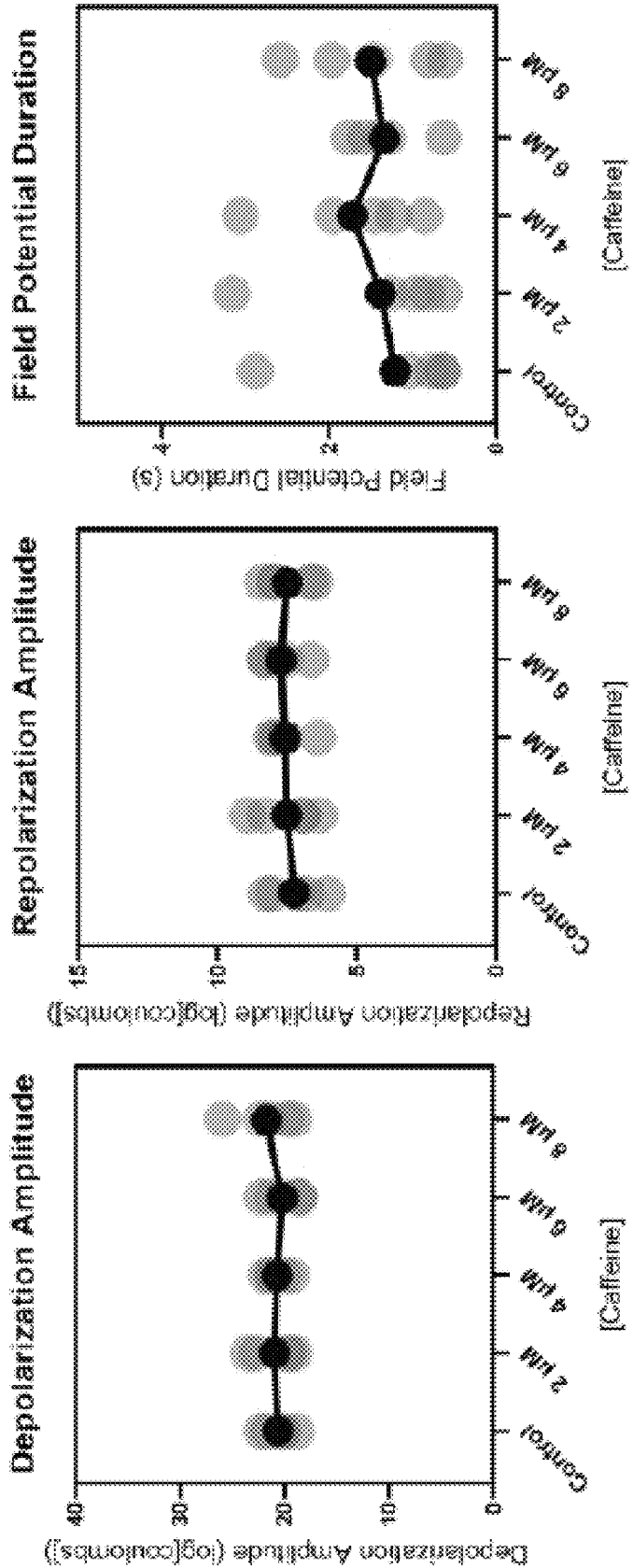
Figures 15I, 15J, 15K:
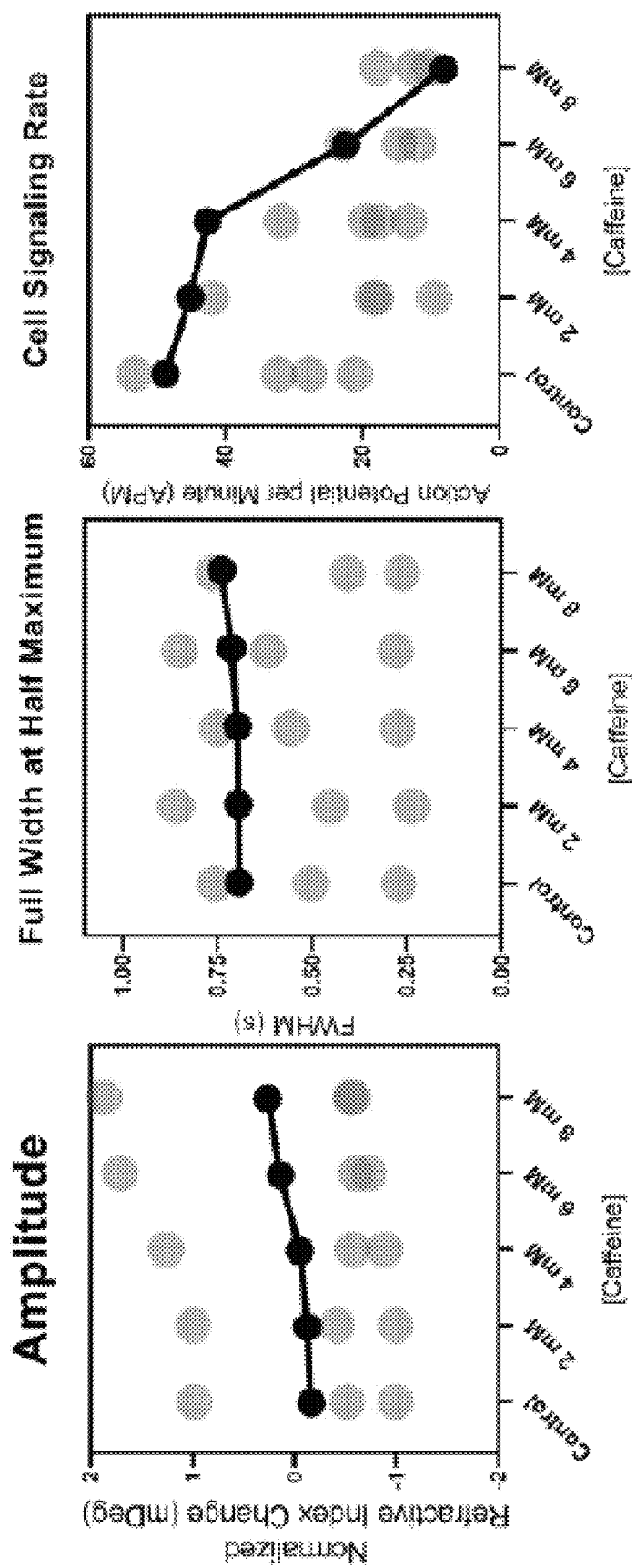
Figure 15L:
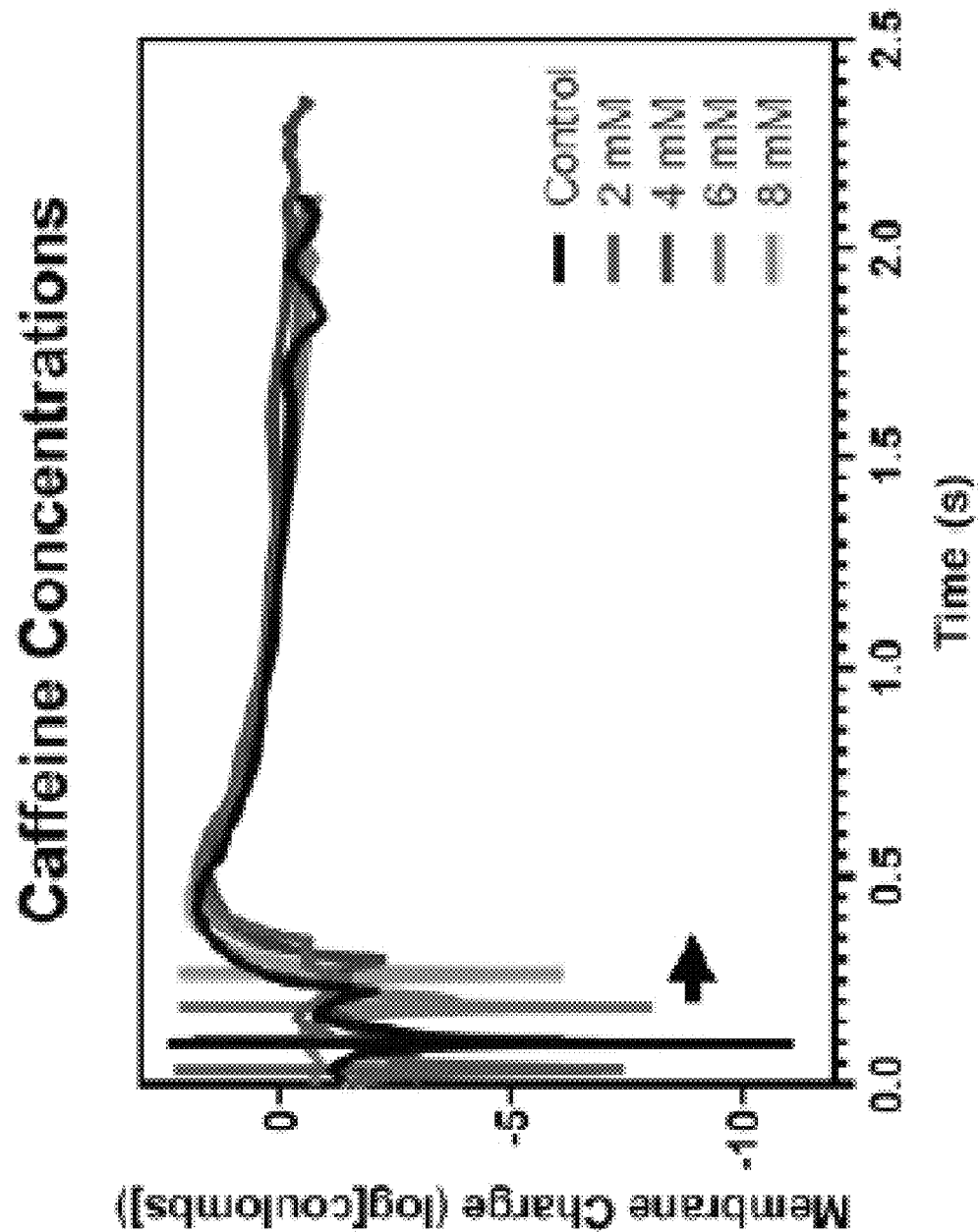
Figure 15M:
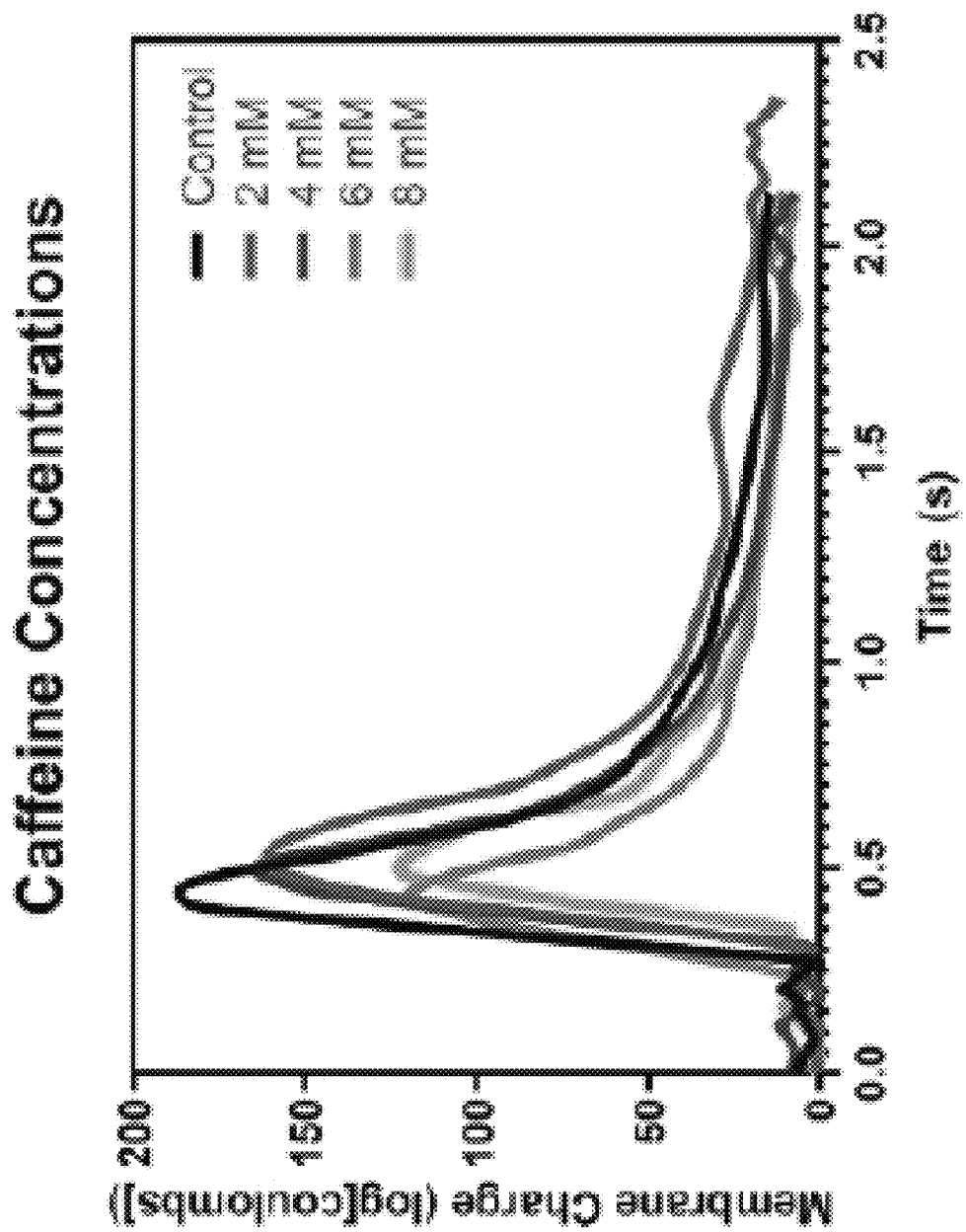

Referring to FIGS. 15(f)-15(h), no significant difference in DA and RA features was observed with increasing drug concentrations, and a slight increase in FPD might be due to non-ideal experimental conditions and the long-term effect of caffeine on CMs. Referring to FIGS. 15(i)-15(k), the peak amplitudes and FWHM are relatively unchanged with increased caffeine concentrations, while the cell signaling rate decreases. Referring to FIGS. 15(l) and 15(m), the charge graph and the P-CeG signal of a single period from contracting CMs are shown.

Example 10

Figure 16B:
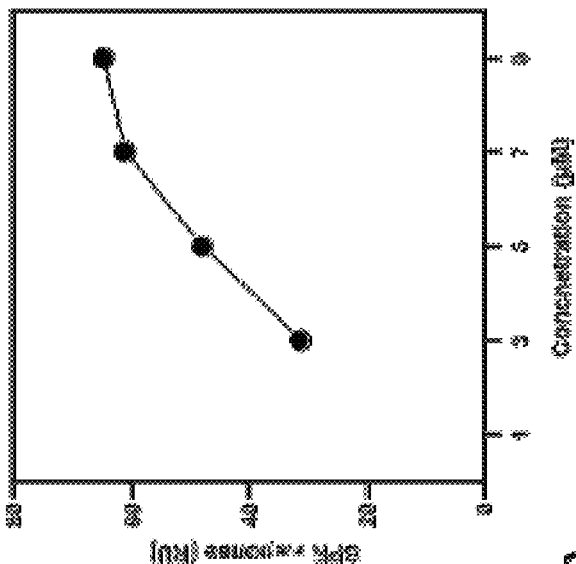
FIG. 16(*a*) shows a plot of SPR Response in (Response Units (RU)) versus time (in s) showing blebbistatin binding to CMs.
Figure 16A:
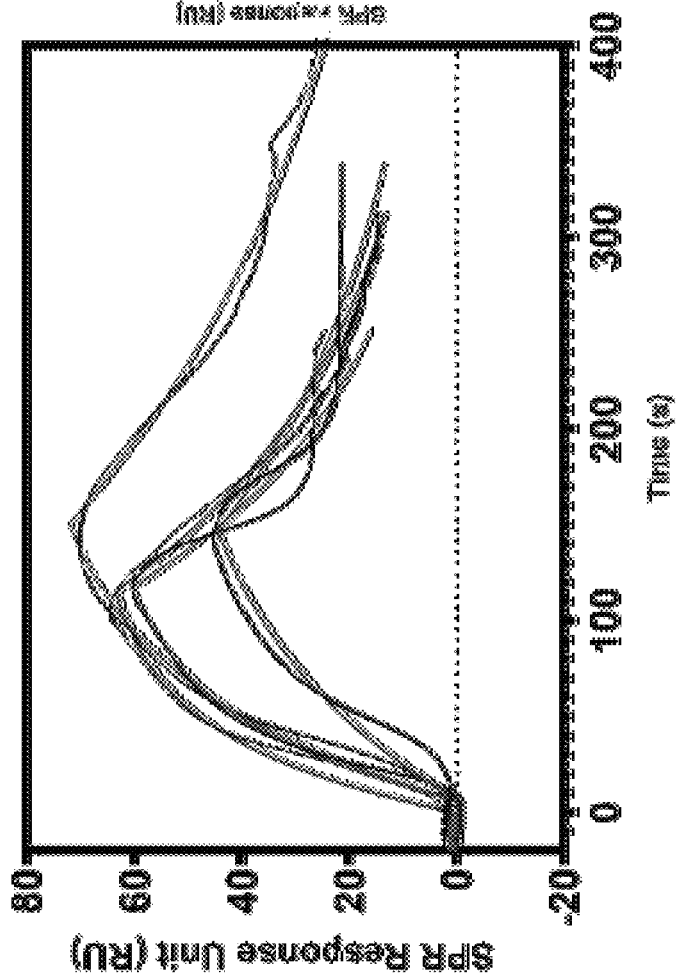
Figure 16D:
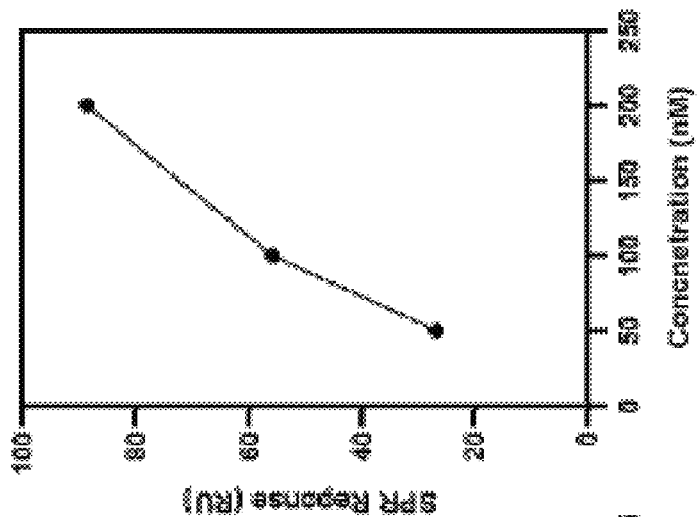
Figure 16C:
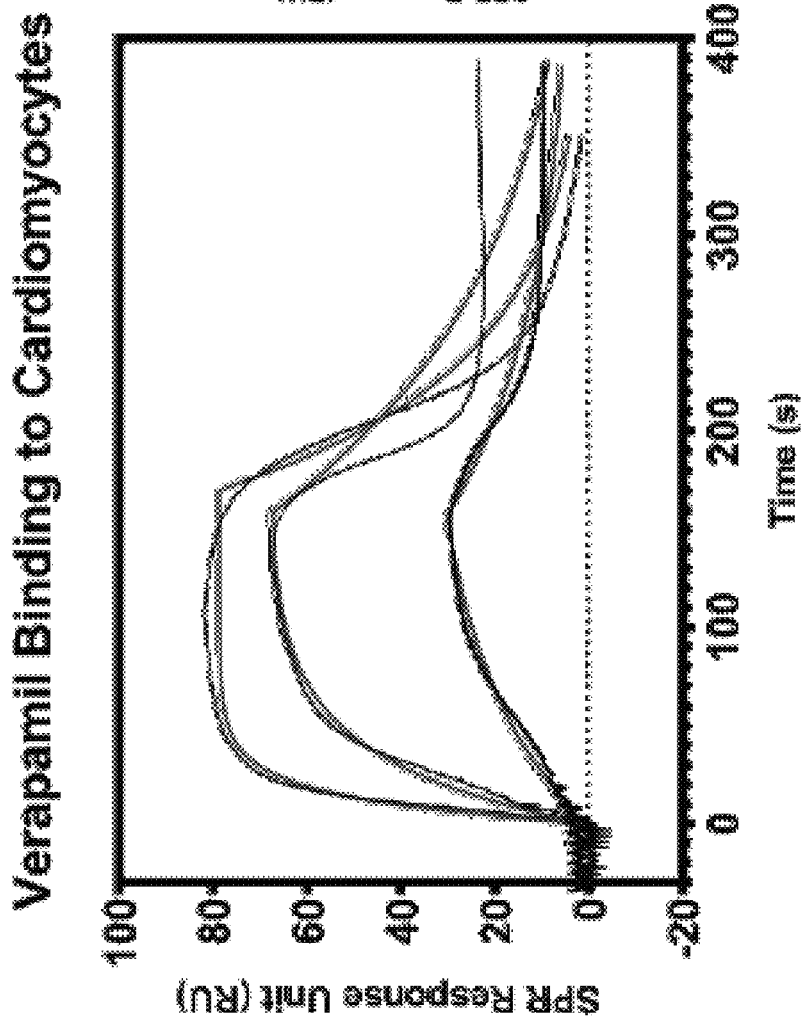
Figure 16F:
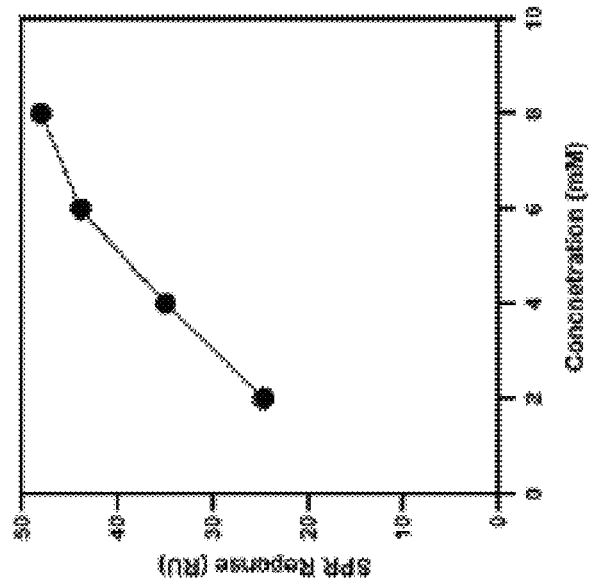
Figure 16E:
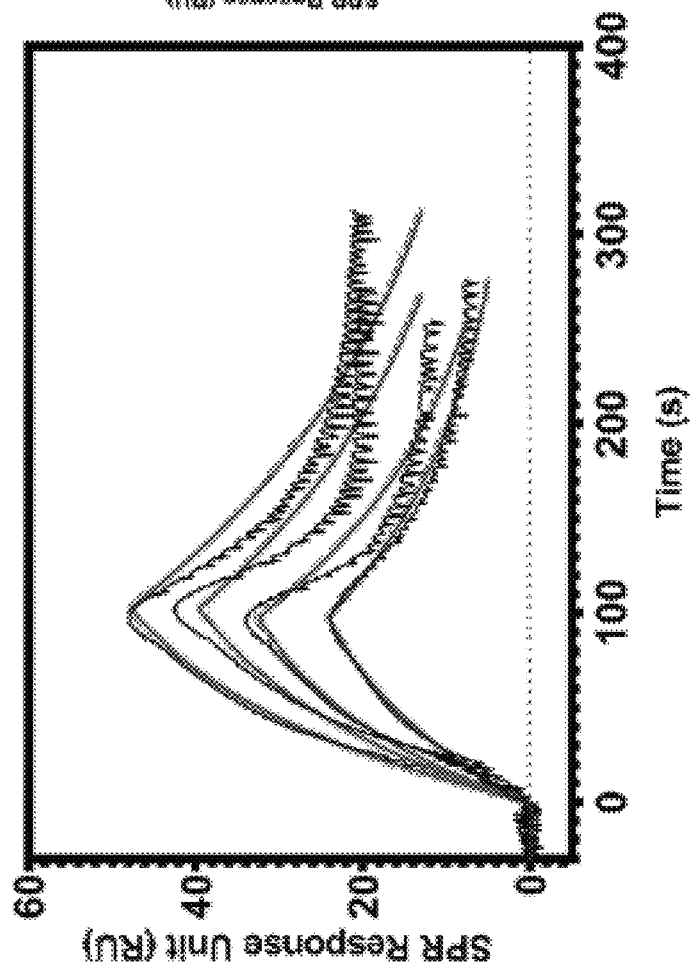

Drug-cell affinity studies were performed on blebbistatin, verapamil, and caffeine. The SPR binding curves are shown in FIGS. 16(a)-16(f). FIGS. 16(a), 16(c), and 16(e) show the sensograms for binding to CMs of different concentrations of blebbistatin (from bottom to top—1 µM, 3 µM, 5 µM, and 7 µM), verapamil (from bottom to top—50 nM, 100 nM, and 200 nM), and caffeine (from bottom to top—2 mM, 4 mM, 6 mM, and 8 mM), respectively. FIGS. 16(b), 16(d), and 16(f) show the SPR response as a function of increasing analyte concentration for blebbistatin, verapamil, and caffeine, respectively. FIG. 16(f) shows a table with $K_a$, $K_d$, $K_D$, and $R_{MAX}$ values for blebbistatin, verapamil, and caffeine.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A device for analysis of biological matter, the device comprising:
   a base comprising a bottom surface and four walls extending upward from the bottom surface;
   a circuit substrate disposed over the bottom surface of the base and within the four walls of the base;
   a light source disposed on the circuit substrate;
   a refraction detector disposed on the circuit substrate and spaced apart from the light source;
   a first prism disposed on the circuit substrate and spaced apart from the refraction detector and the light source;
   a first plasmonic sensor disposed on the first prism, the first plasmonic sensor comprising a first detection area configured to receive the biological matter; and
   a gasket configured to be disposed on the first sensor and comprising a fluidic device comprising at least one inlet and at least one outlet,
   the base being a Faraday cage, and
   the gasket being disposed on a cover that is connected to the base by at least one hinge, such that the cover is configured to open and expose the first plasmonic sensor and to close such that the gasket covers the first plasmonic sensor.

2. The device according to claim 1, further comprising a computer readable medium in operable communication with the circuit substrate and having software stored thereon that, when executed by a processor in operable communication with the computer readable medium, receives data of the biological matter and extracts a plurality of biological parameters from the data.

3. The device according to claim 2, the biological matter comprising a cell, and the plurality of biological parameters comprising a subtype of the cell.

4. The device according to claim 1, the fluidic device being a microfluidic device comprising at least two inlets, and the first prism being a micro prism.

5. The device according to claim 1, the light source comprising at least one light-emitting diode (LED).

6. The device according to claim 1, further comprising a light splitter and a polarizer disposed in a path traveled by light between the light source and the refraction detector.

7. The device according to claim 1, the first plasmonic sensor comprising gold.

8. The device according to claim 1, the first plasmonic sensor being disposed directly on and in physical contact with the first prism.

9. The device according to claim 1, further comprising:
   a second prism disposed on the circuit substrate and spaced apart from the first prism, the refraction detector, and the light source;
   a second sensor disposed on the second prism, the second sensor comprising a second detection area configured to receive the biological matter.

10. A method for analyzing biological matter, the method comprising:
    providing the device according to claim 1;
    providing the biological matter to the first detection area;
    operating the device to provide light, via the light source, to the first plasmonic sensor through the first prism; and
    detecting refracted light with the refraction detector to obtain data of the biological matter.

11. The method according to claim 10, the device further comprising a computer readable medium in operable communication with the circuit substrate and having software stored thereon that, when executed by a processor in operable communication with the computer readable medium, receives data of the biological matter and extracts a plurality of biological parameters from the data,
    the method further comprising executing the software to extract the plurality of biological parameters from the data.

12. The method according to claim 11, the biological matter comprising a cell, and the plurality of biological parameters comprising a subtype of the cell.

13. The method according to claim 10, the fluidic device being a microfluidic device comprising at least two inlets, the first prism being a micro prism, and the light source comprising at least one light-emitting diode (LED).

14. The method according to claim 10, the device further comprising a light splitter and a polarizer disposed in a path traveled by light between the light source and the refraction detector.

15. The method according to claim 10, the first plasmonic sensor comprising gold.

16. The method according to claim 10, the first plasmonic sensor being disposed directly on and in physical contact with the first prism.

17. A device for analysis of biological matter, the device comprising:
- a base comprising a bottom surface and four walls extending upward from the bottom surface;
- a circuit substrate disposed over the bottom surface of the base and within the four walls of the base;
- a light source disposed on the circuit substrate;
- a refraction detector disposed on the circuit substrate and spaced apart from the light source;
- a first prism disposed on the circuit substrate and spaced apart from the refraction detector and the light source;
- a first plasmonic sensor disposed on the first prism, the first plasmonic sensor comprising a first detection area configured to receive the biological matter;
- a second prism disposed on the circuit substrate and spaced apart from the first prism, the refraction detector, and the light source;
- a second sensor disposed on the second prism, the second sensor comprising a second detection area configured to receive the biological matter;
- a first gasket configured to be disposed on the first plasmonic sensor and comprising a first microfluidic device comprising at least two inlets and at least one outlet;
- a second gasket configured to be disposed on the second sensor and comprising a second microfluidic device comprising at least two inlets and at least one outlet; and
- a computer readable medium in operable communication with the circuit substrate and having software stored thereon that, when executed by a processor in operable communication with the computer readable medium, receives data of the biological matter and extracts a plurality of biological parameters from the data, the first prism being a micro prism,
the second prism being a micro prism,
the base being a Faraday cage,
the first gasket and the second gasket being disposed on a cover that is connected to the base by at least one hinge, such that the cover is configured to open and expose the first plasmonic sensor and the second sensor and to close such that the first gasket covers the first plasmonic sensor and the second gasket covers the second sensor,
the light source comprising at least one light-emitting diode (LED),
the device further comprising a light splitter and a polarizer disposed in a path traveled by light between the light source and the refraction detector,
the first plasmonic sensor comprising gold,
the second sensor comprising gold,
the first plasmonic sensor being disposed directly on and in physical contact with the first prism, and
the second sensor being disposed directly on and in physical contact with the second prism.

* * * * *